US011043696B2

(12) United States Patent
Hu et al.

(10) Patent No.: US 11,043,696 B2
(45) Date of Patent: Jun. 22, 2021

(54) METAL ALLOY LAYERS ON SUBSTRATES, METHODS OF MAKING SAME, AND USES THEREOF

(71) Applicant: University of Maryland, College Park, College Park, MD (US)

(72) Inventors: Liangbing Hu, Hyattsville, MD (US); Eric D. Wachsman, Fulton, MD (US); Yunhui Gong, Clarksville, MD (US); Kun Fu, College Park, MD (US); Wei Luo, College Park, MD (US); Chengwei Wang, College Park, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 137 days.

(21) Appl. No.: 16/097,424

(22) PCT Filed: May 1, 2017

(86) PCT No.: PCT/US2017/030407
§ 371 (c)(1),
(2) Date: Oct. 29, 2018

(87) PCT Pub. No.: WO2017/190135
PCT Pub. Date: Nov. 2, 2017

(65) Prior Publication Data
US 2019/0088986 A1 Mar. 21, 2019

Related U.S. Application Data

(60) Provisional application No. 62/329,846, filed on Apr. 29, 2016.

(51) Int. Cl.
*H01M 10/0525* (2010.01)
*H01M 10/054* (2010.01)
(Continued)

(52) U.S. Cl.
CPC ..... *H01M 10/0525* (2013.01); *H01M 4/0423* (2013.01); *H01M 4/0428* (2013.01);
(Continued)

(58) Field of Classification Search
CPC ............. H01M 10/52; H01M 10/0525; H01M 10/054; H01M 12/08; H01M 4/0407;
(Continued)

(56) References Cited

U.S. PATENT DOCUMENTS 4,645,726 A * 2/1987 Hiratani .................. H01M 6/18
429/231.95
4,911,995 A 3/1990 Belanger
(Continued)

FOREIGN PATENT DOCUMENTS

EP 3203548 A1 8/2017
WO 2014/176266 A1 10/2014
(Continued)

OTHER PUBLICATIONS

K. Fu, Y. Gong, B. Liu, Y. Zhu, S. Xu, Y. Yao, W. Luo, C. Wang, S. D. Lacey, J. Dai, Y. Chen, Y. Mo, E. Wachsman, L. Hu. Toward garnet electrolyte-based Li metal batteries: An ultrathin, highly effective, artificial solid-state electrolyte/metallic Li interface. Sci. Adv .3, e1601659 (2017).*
(Continued)

*Primary Examiner* — Carlos Barcena
(74) *Attorney, Agent, or Firm* — Ladas & Parry, LLP

(57) ABSTRACT

Metal alloy layers on substrates. The metal-alloy layers (e.g., lithium-metal layers, sodium-metal layers, and magnesium-metal layers) can be disposed on, for example, a solid-state electrolyte material. The metal-alloy layers can be used in, for example, solid-state batteries. A metal alloy layer can be an anode or part of an anode of a solid state battery.

24 Claims, 80 Drawing Sheets

(51) Int. Cl.
*H01M 10/0562* (2010.01)
*H01M 4/46* (2006.01)
*H01M 4/58* (2010.01)
*H01M 4/66* (2006.01)
*H01M 4/40* (2006.01)
*H01M 4/1395* (2010.01)
*H01M 10/052* (2010.01)
*H01M 4/04* (2006.01)
*H01M 4/36* (2006.01)
*H01M 4/134* (2010.01)
*H01M 4/38* (2006.01)
*H01M 4/505* (2010.01)
*H01M 4/525* (2010.01)
*H01M 12/08* (2006.01)

(52) U.S. Cl.
CPC ....... *H01M 4/0471* (2013.01); *H01M 4/0488* (2013.01); *H01M 4/134* (2013.01); *H01M 4/1395* (2013.01); *H01M 4/366* (2013.01); *H01M 4/381* (2013.01); *H01M 4/382* (2013.01); *H01M 4/40* (2013.01); *H01M 4/405* (2013.01); *H01M 4/466* (2013.01); *H01M 4/5815* (2013.01); *H01M 4/5825* (2013.01); *H01M 4/661* (2013.01); *H01M 10/052* (2013.01); *H01M 10/054* (2013.01); *H01M 10/0562* (2013.01); *H01M 4/0407* (2013.01); *H01M 4/0426* (2013.01); *H01M 4/38* (2013.01); *H01M 4/505* (2013.01); *H01M 4/525* (2013.01); *H01M 12/08* (2013.01); *Y02E 60/10* (2013.01)

(58) Field of Classification Search
CPC ............. H01M 4/0423; H01M 4/0426; H01M 4/0428; H01M 4/0438; H01M 4/0471; H01M 4/0488; H01M 4/134; H01M 4/1395; H01M 4/366; H01M 4/38; H01M 4/381; H01M 4/382; H01M 4/40; H01M 4/405; H01M 4/466; H01M 4/505; H01M 4/525; H01M 4/5815; H01M 4/5825; H01M 4/661

See application file for complete search history.

(56) References Cited

U.S. PATENT DOCUMENTS

| | | | |
|---|---|---|---|
| 5,705,293 | A | 1/1998 | Hobson |
| 2013/0216903 | A1 | 8/2013 | Pitteloud |
| 2014/0287305 | A1 | 9/2014 | Wachsman et al. |
| 2015/0229000 | A1 | 8/2015 | Shao et al. |
| 2017/0279163 | A1 | 9/2017 | Jang |

FOREIGN PATENT DOCUMENTS

| | | |
|---|---|---|
| WO | 2016/052932 A1 | 4/2016 |
| WO | 2016/057426 A1 | 4/2016 |

OTHER PUBLICATIONS

PCT International Search Report with Written Opinion from PCT/US2017/030407 dated Jul. 7, 2017.
PCT International Preliminary Report on Patentability (Chapter I) with Written Opinion from PCT/US2017/030407 dated Oct. 30, 2018.
Extended Search Report from EPO Patent Application No. 17790638.5 dated Dec. 6, 2019.
Office action from EPO Patent Application No. 17790638.5 dated Mar. 31, 2021.

* cited by examiner

METAL ALLOY LAYERS ON SUBSTRATES, METHODS OF MAKING SAME, AND USES THEREOF

CROSS REFERENCE TO RELATED APPLICATIONS

This application claims priority to U.S. Provisional Application No. 62/329,846, filed on Apr. 29, 2016, the disclosure of which is hereby incorporated by reference.

STATEMENT REGARDING FEDERALLY SPONSORED RESEARCH

This invention was made with government support under contract no. DEEE0006860 awarded by the Department of Energy. The government has certain rights in the invention.

FIELD OF THE DISCLOSURE

The disclosure generally relates to layers of lithium, sodium, magnesium alloys disposed on a substrate. More particularly the disclosure generally relates to such layers on electrolyte materials.

BACKGROUND OF THE DISCLOSURE

Since the commercialization of Li-ion batteries (LIBs) at 1990s, LIBs have attracted great interest and now dominated the market for powering many electronics including smart phone and laptops. Such a huge success depends to a great extent on the findings of graphite based anode. Before that, great attention was paid to Li metal anodes because of their light weight, lowest potential (−3.04 V vs standard hydrogen electrode) and highest capacity (3861 mAh/g). How to improve use of Li metal anodes has remained a great challenge because of well-known problems which include: (i) safety issues associated with the formation of Li dendrite and flammable organic electrolyte; (ii) unstable solid electrolyte interphase (SEI) due to the highly reactive nature of Li metal; (iii) and low Coulombic efficiency upon cycling. Various approaches have been developed to address these problems, such as attempts to optimize electrolytes, fabricating stable SEI, minimizing local current density, building scaffolds, and using advanced separators.

Solid-state electrolytes (SSEs), also named as fast ion conductors, have been proposed as a solution which can address the problems of Li metal anodes. For example, Li dendrite cannot penetrate through the SSEs due to their superior mechanical strength. Even in the worst case, short circuit in all-solid-state Li batteries (ASSLBs) would not lead to dangerous fire or explosion benefitting from the nonflammable nature of SSEs compared to highly combustible organic electrolytes. Moreover, the high stability of SSEs against Li metal would not lead to an unstable SEI. Among various SSEs, $Li_7La_3Zr_2O_{12}$, a type of garnet-structured SSE, has exhibited superior Li-ion conductivity, high thermal and chemical stability. ASSLBs with garnet electrolyte, high potential cathode and Li metal anode have stimulated interest considering their high safety, high energy/power density, and long cyclic life. Unfortunately, large interfacial resistance between electrodes and garnet largely hampered the development of ASSLBs using garnet. For these and other reasons, there is an ongoing need for improved compositions and methods that are generally applicable to disposing metal alloys on a variety substrates, including but not necessarily limited to metals, and for improving the interface between solid-state electrolytes and metal anodes, such as for use with all-solid-state metal batteries, and for improved approaches to modifying the wettability of a substrate, such as from non-wetting to wetting. The present disclosure is pertinent to these and other needs.

SUMMARY OF THE DISCLOSURE

The present disclosure provides metal alloys disposed on substrates, methods of making such metal alloys, and solid-state batteries, ion-conducting batteries comprising such metal alloys.

Disclosed in a novel strategy to modify a substrate (e.g., garnet solid electrolyte) and metal interface (e.g., Li metal interface) by forming a metal alloy (e.g., Li-metal alloy) to successfully change the wettability of the substrate (e.g., garnet solid state electrolyte) from being lithiophobic to lithiophilic with metal (e.g., Li metal. For example, metal alloy type materials (e.g., Li-alloy type materials), such as, for example, aluminum (Al), silicon (Si), tin (Sn), germanium (Ge), magnesium (Mg), gallium (Ga), zinc (Zn), were used to tailor the surface wettability between garnet solid electrolyte and Li metal electrode. This disclosure addresses the main challenge of surface wettability between garnet solid state electrolyte and Li metal.

The present disclosure provides a strategy that addresses the challenge of high interface resistance between Li metal anode and solid state electrolyte. This disclosure paves the way to the realization of all solid state batteries based on Li metal electrodes for high energy and high power densities. All solid state battery is a useful option to realize the use of Li metal as anode electrode due to the solid nature of electrolyte that can block Li dendrite effectively and meanwhile benefit from other prominent features including large electrochemical stability window (0-5V), superior thermal stability, and direct multiple stacking for high voltage. In addition, this non-liquid system allows battery to have better endurance at high voltage and high temperature, thus all solid state battery is featuring high energy and high safety compared to liquid electrolyte and some polymer electrolyte systems.

The metal alloy of the present disclosure with a thickness of 1 nm to 200 microns is disposed on at least a portion of or on all of an exterior surface or all of the exterior surfaces of a substrate. The alloy comprises a first metal and a second metal, where the first metal is lithium, sodium, or magnesium, and the second metal is selected from the group consisting of aluminum, gallium, tin, magnesium, zinc, and combinations thereof and/or a metalloid selected from the group consisting of silicon, germanium, and combinations thereof, where the mole fraction of the second metal is 0.1 to 0.8.

A solid-state, ion-conduction battery of the present disclosure may comprise a cathode, a metal anode comprising lithium, sodium, magnesium, or an alloy thereof, a solid-state electrolyte material having a metal-alloy layer. In some examples, the solid-state, ion-conducting battery has a current collector disposed on at least a portion of the cathode material or the metal anode.

The method of the present disclosure may comprise forming a metal or metalloid layer on at least a portion of a surface of a substrate and contacting the metal or metalloid layer with molten lithium, sodium, or magnesium metal, which forms a metal-alloy layer.

BRIEF DESCRIPTION OF THE FIGURES

For a fuller understanding of the nature and objects of the disclosure, reference should be made to the following detailed description taken in conjunction with the accompanying figures.

DETAILED DESCRIPTION OF THE DISCLOSURE

Figure 1:
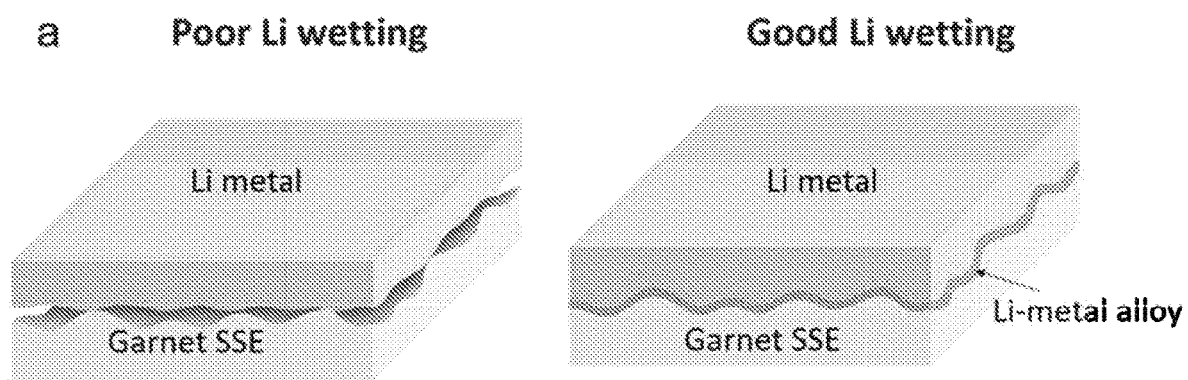
FIG. 1 shows a schematic of improved wettability of solid-state electrolyte against Li metal and demonstration of solid-liquid electrolyte system for Li-ion, Li—S, and Li—$O_2$ batteries. (a) Schematic of engineered garnet solid-state electrolyte/Li interface using Li-metal alloy. The pristine Garnet SSE has poor contact with Li. Al-coated Garnet SSE exhibits good contact with Li due to the Li—Al alloy that forms between the SSE and Li metal. The Garnet SSE surface becomes "lithiophilic", enabling a low area specific resistance (ASR) when Li metal is used. (b) Schematic of the solid-liquid electrolyte system for Li-ion, Li—S, and Li—$O_2$ batteries. Solid-state garnet SSE/Li is on the anode side, and liquid electrolyte is applied to the cathode side.
Figure 1:
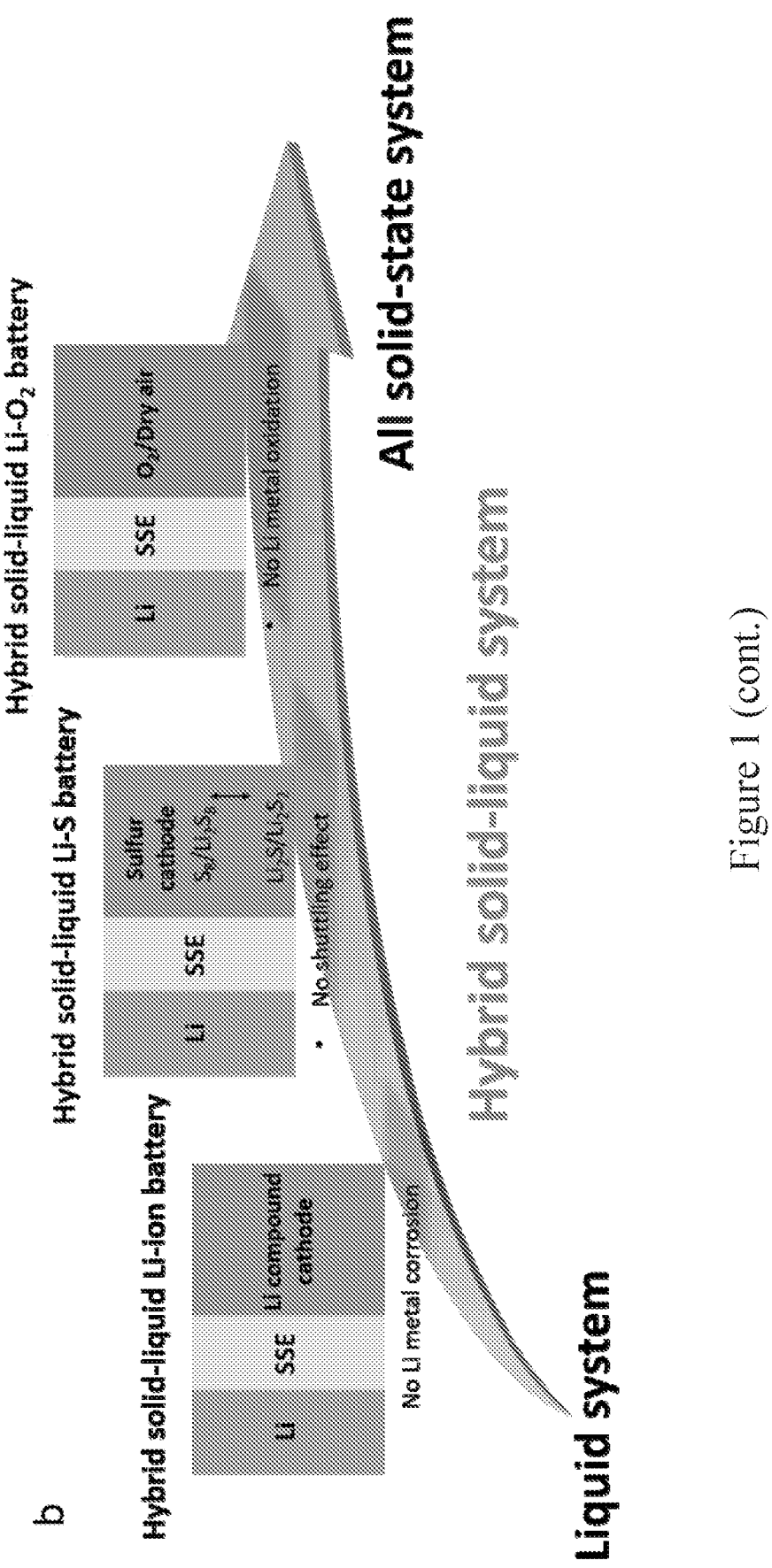

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure.

Ranges of values are disclosed herein. The ranges set out a lower limit value and an upper limit value. Unless otherwise stated, the ranges include all values to the magnitude of the smallest value (either lower limit value or upper limit value) and ranges between the values of the stated range.

The present disclosure provides metal alloy layers disposed on substrates. The present disclosure also provides method of making such metal alloy layers.

In one aspect the disclosure provides a novel strategy to modify a substrate (e.g., garnet solid electrolyte) and metal interface (e.g., Li metal interface) by forming a metal alloy (e.g., Li-metal alloy) to successfully change the wettability of the substrate (e.g., garnet solid state electrolyte) from non-wetting (e.g., lithiophobic to Li metal) to wetting (e.g., lithiophilic for Li metal). In an example, our results showed that the interface resistance of a garnet solid electrolyte was significantly reduced from thousands of ohm*cm$^2$ for the pristine garnet/Li interface to a few tens of ohm*cm$^2$ for the surface engineered garnet/Li, which is around two orders of magnitude lower. For example, metal alloy type materials (e.g., Li-alloy type materials), such as, for example, aluminum (Al), silicon (Si), tin (Sn), germanium (Ge), magnesium (Mg), gallium (Ga), zinc (Zn), were used to tailor the surface wettability between garnet solid electrolyte and Li metal electrode. In one aspect the disclosure thus addresses a main challenge of surface wettability between garnet solid state electrolyte and Li metal, and without intending to be constrained by any particular theory is expected to pave way to realize all solid state batteries based on Li metal electrodes.

In various examples, the present disclosure provides a strategy that addresses the challenge of high interface resistance between Li metal anode and solid state electrolyte. This disclosure paves the way to the realization of all solid state batteries based on Li metal electrodes for high energy and high power densities. All solid state battery is a useful approach to realize use of Li metal as anode electrode due to the solid nature of electrolyte that can block Li dendrite effectively and meanwhile benefit from other prominent features including large electrochemical stability window (0-5V), superior thermal stability, and direct multiple stacking for high voltage. In addition, this non-liquid system allows battery to have better endurance at high voltage and high temperature, thus all solid state battery is featuring high energy and high safety compared to liquid electrolyte and some polymer electrolyte systems.

In an aspect, the present disclosure provides compositions. The compositions comprise a metal-alloy layer comprising a lithium alloy, sodium alloy, or magnesium alloy disposed on a substrate. In various examples, the metal-alloy layer is a lithium alloy, sodium alloy, or magnesium alloy. A layer can be made by methods of the present disclosure. In an example, a layer is made by a method of the present disclosure.

In an example, a metal-alloy layer (e.g., having a thickness of 1 nm to 200 microns nm, including all integer values and ranges therebetween) disposed on at least a portion of or all of an exterior surface or all of the exterior surfaces of a substrate. In various examples, the metal-alloy layer is 1 nm to 1,000 nm, including all integer values and ranges therebetween. The thickness of the layer is the shortest dimension of the layer or the dimension perpendicular to the surface of the layer disposed on the substrate. The metal-alloy comprises a first metal, $M^1$, and a second metal, $M^2$, where i) $M^1$ is lithium, sodium, or magnesium, ii) $M^2$ is a metal (e.g., a metal such as, for example, aluminum, gallium, tin, magnesium, zinc, and the like, and combinations thereof) and/or a metalloid (e.g., a metalloid such as, for example, silicon, germanium, and the like, and combinations thereof), and iii) the mol fraction of $M^2$ in the layer is 0.1 to 0.8, including all 0.1 mol fraction values and ranges therebetween). In an example, the mol fraction of $M^2$ in the layer is 0.4 to 0.7.

A metal-alloy layer can comprise lithium, sodium, or magnesium and further comprise a metal and/or a metalloid. Examples of metals include aluminum, gallium, tin, magnesium, zinc, and the like. Examples of metalloids include, but are not limited to, silicon, germanium, and the like. The metalloids can be amorphous. A metal-alloy layer can comprise a combinations of metals and/or a combination of metalloids. The mol fraction of metal(s) and/or metalloid(s) relative to the total moles of lithium, sodium, or magnesium and metal(s) and/or metalloid(s) is 0.1 to 0.8, including all 0.1 mol fraction values and ranges therebetween. In an example, the mol fraction of metal(s) and/or metalloid(s) in the layer is 0.4 to 0.7.

A metal-alloy layer is ion-conducting (e.g., mono-, di-, or tri-valent ion conducting). For example, an interfacial layer is lithium-ion conducting, sodium-ion conducting, magnesium-ion conducting, or aluminum-ion conducting.

A metal-alloy layer can be a solid-solution of a first metal (e.g., lithium, sodium, or magnesium) and a second metal and/or metalloid. A metal-alloy layer can be an alloy (e.g., a thermodynamically stable alloy of a first metal (e.g., lithium, sodium, or magnesium) and a second metal and/or metalloid. The metal-alloy layer comprises sufficient second metal and/or metalloid to provide a desirable interface reaction energy of the interface between the metal-alloy layer and substrate. For example, the interface reaction energy of the interface between the metal-alloy layer and substrate is negative (e.g., at least −5 meV/atom, at least −10 meV/atom, or at least −20 meV/atom). The interface reaction energy can be determined by methods known in the art.

A metal-alloy layer can be of various thicknesses (e.g., smallest dimension of the layer). In various examples, the metal-alloy layer has a thickness of 1 nm to 200 microns, including all integer values and ranges therebetween). In various examples, the metal-alloy layer has a thickness of 1 nm to 1,000 nm, including all integer values and ranges therebetween).

The metal-alloy layer can have a homogenous composition, a gradient composition, or a diffuse composition. The mol fraction of metal and/or metalloid (e.g., $M^2$) in the layer is at least at one point, a plurality of points, or throughout the layer 0.1 to 0.8, including all 0.1 mol fraction values and ranges therebetween. In an example, the mol fraction of metal and/or metalloid (e.g., $M^2$) is at least at one point, a plurality of points, or throughout the layer 0.4 to 0.7. The mol fraction is moles of alloying metal(s) and/or alloying metalloid(s) divided by the total mols of all metals and/or metalloids in the layer.

A metal-alloy layer can be the only layer disposed on a substrate. The metal-alloy layer can be part of a multilayer structure (e.g., a multilayer layer structure comprising a metal layer or a second metal-alloy layer, which can be the same or different composition than the first metal-alloy layer). In an example, the metal-alloy layer is a discrete layer, which can be part of a multilayer structure. The multilayer structure can have discrete layers (e.g., discrete layers of different composition) or can have variable composition at different points or layers of the structure. In an example, the metal alloy layer or thicker layer is an anode of a solid-state battery and the substrate is an electrolyte of the solid-state battery. The metal-alloy layer can have a homogenous composition, a gradient composition, or a diffuse composition.

The metal-alloy layer can have a homogenous composition, a gradient composition, or a diffuse composition. A metal alloy layer can be disposed on various solid substrates. Solid substrates can comprise conducting materials or insulating materials. Examples of substrates include, but are not limited to, metal substrates, ceramic substrates, carbon substrates, paper substrates, and polymer substrates. Substrates can comprise materials such as for example, metal materials, ceramic materials, carbon materials, paper materials, and polymer materials (e.g., polyimides such as Kapton).

In an example, a substrate is a solid-state electrolyte (SSE) material. The metal-alloy layer can be disposed on at least a portion of a surface or all of the surfaces between a metal- or metal-alloy comprising lithium, sodium, magnesium, or alloy and a garnet solid-state electrolyte (SSE) material. At least a portion of a surface of a metal-alloy layer is in contact with at least a portion of a surface of an SSE material. A metal-alloy layer can contact all (e.g., a continuous layer) or substantially all of the surfaces of an SSE material. It is desirable that the metal-alloy layer is in contact with a portion of or the portions of the surface of the SSE material between the SSE material and an anode material. The metal-alloy layer can be part of a metal- or metal-alloy layer comprising lithium, sodium, magnesium, or alloy and be disposed on at least a portion of a surface or all of the surfaces and a garnet SSE material.

SSE materials are lithium-ion conducting materials, sodium-ion conducting materials, or magnesium-ion conducting materials. Examples of SSE electrolyte materials include, but are not limited to, known SSE materials used in lithium, sodium, or magnesium ion-conducting batteries.

In an example, the substrate is a garnet SSE material. Examples of garnet SSE materials include lithium garnet SSE materials, doped lithium garnet SSE materials, lithium garnet composite materials, and combinations thereof.

Examples of lithium garnet SSE materials include, but are not limited to, $Li_3$-phase lithium garnet SSE materials (e.g., $Li_3CTe_2O_{12}$, where C is a lanthanide such as Y, Pr, Nd, Sm, Eu, Gd, Tb, Dy, Ho, Er, Tm, Yb, Lu, Zr, Ta, or a combination thereof and $Li_{3+x}Nd_3Te_{2-x}O_{12}$, where x is 0.05 to 1.5, $Li_5$-phase lithium garnet SSE materials (e.g., $Li_5La_3M^1{}_2O_{12}$, where $M^1$ is Nb, Zr, Ta, Sb, or a combination thereof, cation-substituted $Li_5La_3M^1{}_2O_{12}$ such as, for example, $Li_6ALa_3M^1{}_2O_{12}$, where A is Mg, Ca, Sr, Ba, or combinations thereof, and $Li_7La_3B_2O_{12}$, where B is Zr, Sn, or a combination thereof); $Li_6$-phase lithium garnet SSE materials (e.g., $Li_6DLa_2M^3{}_2O_{12}$, where D is Mg, Ca, Sr, Ba, or a combination thereof and $M^3$ is Nb, Ta, or a combination thereof); cation-doped $Li_6La_2BaTa_2O_{12}$; cation-doped $Li_6BaY_2M^1{}_2O_{12}$, where cation dopants are barium, yttrium, zinc, or combinations thereof, an Liz-phase lithium garnet SSE material (e.g., cubic $Li_7La_3Zr_2O_{12}$ and $Li_7Y_3Zr_2O_{12}$); cation-doped $Li_7La_3Zr_2O_{12}$; $Li_{5+2x}La_3,Ta_{2-x}O_{12}$, where x is 0.1 to 1, $Li_{6.8}(La_{2.95},Ca_{0.05})(Zr_{1.75},Nb_{0.25})O_{12}$ (LLCZN), $Li_{6.4}Y_3Zr_{1.4}Ta_{0.6}O_{12}$, $Li_{6.5}La_{2.5}Ba_{0.5}TaZrO_{12}$, $Li_6BaY_2M^1{}_2O_{12}$, $Li_7Y_3Zr_2O_{12}$, $Li_{6.75}BaLa_2Nb_{1.75}Zn_{0.25}O_{12}$, or $Li_{6.75}BaLa_2Ta_{1.75}Zn_{0.25}O_{12}$), lithium garnet composite materials (e.g., lithium garnet-conductive carbon matrix or composites with other materials). Other examples of lithium-ion conducting SSE materials include cubic garnet-type materials such as 3 mol % YSZ-doped $Li_{7.06}La_3Zr_{1.94}Y_{0.06}O_{12}$ and 8 mol % YSZ-doped $Li_{7.16}La_3Zr_{1.94}Y_{0.06}O_{12}$.

Additional examples of suitable Li-garnet SSE materials include, but are not limited to, $Li_5La_3Nb_2O_{12}$, $Li_5La_3Ta_2O_{12}$, $Li_7La_3Zr_2O_{12}$, $Li_6La_2SrNb_2O_{12}$, $Li_6La_2BaNb_2O_{12}$, $Li_6La_2SrTa_2O_{12}$, $Li_6La_2BaTa_2O_{12}$, $Li_7Y_3Zr_2O_{12}$, $Li_{6.4}Y_3Zr_{1.4}Ta_{0.6}O_{12}$, $Li_{6.5}La_{2.5}Ba_{0.5}TaZrO_{12}$, $Li_7Y_3Zr_2O_{12}$, $Li_{6.75}BaLa_2Nb_{1.75}Zn_{0.25}O_{12}$, or $Li_{6.75}BaLa_2Ta_{1.75}Zn_{0.25}O_{12}$.

SSE materials can be a sodium-ion conducting materials. For example, a SSE material comprises an SSE material selected from β"-$Al_2O_3$, porous or dense $Na_4Zr_2Si_2PO_{12}$ (NASICON), cation-doped NASICON (e.g., $Na_4ZrAlSi_2PO_{12}$, $Na_4ZrFeSi_2PO_{12}$, $Na_3Zr_{1.94}Y_{0.06}Si_2PO_{12}$, $Na_4ZrSbSi_2PO_{12}$, and $Na_4ZrDySi_2PO_{12}$).

SSE material can be a magnesium-ion conducting material. For example, a SSE material comprises an SSE material selected from $Mg_{1+x}(Al,Ti)_2(PO_4)_6$, NASICON-type magnesium-ion conducting materials (e.g., $Mg_{1-2x}(Zr_{1-x}M_x)_4P_6O_{24}$) and $Mg_{1-2x}(Zr_{1-x}M_x)(WO_4)_3$, where x is 0.01 to 0.5).

In an aspect, the present disclosure provides solid-state batteries. The solid-state batteries comprise a metal-alloy layer of the present disclosure. The solid-state batteries can be ion-conducting batteries such as, for example, lithium-ion conducting, sodium-ion conducting, or magnesium-ion conducting solid-state batteries. A metal-alloy layer can be an anode or a part of an anode of ion-conducting solid-state battery.

In an example, a solid-state, ion-conducting battery comprises: a) a cathode material; b) an anode comprising a metal-alloy layer of the present disclosure; c) solid-state electrolyte material; and d) optionally, a current collector disposed on at least a portion of the cathode material or the lithium-metal anode.

The solid-state battery can comprise various cathode materials. Examples of cathode materials include, but are not limited to, known cathode materials used in ion-conducting (e.g., lithium, sodium, or magnesium ion-conducting) batteries. The cathode materials may be specific to the metal-alloy layer.

Examples of cathode materials include, but are not limited to, conducting carbon materials, sulfur (S), oxygen ($O_2$), organic sulfide or polysulfide (e.g., carbynepolysulfide and copolymerized sulfur), and the like. A conducting carbon material, optionally, further comprises an organic or gel ion-conducting electrolyte.

The cathode material can be an air electrode. Examples of materials suitable for air electrodes include those used in solid-state lithium ion batteries with air cathodes such as large surface area carbon particles (e.g., Super P which is a conductive carbon black) and catalyst particles (e.g., alpha-$MnO_2$ nanorods) bound in a mesh (e.g., a polymer binder such as PVDF binder).

In the case of lithium ion-conducting batteries, the cathode material can be a lithium-containing material. For example, the lithium ion-conducting cathode material is lithium nickel manganese cobalt oxides (NMC, $LiNi_xMn_y$-$Co_zO_2$, where x+y+z=1), $LiNi_{1/3}Co_{1/3}Mn_{1/3}O_2$, $LiNi_{0.5}Co_{0.2}Mn_{0.302}$, lithium manganese oxides (LMOs), such as $LiMn_2O_4$, $LiNi_{0.5}Mn_{1.5}O_4$, lithium iron phosphates (LFPs) such as $LiFePO_4$, $LiMnPO_4$, and $LiCoPO_4$, and $Li_2MMn_3O_8$, where M is selected from Fe, Co, and combinations thereof. The ion-conducting cathode material can be a high energy ion-conducting cathode material such as $Li_2MMn_3O_8$, wherein M is selected from Fe, Co, and combinations thereof. In an example, the lithium-ion conducting cathode material is $LiCoO_2$.

In the case of sodium ion-conducting batteries, the cathode material can be a sodium-containing material. Examples of sodium-containing materials, include, but are not limited to, $Na_xMO_2$ materials (x=0.17-0.67, M=Mn, Ni, Co or a combination thereof) (e.g., $Na_xMnO_2$, $Na_x[Ni_yMn_{1-y}]O_2$, y=0-1), $Na_xCoO_2$, $Na_x[Ni_{1/3}Co_{1/3}Mn_{1/3}]O_2$), $NaMPO_4$ (M=Fe, Mn) materials, $Na_2Fe_2(SO_4)_3$ materials, $Na_3V_2(PO_4)_3$ materials, and the like.

In the case of magnesium-ion conducting batteries, the cathode materials can be magnesium-containing materials, $FeS_2$ materials, $MoS_2$ materials, $TiS_2$ materials, and the like. Examples of magnesium-containing materials include, but are not limited to, $MgMSiO_4$ (M=Fe, Mn, Co) materials and $MgFePO_4F$ materials, and the like.

It may be desirable to use an electronically conductive material as part of an ion-conducting cathode material. For example, an ion-conducting cathode material also comprises an electrically conducting carbon material (e.g., graphene or carbon black), and the ion-conducting cathode material, optionally, further comprises an organic or gel ion-conducting electrolyte. The electronically conductive material may separate from the ion-conducting cathode material. For example, electronically conductive material (e.g., graphene) is disposed on at least a portion of a surface (e.g., a pore surface) of the porous region of an SSE electrolyte structure and the ion-conducting cathode material is disposed on at least a portion of the electrically conductive material (e.g., graphene).

Various current collectors can be used. Examples of current collectors include, but are not limited to, conducting metals or conducting metal alloys. Suitable current collectors are known in the art.

A cathode material, the anode, the SSE material, and current collector can form a cell. In an example, a solid-state battery comprises a plurality of cells, each adjacent pair of the cells is separated by a bipolar plate.

The interfacial resistance of a device comprising one or more metal-alloy layer can be 10 times or less, 20 times or less, 30 times or less, 40 times or less, 50 times or less, 100 times or less, 200 times or less, or 300 times or less than the resistance of the same device that does not have the one more interfacial layer. The interfacial resistance of a device comprising one or more metal-alloy layer can be 750 $\Omega \cdot cm^2$ or less, 500 $\Omega \cdot cm^2$ or less, 400 $\Omega \cdot cm^2$ or less, 300 $\Omega \cdot cm^2$ or less, 200 $\Omega \cdot cm^2$ or less, 100 $\Omega \cdot cm^2$ or less, 50 $\Omega \cdot cm^2$ or less, 40 $\Omega \cdot cm^2$ or less, 30 $\Omega \cdot cm^2$ or less, 20 $\Omega \cdot cm^2$ or less, 10 $\Omega \cdot cm^2$ or less, 50 $\Omega \cdot cm^2$ or less, 4 $\Omega \cdot cm^2$ or less, 3 $\Omega \cdot cm^2$ or less, or 2 $\Omega \cdot cm^2$ or less.

In an aspect, the present disclosure provides methods of making compositions of the present disclosure. The methods are based on contacting a substrate with a metal alloy. The metal alloy can be formed by melting a metal alloy layer or melting discrete layers of a first metal (e.g., lithium, sodium, or magnesium) with a second metal or metalloid.

In an example, a method of making a metal-alloy layer of the present disclosure comprises: forming a metal and/or metalloid layer (e.g., a layer having a thickness of 1 nm to 200 microns, inclusive, and all numbers and ranges of numbers there between. In an embodiment the thickness is rom 1 nm to 100 μm or 1 nm to 1,000 nm or 1 nm to 200 microns) on at least a portion of a surface of a substrate; contacting the metal and/or metalloid layer with molten lithium, sodium, or magnesium, metal, resulting in formation of the metal-alloy layer.

Contacting the metal or metalloid layer with molten lithium, sodium, or magnesium metal can comprise contacting the metal or metalloid layer with lithium, sodium, or magnesium metal and heating the lithium, sodium, or magnesium metal and the metal or metalloid layer (e.g., at a temperature at or above the melting point of the lithium, sodium, or magnesium metal such as, for example, 80° C. to 300° C., to form the metal-alloy layer.

A metal or metalloid layer can be formed using various methods. For example, a metal or metalloid layer is formed (e.g., deposited) using thin-film deposition methods. Suitable thin film deposition methods are known in the art. Examples of suitable metal or metalloid layer formation methods include, but are not limited to, chemical vapor deposition (CVD) and atomic layer deposition (ALD) methods (e.g., plasma enhanced CVD (PECVD)) and physical vapor deposition (PVD) methods (e.g., thermal evaporation or sputtering). In another example, a metal or metalloid is deposited by a solution based process.

In another example, a method of making a metal-alloy layer of the present disclosure comprises: a) contacting the substrate a metal alloy comprising lithium, sodium, or magnesium metal alloyed with a metal (e.g., a metal such as aluminum, gallium, tin, magnesium, zinc, and combinations thereof) and/or a metalloid (e.g., a metalloid such as silicon, germanium, and combinations thereof); and b) heating the metal alloy (e.g., at a temperature at or above the melting point of the lithium, sodium, or magnesium metal such as, for example, 80° C. to 300° C., to form the metal-alloy layer.

Metal alloys having a desired composition are commercially available and can be made by methods known in the art.

The steps of the methods described in the various embodiments and examples disclosed herein are sufficient to make compositions of the present disclosure. Thus, in an example, a method consists essentially of a combination of the steps of the methods disclosed herein. In another embodiment, a method consists of such steps.

In an aspect, the present disclosure provides devices. A device can comprise on or more solid-state battery of the present disclosure.

In an example, the device is an article of manufacture. Examples of articles of manufacture include, but are not limited to, consumer products such as, for example, digital cameras, personal digital assistants (PDAs), cellphones (e.g., smartphones), watches, power tools, thermometers, remote car locks, laser pointers, MP3 players, hearing aids, calculators, toys (e.g., remote control toys), power supplies (e.g., backup systems such as emergency power backups, uninterruptible power supply, and power storage for alternative energy sources such as wind and photovoltaic power generation systems), surveillance or alarm systems, medical devices/equipment, mobility equipment (e.g., electric wheelchairs and stair lifts), portable power packs, transportation devices (e.g., electric vehicles such as cars, buses, and motorcycles), charging stations, and the like.

The following examples are presented to illustrate the present disclosure. They are not intended to limiting in any matter.

EXAMPLE 1

This example provides a description of metal-alloy layers of the present disclosure and methods of making such layers.

A garnet-structured SSE, the most promising oxide-based SSE, was changed from "super-lithiophobicity" to "super-lithiophilicity" through a thin coating of amorphous Si by plasma-enhanced chemical vapor deposition (PECVD). The wettability transition of SSE is due to the reaction between Li and Si and the in situ formation of lithiated Si. The resulting lithiated Si has high ionic and electrical conductivity, which can act as an interface between Li metal and SSE. Benefitting from this, symmetric cells composed of Si-coated garnet-structured SSE and Li metal electrodes exhibited much smaller impedance and excellent stability upon plating/stripping cycles compared to bare garnet-structured SSE. Our discovery on the switch of lithiophobicity to lithiophilicity for improving the interface may open opportunities for many other SSEs.

This disclosure demonstrates in one aspect a novel solution for improving the interface between garnet-structured solid-state electrolyte (garnet) and Li metal anode, which is critical for the practical application of all-solid-state lithium batteries (ASSLBs). By coating a thin layer of amorphous Si onto garnet via PECVD, molten Li can react with Si spontaneously and in situ form lithiated Si. Due to the high Li-ion conductivity of lithiated Si, the resulting Li/garnet symmetric cell exhibits very limited resistance and lead to stable cycling performance. Considering the advantages of PECVD technology and abundant/low cost Si, we believe our solution can provide a new route to tune the surface of many other solid-state electrolytes and contribute a significant breakthrough for ASSLBs.

Figure 2:
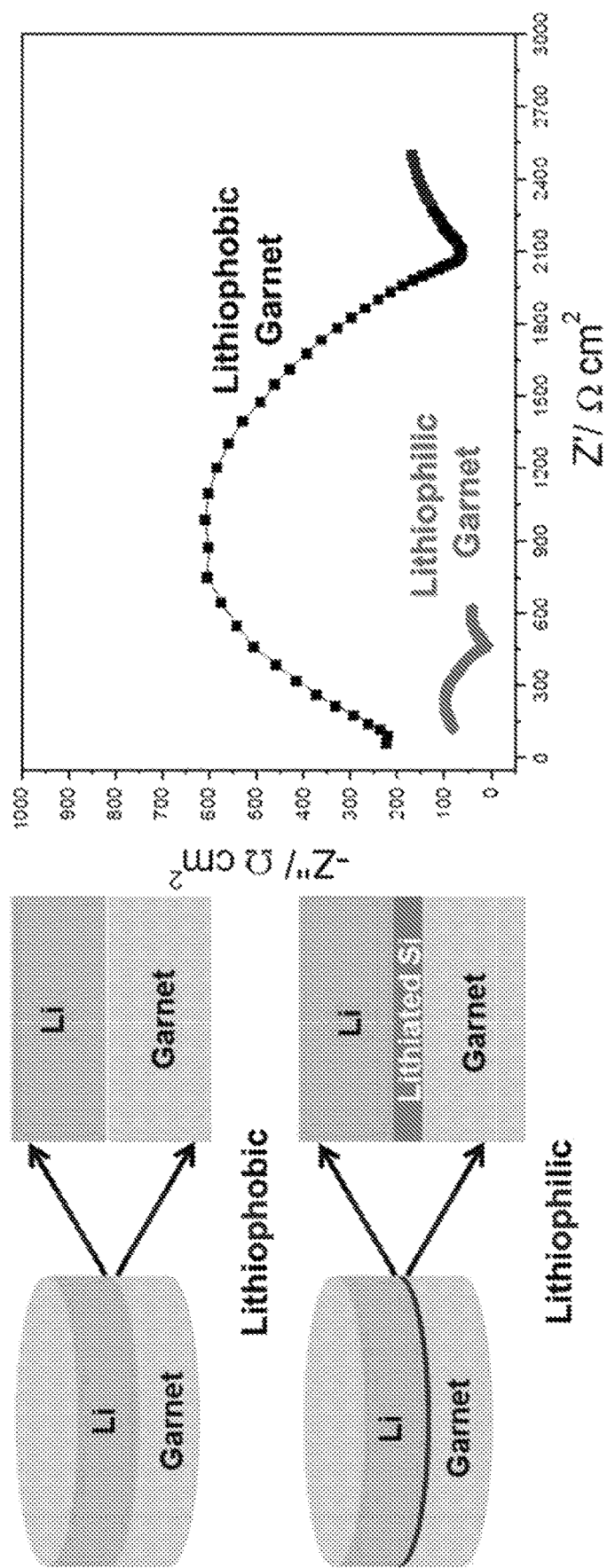
FIG. 2 shows a schematic illustration of the transition from super-lithiophobicity to super-lithiophilicity of garnet based solid-state electrolyte by a thin layer of Si coating. The wettability of garnet was greatly improved by the reaction between Li and Si and the in situ formation of lithiated Si. Electrochemical impedance spectroscopy measurement of symmetric cells using Si-coated garnet solid-state electrolyte (lithiophilic) showed much smaller impedance than that of bare garnet (lithiophobic).

The fundamental problem of the poor contacting between Li metal and garnet is the that garnet will not react with Li even when Li metal is in molten state. We engineered the surface of garnet by a thin layer of amorphous Si, which is known as a highly reactive material with Li (FIG. 2). Taking the advantage of plasma-enhanced chemical vapor deposition (PECVD), the thin layer (~10 nm) amorphous Si coating can contact perfectly with garnet that molten Li can wet garnet very fast (up to seconds). Our experiments and theoretical calculations indicate that the reaction between Si and molten Li are crucial for the greatly improved wettability. Symmetric cells using the resulting lithiophilic garnet showed much smaller interfacial resistivity and greater cyclic stability compared to bare lithiophobic garnet (FIG. 2). The present methodology accordingly provides for switching super-lithiophobic surface to super-lithiophilic surface of garnet as a strategy for design of SSEs and ASSLBs.

Figure 3:
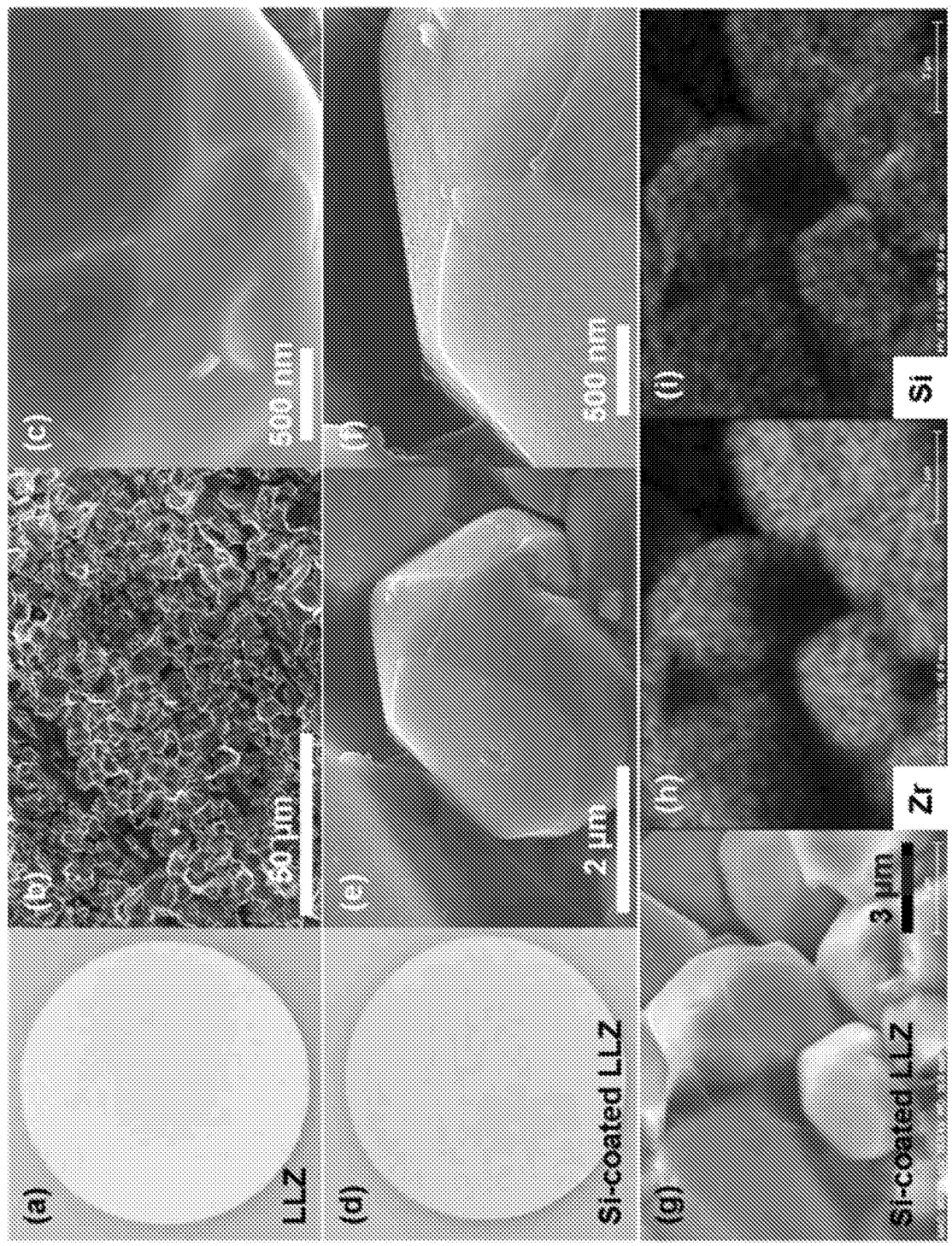
FIG. 3 shows coating a thin layer of amorphous Si onto garnet-structured solid-state electrolyte (LLZ) via advanced PECVD technology. (a) Photo of bare LLZ pellet, showing the typical yellowish color. (b, c) SEM images at different magnifications of bare LLZ, where crystallized LLZ particles with smooth surface can be observed. (d) Photo of Si-coated LLZ shows that the color of LLZ pellet is changed from yellow to orange after coating a thin layer of amorphous Si (~10 nm). (e, f) SEM images of Si-coated LLZ indicate the surface became rough after coating. (g-i) EDX elemental mapping images of Si-coated LLZ. The result shows the well overlap of elemental Zr and Si, suggesting the uniform distribution of Si on LLZ.
Figure 7:
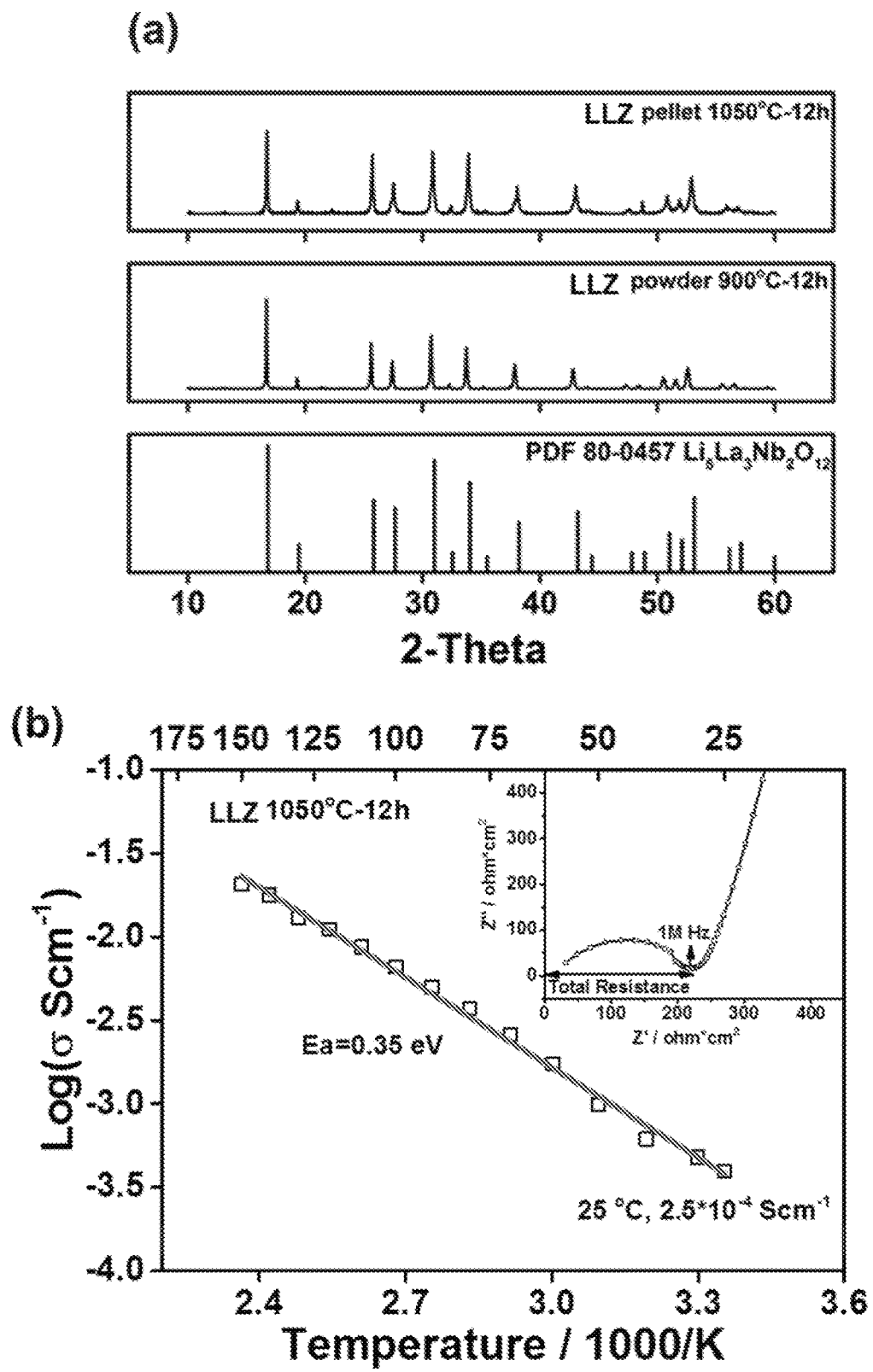
FIG. 7 shows characterization of the LLZ solid-state electrolyte: (a) XRD patterns of the calcined LLZ powder and the LLZ pellet; (b) Arrhenius plot showing the Li-ion conduction from 25 to 150° C. The inset is an AC impedance plot obtained at 25° C.

In this study, Niobium (Nb) and Calcium (Ca) co-doped $Li_7La_3Zr_2O_{12}$ ($Li_{6.85}La_{2.9}Ca_{0.1}Zr_{0.75}Nb_{0.25}O_{12}$, designated as LLZ) was adopted. LLZ precursor powders were synthesized by a solid-state-reaction at 900° C. and followed by ball milling to break soft agglomeration. The oven-dried powders were pressed into pellets and sintered at 1050° C. to give the yellowish LLZ (FIG. 3a). FIG. 7a gives the X-ray diffraction (XRD) patterns of calcined precursor LLZ powder and crashed sintered LLZ pellet. All diffraction patterns of powder and pellet show no difference with standard cubic phase of garnet structure (PDF-80-0457). The stabilized cubic phase allow a high Li-ion conductivity of $2.5*10^{-4}$ S/cm, as displayed in FIG. 7b. Li-ion conductivity of LLZ is also thermally activated and obeyed ahhrenius equation, where the activation energy is 0.35 eV and comparable to other reported values.

FIG. 3b is a low-magnification scanning electron microscopy (SEM) image of polished LLZ, showing a large quantity of crystallized particles with size up to several micrometers. The zoomed-in SEM image in FIG. 3c exhibits the smooth surface. After coating a thin layer of amorphous Si (10 nm) by PECVD, LLZ turns to orange (FIG. 3d). High-magnification SEM images show that the surface of LLZ becomes relatively rougher (FIGS. 3e and 3f). FIGS. 3g to 3h are corresponding energy-dispersive X-ray (EDX) elemental mapping images, where the signal of elemental Zr overlaps well with that of elemental Si. These results verify the uniform distribution of Si on the surface of LLZ by PECVD. It is well-known that PECVD has been widely used in industry, especially for semiconductor field. Taking the advanced PECVD technology and low-cost Si coating, surface modification can be easily done for many other solid-state electrolytes, given the benefit of the present disclosure.

Figure 4:
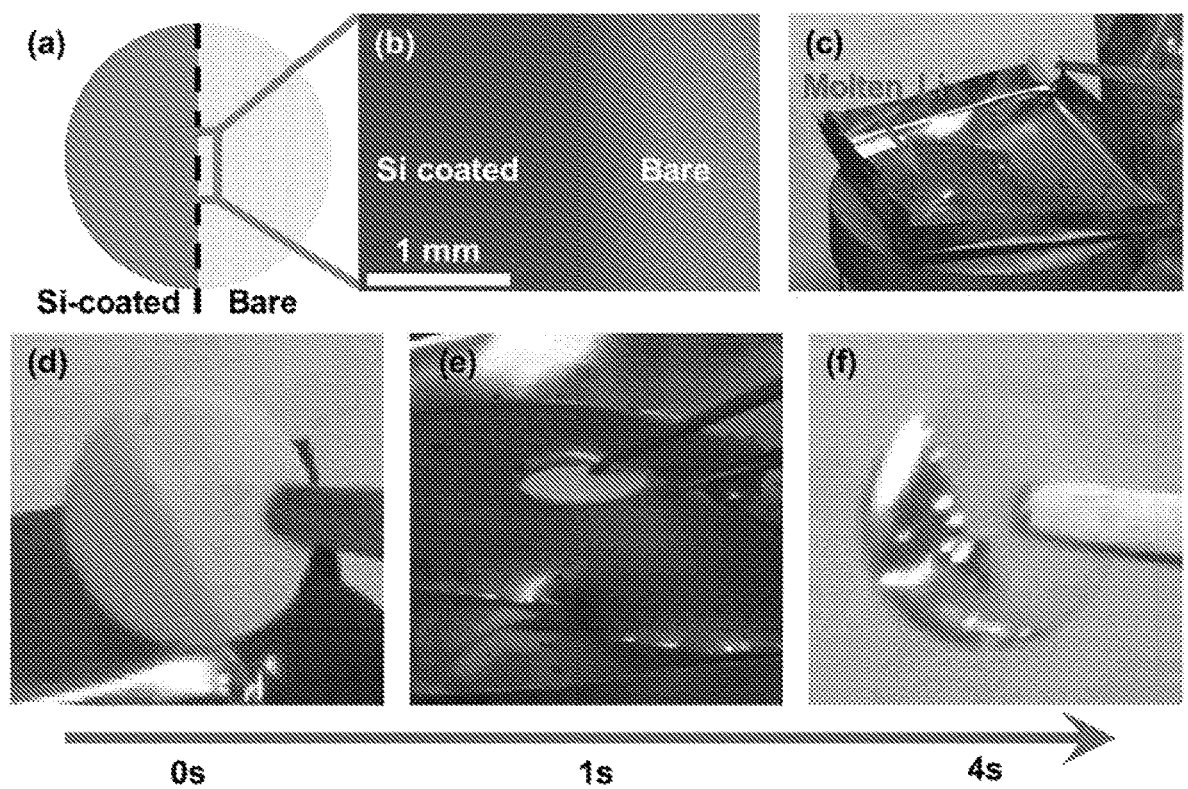
FIG. 4 shows evaluation of the wettability of LLZ and Si-coated LLZ with molten Li metal. (a) Schematic to show the design that one half area of LLZ was coated with amorphous Si while another half was not. (b) SEM image to show the contrast between bare area and Si-coated area on LLZ. (c) A home-made setup for the wettability evaluation, where molten Li was loaded in a stainless steel boat on a hot plate (~200° C.). (d) A photo of the half-coated LLZ pellet before immersing in molten Li (0s). (e) A photo of the half-coated LLZ pellet while immersing in molten Li (1s). (f) A photo of the half-coated LLZ pellet after immersing in molten Li (4s), which indicates that LLZ was dramatically changed from super-lithiophobicity to super-lithiophilicity by Si coating.
Figure 8:
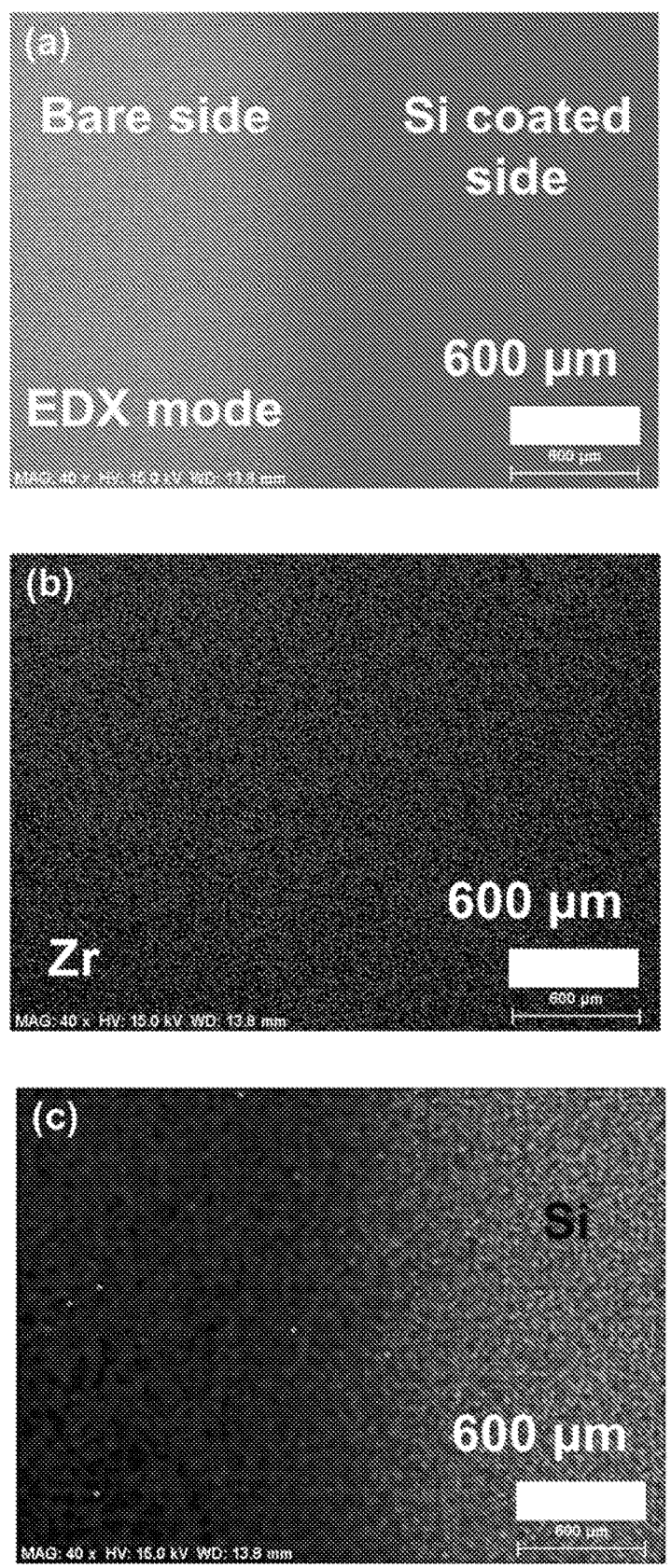
FIG. 8 shows (a-c) SEM and EDX elemental mapping images of the middle area of the half-Si-coated LLZ pellet.

To evaluate the effect on wettability of LLZ by Si coating, we designed and fabricated a LLZ pellet that one half area was deposited with amorphous Si while another half was not, as illustrated in FIG. 4a. As shown in FIG. 4d, the orange color indicates the Si coating was obtained on left area of LLZ via PECVD, which is further confirmed by SEM (FIG. 4b) and EDX mapping (FIG. 8). The wettability was tested by dipping the LLZ pellet into molten Li using a home-made setup (FIG. 4c). After dipping the half-coated LLZ into molten Li for only 4 seconds, the Si-coated side was fully coated with Li metal while the bare side was as clean as before (FIG. 4d-4f), where the sharp contrast between Si-coated side and bare side indicates the wettability of LLZ dramatically changed from super-lithiophobicity to super-lithiophilicity by the thin layer of amorphous Si.

Figure 5:
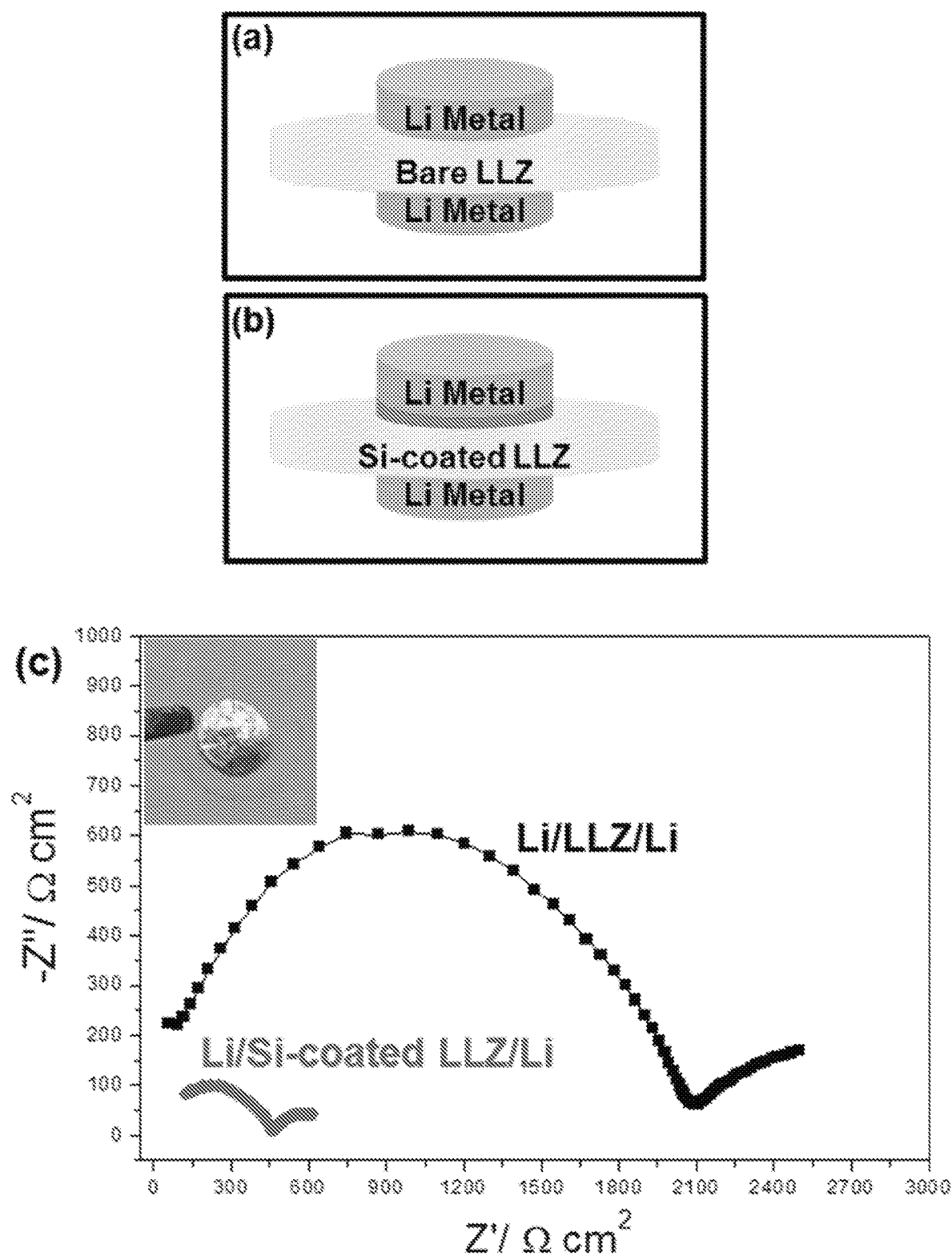
FIG. 5 shows electrochemical performance of symmetric cells using Si-coated LLZ and bare LLZ. Schematic illustration showing the structure of symmetric cells with (a) LLZ or (b) Si-coated LLZ SSEs. (c) EIS spectra of symmetric cells confirmed that the interfacial resistivity was decreased by Si coating and the in situ formation of lithiated Si. Inset of (c) is photo of a symmetric cell. (d) Long-term cycling performance of Li/Si-coated LLZ/Li symmetric cell under current density of 0.05 mA/$cm^2$ and 0.1 mA/$cm^2$. (d) Voltage profiles of a Li/Si-coated LLZ/Li symmetric cell under current density of 0.1 mA/$cm^2$ and 0.2 mA/$cm^2$.
Figure 5:
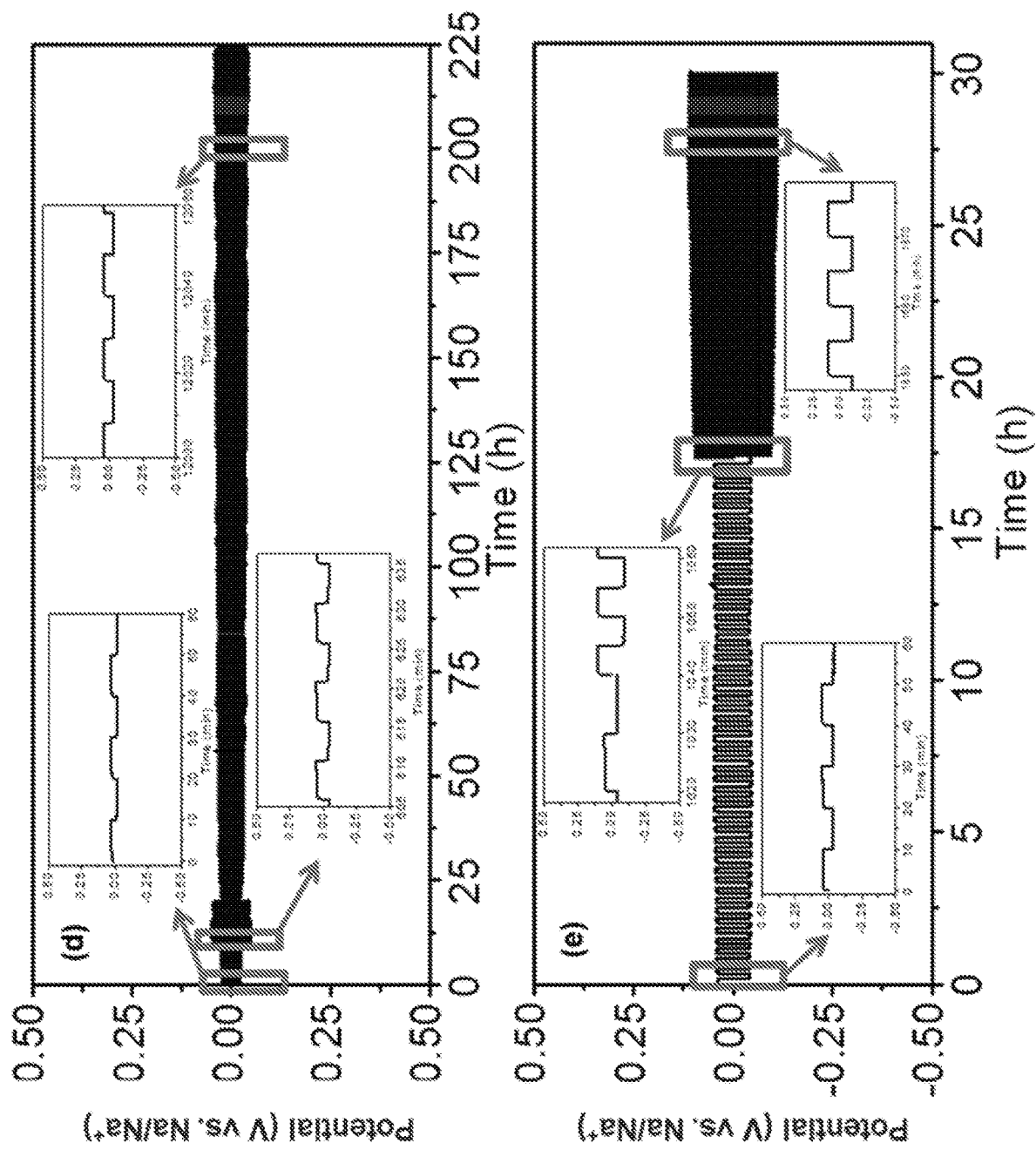

Prompted by the enhanced wettability demonstrated herein, we tested whether the interfacial resistance between Li metal anode and Si-coated LLZ would be decreased. In order to test it, LLZ or Si-coated LLZ was sandwiched by two Li metal electrodes to assemble symmetric cells (FIGS. 5a and 5b). Prior to the electrochemical measurements, cells were heated on a hot plate (~200° C.) for twenty minutes. Due to the high reactivity of molten Li, lithiated Si would be in situ formed between the Li metal and Si-coated LLZ. As shown in FIG. 5c, Nyquist plots of symmetric cells with LLZ and Si-coated LLZ obtained from electrochemical impedance spectroscopy (EIS) measurements exhibited sharp difference. Without coating, the poor contact between Li metal and LLZ led to a large overall impedance of about 2100 $\Omega \cdot cm^2$. In contrast, with in situ formed lithiated Si, the impedance was sharply decreased to 400 $\Omega \cdot cm^2$, which is five times lower than that of cells using bare LLZ. These results indicate that the interface between Li metal and LLZ was greatly improved.

The cell with Si-coated LLZ also exhibited stable plating/stripping performance, as shown in FIG. 5d. The cell was first tested at 0.05 mA/cm² (10 minutes for each step), where the voltage profiles showed flat and stable plateau, indicating the stable plating and stripping. When the current density was increased to 0.1 mA/cm² (5 minutes for each step), the plateau remained flat. After cycling for 225 hrs, the voltage profiles were still stable, suggestive of a great cycling performance. When the plating/stripping capacity was increased, the stable cycling performance was maintained well, as confirmed in FIG. 5e. However, cells with bare LLZ delivered a poor performance, where unstable voltage profiles and very limited cycles were obtained.

Figure 6:
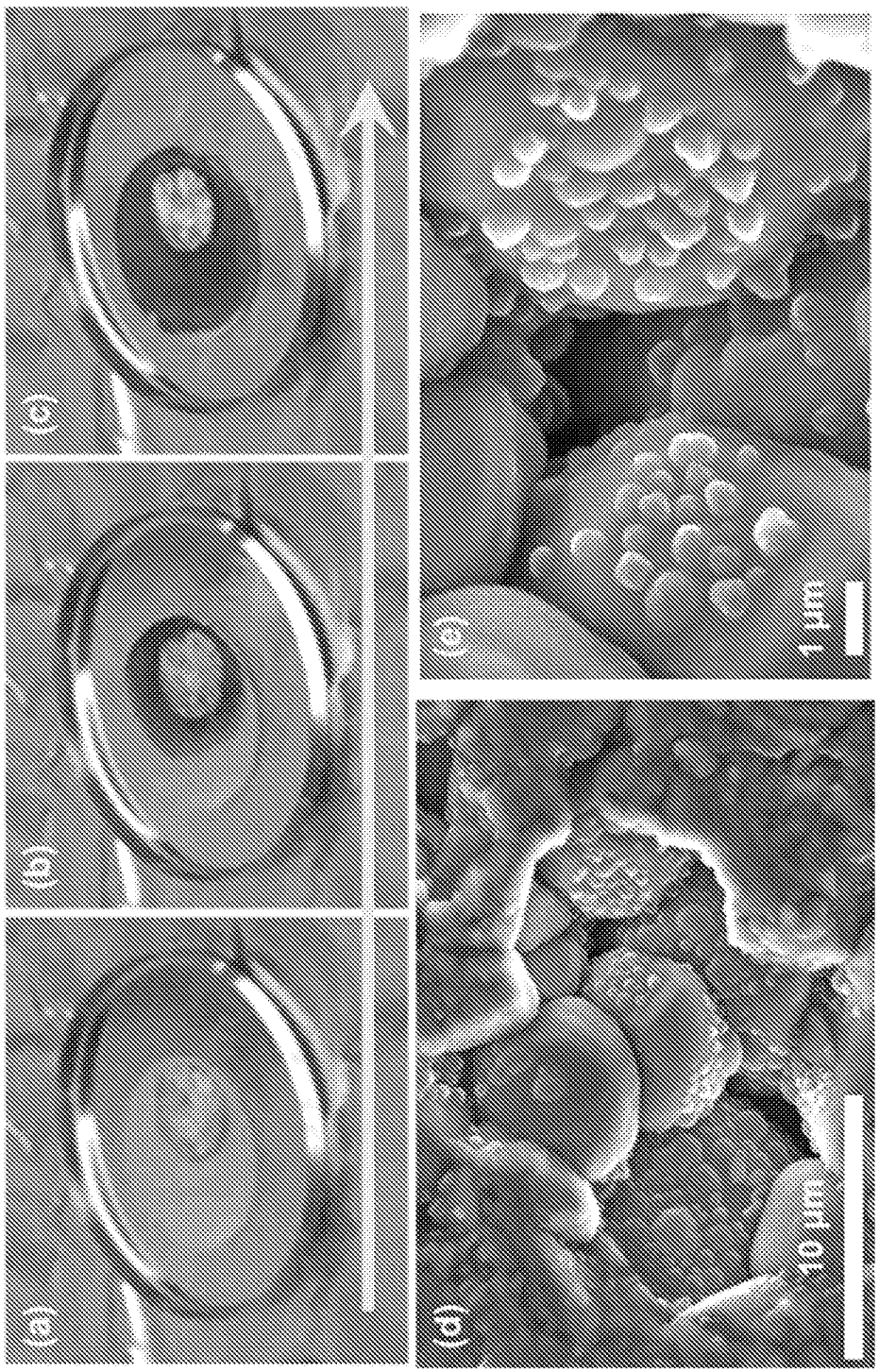
FIG. 6 shows structural evolution of Si-coated LLZ upon lithiation by molten Li. Si-coated LLZ before (a) and after lithiation (b-c). (d-e) SEM images show that lithiated Si can be found on the surface of Si-coated LLZ. (f) XRD patterns of Si-coated LLZ before and lithiation, indicating the existence of lithiated Si. (g) Theoretical calculation of the much enhanced interfacial contacts between LLZ and Li metal anode by Si coating and in situ formation of lithiated. Calculated mutual reaction energy $\Delta E_{D,\ mutual}$ of LLZ and lithiated Si interfaces.
Figure 6:
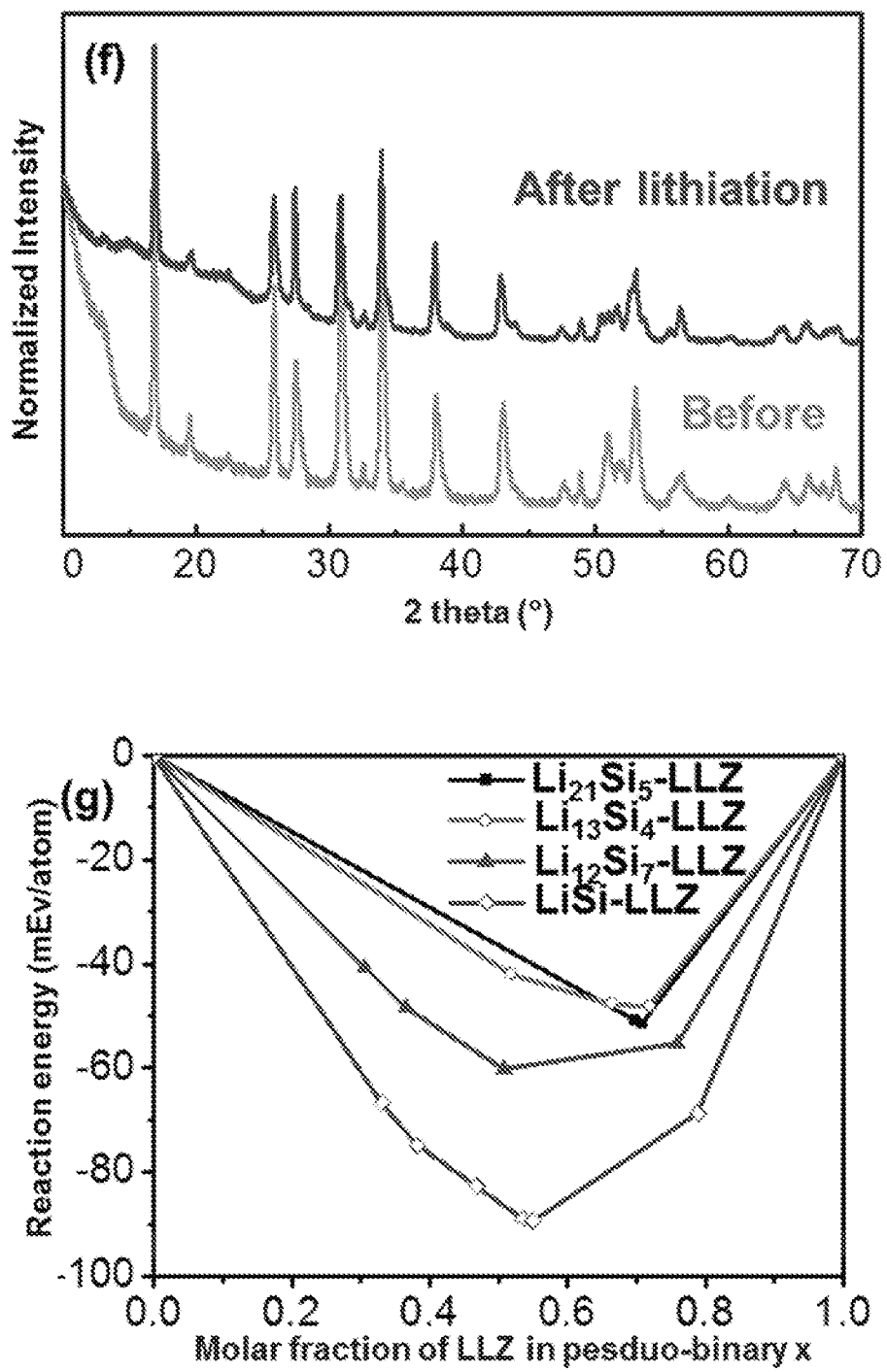

The above electrochemical behaviors show that the interface between Li metal and LLZ were greatly improved by the in situ formed lithiated Si interface and resulted in a stable plating/striping process. We noticed that reaction between molten Li and Si is spontaneous and lithiated Si are both Li-ion and electron conductor (about 3.5 orders of magnitude higher than Si). To demonstrate the high Li-ion conductivity of the lithiated Si, we performed an experiment where a Li metal disc was stuck onto Si-coated LLZ and put on a hot plate (FIG. 6a). When Li metal started to melt, the area of Si-coated LLZ near Li metal changed from orange to black (FIG. 6b), indicating the lithiation process of Si. Interestingly, all the surface became black, which suggests the reaction occurred on Si-coated LLZ even though it did not contact directly with Li metal (FIG. 6c). SEM and EDX elemental mapping images taken from the left edge of LLZ exhibited the morphology change of Si-coated LLZ before (FIG. 3f) and after lithiation (FIGS. 6d and 6e). XRD patterns also showed some peaks from lithiated Si, further proving the successful lithiation of Si (FIG. 6f). Clearly, lithiated Si can conduct Li ion effectively, which can serve as a perfect interface between Li/LLZ.

We then conduct first principles calculations to investigate the interface stability between LLZ and the formed lithiated Si according known techniques. By considering the interface as a pseudo-binary of lithiated Si and LLZ, the most thermodynamically favorable interphases were identified and the mutual reaction energy to form these interphases was calculated. We found that the mutual reaction energies are in the range of −90~−40 meV/atom (FIG. 6g and details in Table 1), which indicates that lithiated Si and LLZ should have good stability. Such limited amount of interfacial reaction indicates the potential kinetic stabilization and the absence of significant interfacial degradation as observed in other SSEs. In addition, such minor reactions could also greatly improve the wettability at the interface. Therefore, the interface between lithiated Si and garnet SSE may exhibit both good wettability and chemical stability, which enhance interfacial contacts and reduce the interfacial resistance.

TABLE 1

The phase equilibria and decomposition energies of the LLZ and lithiated Si interface. Ratio x is the molar fraction of LLZ in the pseudo-binary composition (The parent composition of LLZ and lithiated Si are already normalized to one atom per formula).

| Ratio x | $\Delta E_{D,mutual}$ (meV/atom) | Phase Equilibria |
|---|---|---|
| (a) LLZ and $Li_{21}Si_5$ | | |
| 0.698 | −50.89 | $ZrSi$, $La_2O_3$, $Li$, $Li_2O$ |
| 0.708 | −51.49 | $ZrSi$, $Zr_5Si_4$, $La_2O_3$, $Li_2O$ |
| (b) LLZ and $Li_{13}Si_4$ | | |
| 0.519 | −41.91 | $ZrSi$, $LaSi_2$, $LaSi$, $Li_2O$ |
| 0.664 | −47.68 | $ZrSi$, $LaSi_2$, $La_2O_3$, $Li_2O$ |
| 0.719 | −48.14 | $ZrSi$, $La_2O_3$, $Li_2O$, $Li_8SiO_6$ |
| (c) LLZ and $Li_{12}Si_7$ | | |
| 0.306 | −40.53 | $ZrSi$, $LaSi_2$, $Li_4SiO_4$, $Li_{13}Si_4$ |
| 0.366 | −48.39 | $ZrSi$, $LaSi_2$, $Li_8SiO_6$, $Li_{13}Si_4$ |
| 0.508 | −60.09 | $ZrSi$, $LaSi_2$, $Li_2O$, $Li_8SiO_6$ |
| 0.759 | −55.2 | $ZrSi$, $La2O3$, $Li_2O$, $Li_8SiO_6$ |
| (d) LLZ and LiSi | | |
| 0.331 | −66.6 | $ZrSi_2$, $LaSi_2$, $Li_4SiO_4$, $Li_{12}Si_7$ |
| 0.382 | −74.74 | $ZrSi$, $LaSi_2$, $Li_4SiO_4$, $Li_{12}Si_7$ |
| 0.468 | −82.69 | $ZrSi$, $LaSi_2$, $Li_4SiO_4$, $Li_{13}Si_4$ |
| 0.535 | −88.85 | $ZrSi$, $LaSi_2$, $Li_8SiO_6$, $Li_{13}Si_4$ |
| 0.55 | −89.26 | $ZrSi$, $LaSi_2$, $Li_2O$, $Li_8SiO_6$ |
| 0.789 | −68.67 | $ZrSi$, $La_2O_3$, $Li_2O$, $Li_8SiO_6$ |

Thus, it will be recognized from the foregoing that we developed, for the first time, a thin layer of amorphous Si on LLZ for improving the Li metal/LLZ interface. The wettability of LLZ was dramatically changed from super-lithiophobicity to super-lithiophilicity due to the reaction between Li and Si, and the in situ formed Li—Si alloy. The resulting symmetric cells with Si-coated LLZ exhibited much smaller interfacial resistivity and stable plating/striping performance compared to bare LLZ. We believe that our route to solve the interface problem between Li metal and LLZ can also be extended to other solid-state electrolytes and all solid-state Li-batteries using Li metal as anode can take advantage of our findings, when given the benefit of the present disclosure.

Preparation of LLZ garnet pellet. The garnet solid state electrolyte with the following chemical composition was synthesized by a conventional solid-state-reaction: $Li_{6.85}La_{2.9}Ca_{0.1}Zr_{1.75}Nb_{0.25}O_{12}$ (LLZ). The starting materials were LiOH (Alfa Aesar, 99.9%), $La_2O_3$ (Alfa Aesar, 99.9%), $CaCO_3$ (Alfa Aesar, 99.9%), $ZrO_2$ (Alfa Aesar, 99.9%), and $Nb_2O_5$ (Alfa Aesar, 99.9%). The precursor powder was ball milled, pelletized and calcined at 900° C. for 10 hrs. The as-calcined powder was ball milled again for 24 hrs, pressed into pellets using 80 MPa and sintered at 1050° C. for 12 hrs. 10 wt. % of excess LiOH was added to compensate for Li loss during synthesis.

PECVD amorphous Si coating. All the LLZ pellets were carefully polished and stored in an Argon filled glovebox. The amorphous Si was deposited onto the LLZ pellet by a plasma-enhanced chemical vapor deposition (PECVD) system (Oxford Plasmalab System 100). A gas mixture of silane ($SiH_4$, 5%) and $N_2$ (95%) was introduced into the reaction chamber. The process parameters are listed below:
Power RF: 13.56 MHz, 10 Watts
Pressure: 2000 mt.
Temperature: 300° C.
The deposition rate was determined to be 15 nm per min using a Si wafer. In this study, the deposition time is 40 seconds and the thickness of amorphous Si is 10 nm.

Characterization and Electrochemical measurements. XRD patterns were recorded using a D8 Advanced (Bruker AXS, WI, USA). SEM images were taken using a Hitachi SU-70 field emission scanning electron microscopy. To make the Au/LLZ/Au Li-ion blocking cell, Au paste was coated on both sides of polished LLZ pellets and cured at 700° C. in air. The cell was measured using a Solatron 1260 impedance analyzer from 25° C. to 150° C. EIS measurements were conducted with an AC amplitude of 100 mV and a frequency range from 10 MHz to 10 Hz.

To make Li/LLZ/Li or Li/Si-coated LLZ/Li symmetric cells, Li metal electrodes were coated onto both sides of LLZ or Si-coated LLZ pellets. The cells were cured at 200° C. for 20 minutes and then cooled to room temperature. EIS measurements of the symmetric cells were conducted at room temperature with an AC amplitude of 100 mV and a frequency range from 1 MHz to 0.1 Hz using a Biologic multi-channel workstation. The plating/striping tests were carried out by cycling the cell at room temperature on the Biologic multi-channel workstation. Note that all cells were fabricated and tested in an Ar-filled glovebox.

Figure 9:
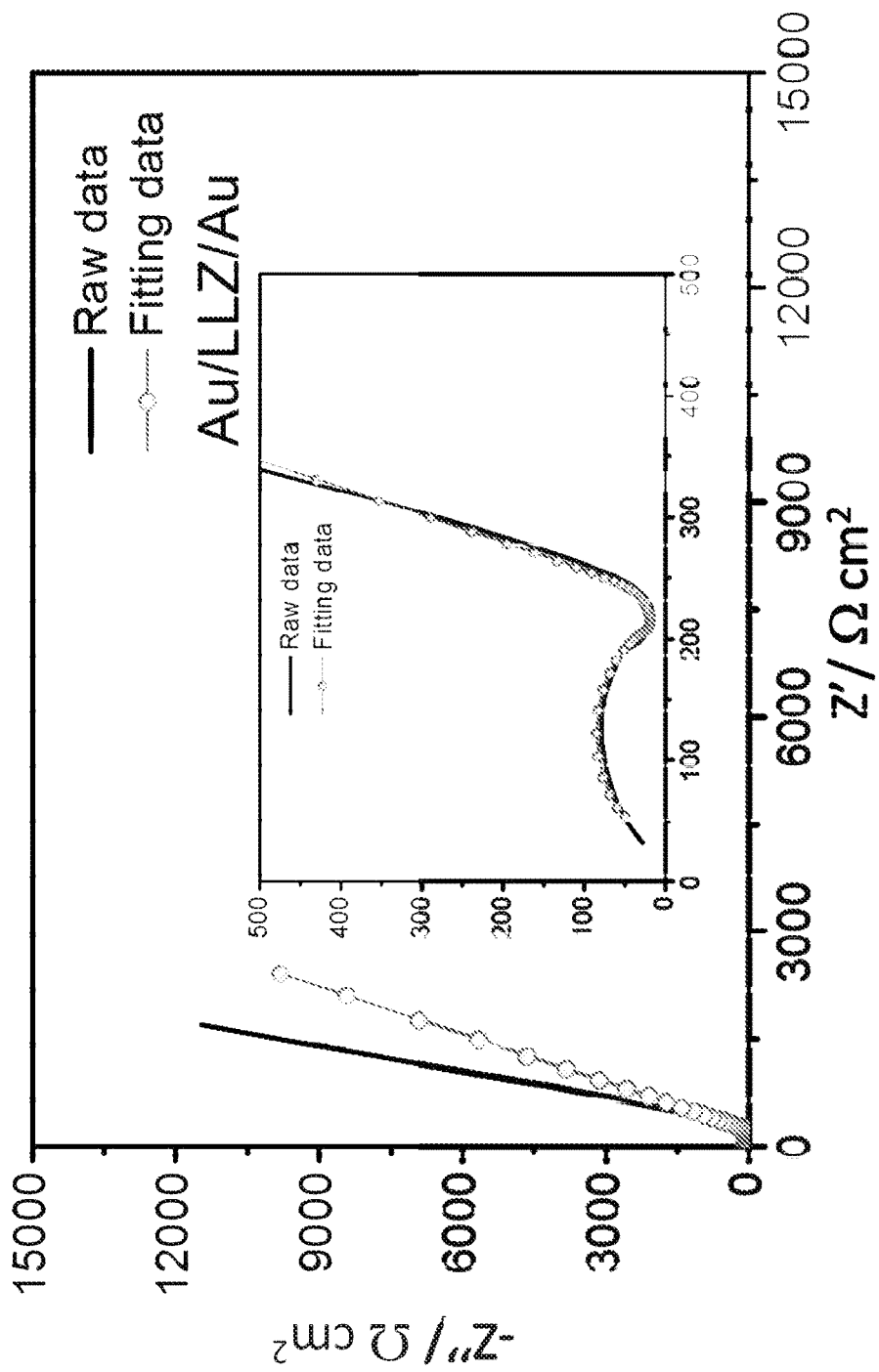
FIG. 9 shows Nyquist plots of the Au/LLZ/Au symmetric blocking electrode system at room temperature. The solid black line denotes the experimental data while the line with hollow spheres represents the fitting data using the equivalent circuit modeling (FIG. 10c).
Figure 10:
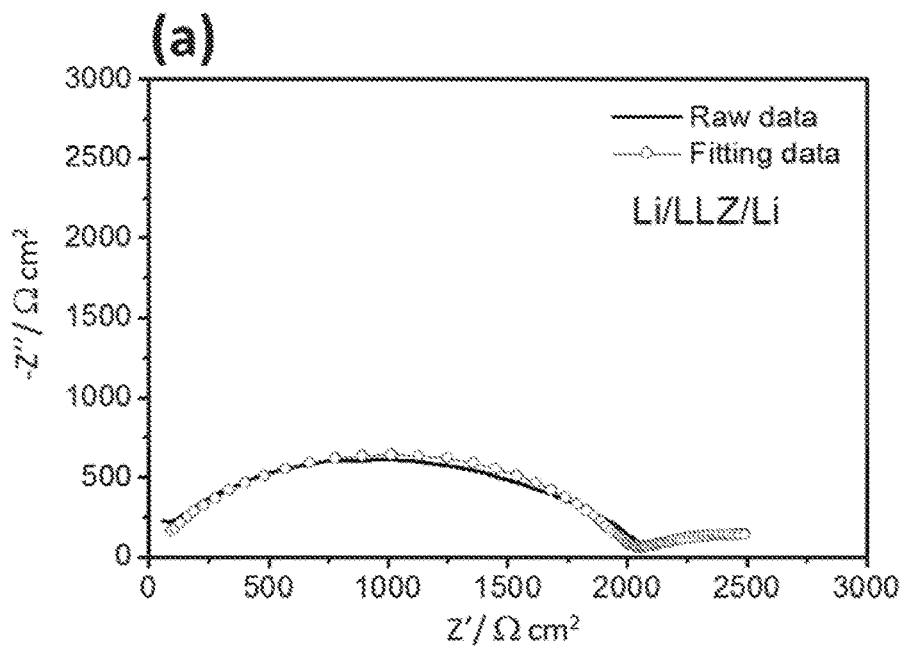
FIG. 10 shows Nyquist plots of (a) Li/LLZ/Li and (b) Li/Si-coated LLZ/Li symmetric cells. (c) The equivalent circuit model used in this study.
Figure 10:
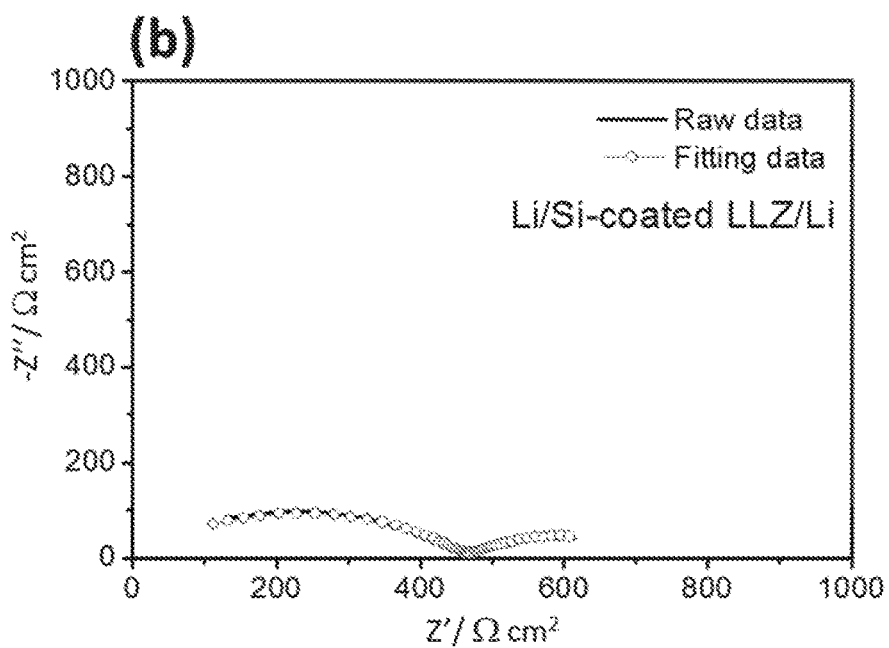
Figure 10:
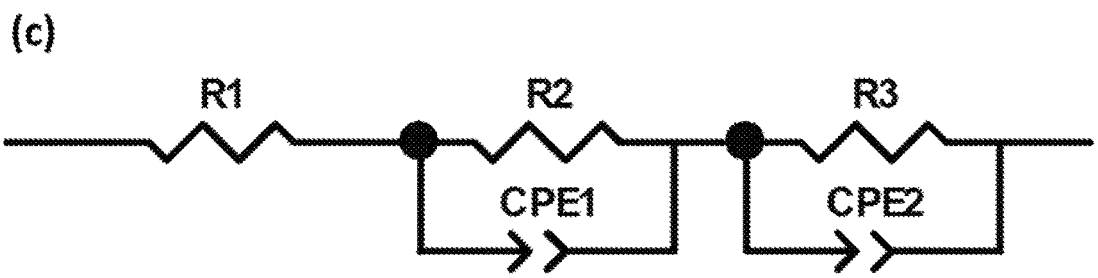
Figure 11:
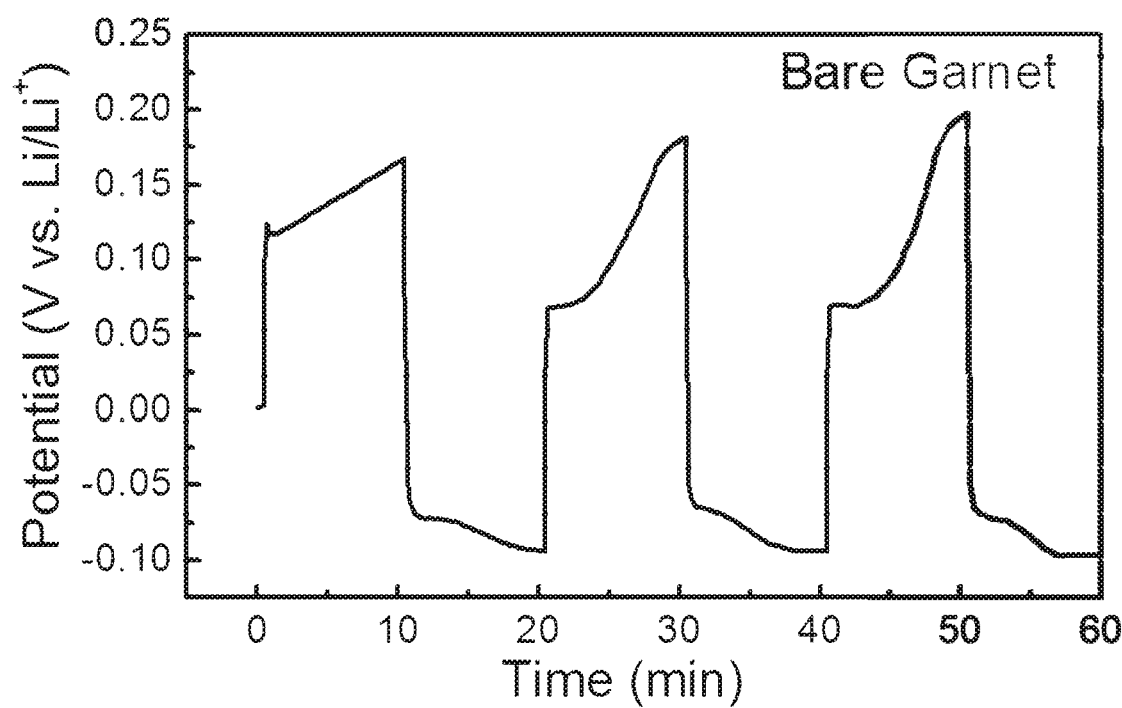
FIG. 11 shows electrochemical plating/striping performance of a Li/bare LLZ/Li symmetric cell at a current density of 0.05 mA/$cm^2$. The voltage hysteresis is large and the plating/striping curves are unstable, which indicates that a large interfacial resistance between the Li metal and the bare LLZ is present.

Calculations of the interfacial resistance between Li and LLZ. In this study, the first semi-circle at relatively high frequency was used to analyze the interfacial resistance between the Li metal electrode and the LLZ solid electrolyte with/without Si coating. As shown in FIG. 9, the overall resistance of the LLZ (bulk and grain boundary) measured using Au electrodes is 215 Ω·$cm^2$. As shown in FIG. 10a, the first semi-circle of the Li/LLZ/Li cell yields a resistance of 2064 Ω·$cm^2$, which can be divided into two parts: one is the resistance of the LLZ (bulk and grain boundary) and the other is the Li metal-LLZ interfacial resistance. Thus, the overall Li metal-LLZ interfacial resistance is 1849 Ω·$cm^2$. Since two Li metal-LLZ interfaces are present in the Li/LLZ/Li symmetric cells, the single Li metal-LLZ interfacial resistance is approximately 925 Ω·$cm^2$. On the other hand, the Si-coated LLZ cell displays a much smaller resistance of 469 Ω·$cm^2$ in the first semi-circle. By subtracting the resistance of the LLZ (215 Ω·$cm^2$) and dividing by a factor of two, the Li metal/Si-coated LLZ interfacial resistance can be calculated: 127 Ω·$cm^2$, which is about 7.3 times lower than bare LLZ.

EXAMPLE 2

This example provides a description of metal-alloy layers of the present disclosure and methods of making such layers.

Tin was used as the alloy material with lithium to improve the wettability with garnet. There are several reasons to use tin as the alloy materials: (1), Tin has very low melting temperature (231.9° C.), which will be easier to alloy with lithium at relative low temperature (<300° C.); (2), the solution precursor, $SnCl_2$, can decompose to Sn metal at around 600° C., which offers an easy way to deposit Sn into a porous garnet in situ. (3), Tin itself is an anode materials with a very high theoretical specific capacity of 994 mAh/g.

Due to the big difference of surface energy between garnet solid electrolyte and lithium metal, the wettability of garnet surface to melt lithium is very poor, which leads to huge interface resistance for the lithium anode side. In order to improve the surface wettability of garnet, surface modification is necessary. In this work, the solution process was developed to improve the surface property of garnet solid state electrolyte. Compare with the other surface modification techniques, such as ALD or CVD, solution process is much easier to conduct. Moreover, solution can also access to the porous structure very easily, which offers a facile way to infiltrate lithium into the porous garnet layer.

Figure 12:
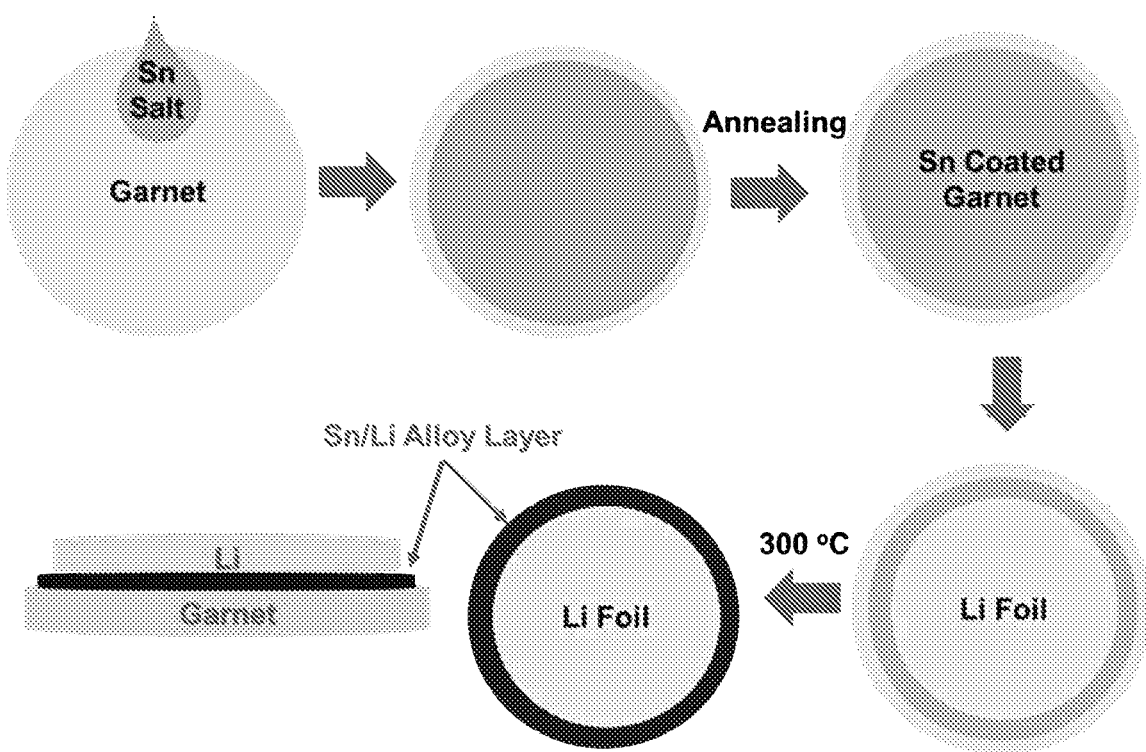
FIG. 12 shows a schematic of solution process for surface modification of garnet.

The schematic in FIG. 12 shows the steps for surface modification of garnet with solution process. Specifically, 5 mg/ml $SnCl_2$ in Dimethylformamide (DMF) salt solution was dropped onto the garnet surface and dried at ~100° C. to make the uniform coating layer. Then, the surface coated garnet will be annealed in argon filled glovebox, at ~600° C. for half an hour, where $SnCl_2$ will decompose to Sn metal layer. Finally, a thin lithium foil was placed onto the Sn coated garnet surface, which will melt and alloy with Sn at 300° C.

Figure 13:
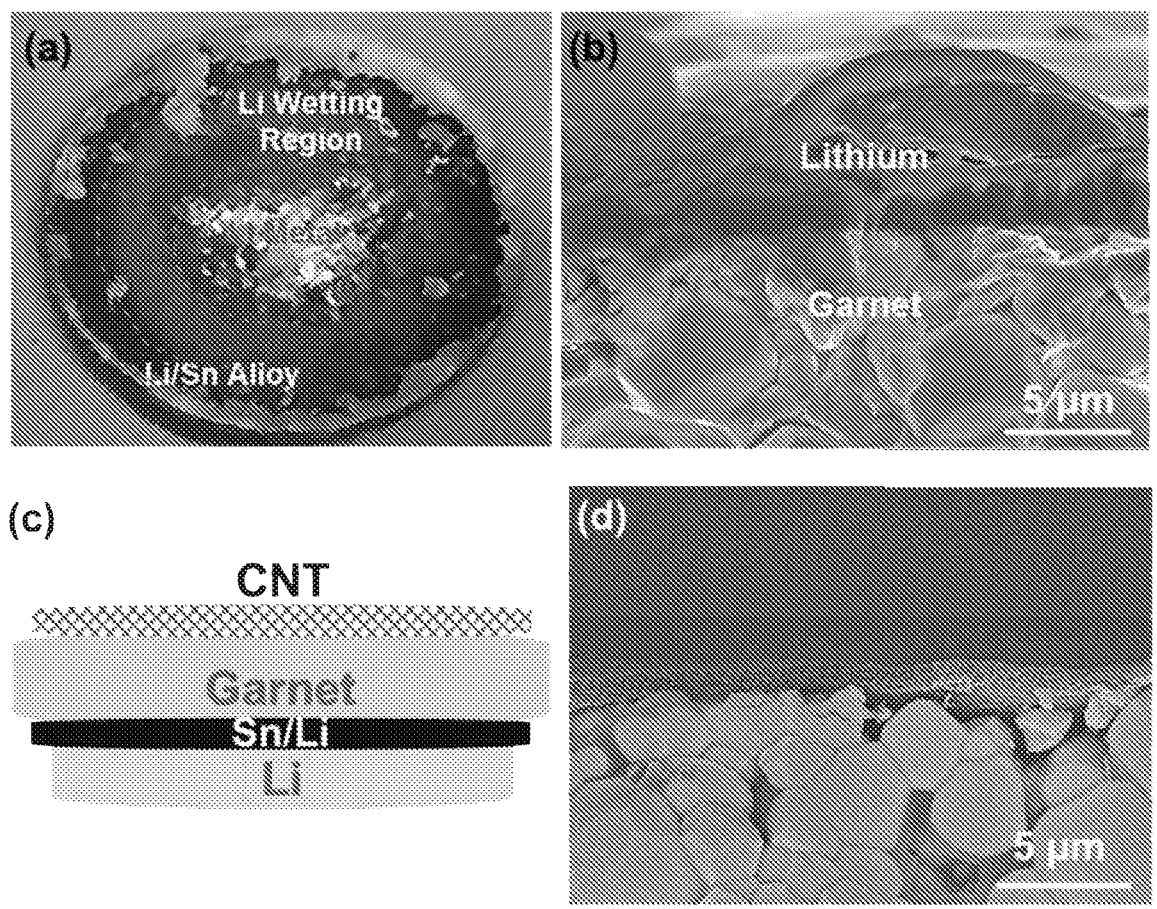
FIG. 13 shows (a) Li wetted Sn modified dense garnet. (b) Cross-section SEM images of Li wetted garnet. (c) Schematic of Li-CNT asymmetric stripping-plating half-cell. (d) Cross-section SEM image of CNT coated garnet.

FIG. 13a, 13b are a picture and an SEM image of Li wetted Sn modified garnet, respectively. From the picture, we can clearly see that Li and Sn can form the black alloy area at the edge. In the center area, lithium shows a small wetting angle with garnet surface, while the area between the edge and the center is the further lithiation region. From the cross-section SEM image (FIG. 13b), we can further see the good continuous wetting interface of lithium and garnet.

To further study the interface stability during the electrochemical process, a Li-CNT asymmetric half-cell was used to conduct the plating-stripping study. As FIG. 13c shows, after lithium was melted onto one side of the garnet solid state electrolyte, a thin layer carbon nanotubes (CNTs) was coated onto the other side using the solution process. The well dispersed P3 CNTs in N-Methyl-2-pyrrolidone (NMP) solution made the coating very uniform. From the SEM image in FIG. 13d, it can be seen that the uniform CNT layer is around 1 µm thick. During the plating-stripping process, this thin layer CNT acts as the current collector.

Figure 14:
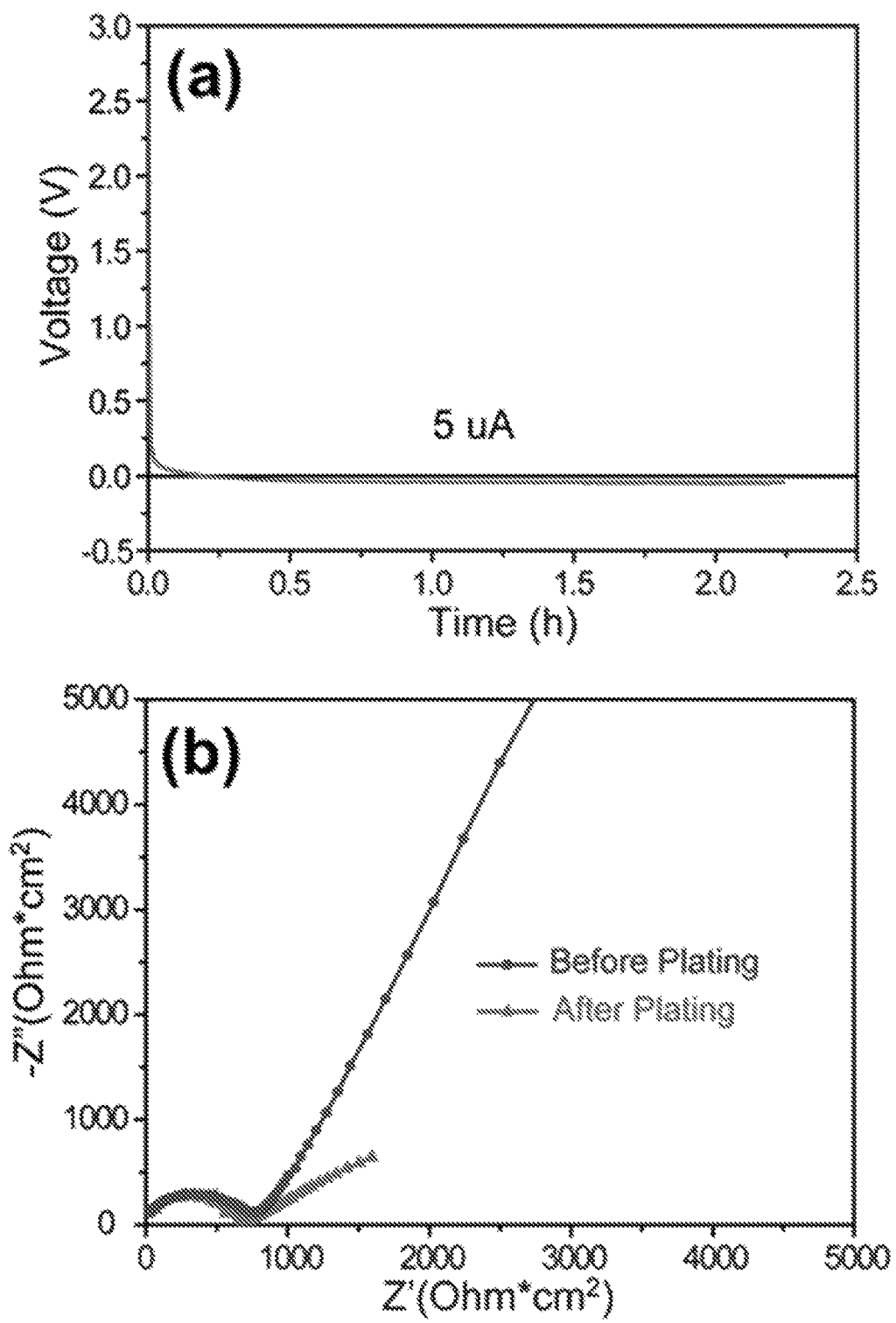
FIG. 14 shows (a) the voltage profile of Li-CNT half-cell when lithium was plated onto the CNT layer. (b) The corresponding EIS spectra of Li-CNT half-cell, before and after plating lithium, respectively. (c, d) The SEM images of CNT layer, before and after plating lithium. (e) Continuous symmetric plating-stripping voltage profile. The inset is the zoom in of two cycles.
Figure 14:
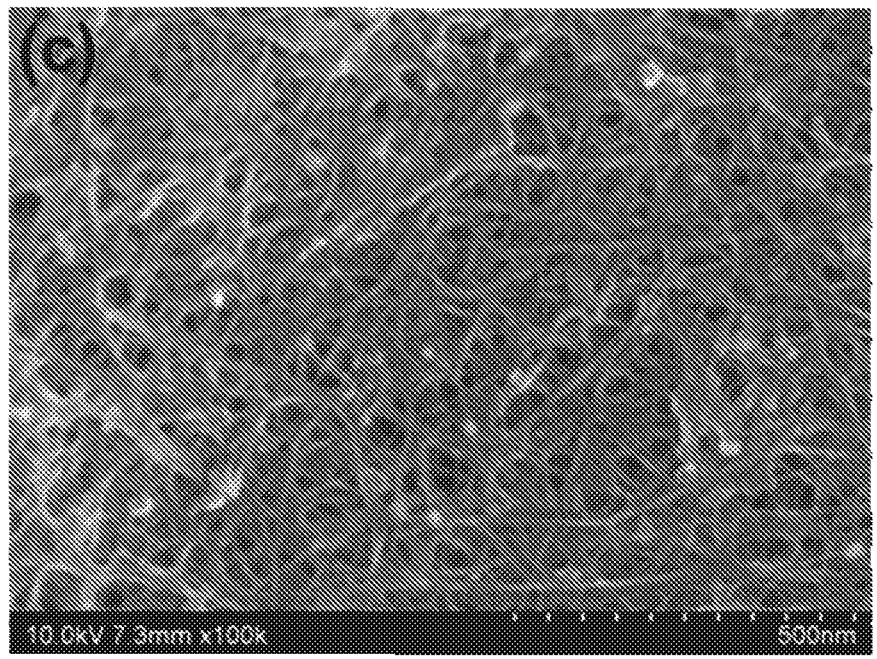
Figure 14:
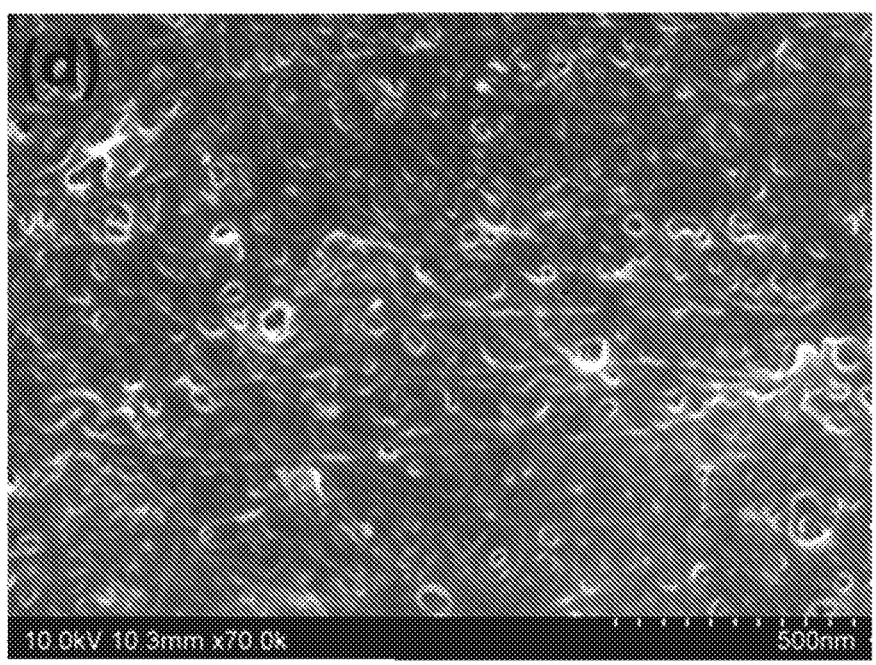
Figure 14:
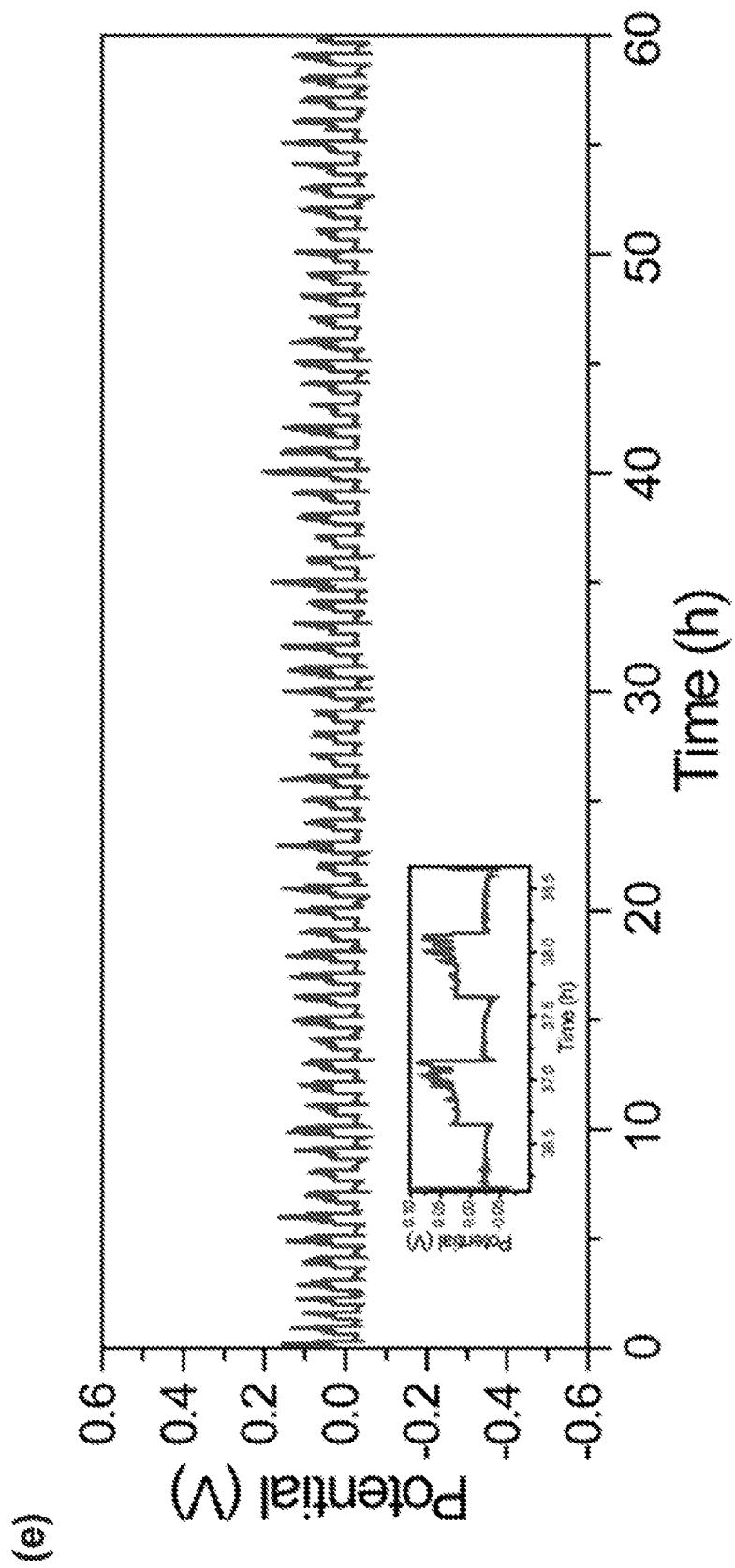

Before the symmetric plating-stripping process, a specific amount of lithium was plated onto the CNT side, since the pristine CNT layer did not contain any lithium. As FIG. 14a shows, the Li-CNT half-cell has an initial open circuit voltage ($E_{oc}$) of around 2.7 V.

When the lithium started plating onto the CNT layer at a constant current (5 µA), the potential drops quickly to negative then keeps almost constant, which means the lithium was continuously deposited onto the CNT layer. This process can be also seen from the change of the EIS spectra in FIG. 14b. Before lithium was plated to CNT layer, the EIS spectrum has a very long diffusion tail at low frequency region, due to the blocking effect of CNT to lithium. After lithium was deposited onto the CNT layer, the Li-CNT asymmetric cell will change to Li—Li symmetric cell, where the diffusion tail becomes much shorter. From the SEM images shown in FIGS. 14c and 14d, we can further see that lithium was plating into the pores inside the CNT layer and form a uniform composite structure with CNT.

To further analyze the stability of the interface between lithium and garnet solid state electrolyte, a continuous symmetric plating-stripping experiment was conducted after lithium was plated onto the CNT layer. The voltage profile of plating-stripping is shown in FIG. 14e. From the profile, we can see the stripping process (positive voltage) is a little bit noisy comparing with the plating part (negative voltage), which can be explained by the poor contact between CNT layer and garnet surface. Even visually the CNT layer was coated uniformly and stuck very well on the garnet surface, due to the nanowire structure, however, CNT layer has lots of point contact with garnet surface at micro-scale. Compare with the continuous wetting interface between lithium and garnet (FIG. 13b), the point contact make the interface between CNT and garnet not as good. When lithium was stripped from CNT side, the point contact may get even worse so that the voltage profile has those noisy peaks. On the other hand, when lithium was plated onto CNT side, since the interface between lithium and garnet is continuous and uniform (FIG. 13b), lithium can cross it very smoothly, which leads to a relatively constant voltage profile (FIG. 14e). After 60 hours plating-stripping, the voltage profile almost keeps same, which means the interface between lithium and garnet is very stable during the plating-stripping process.

Figure 15:
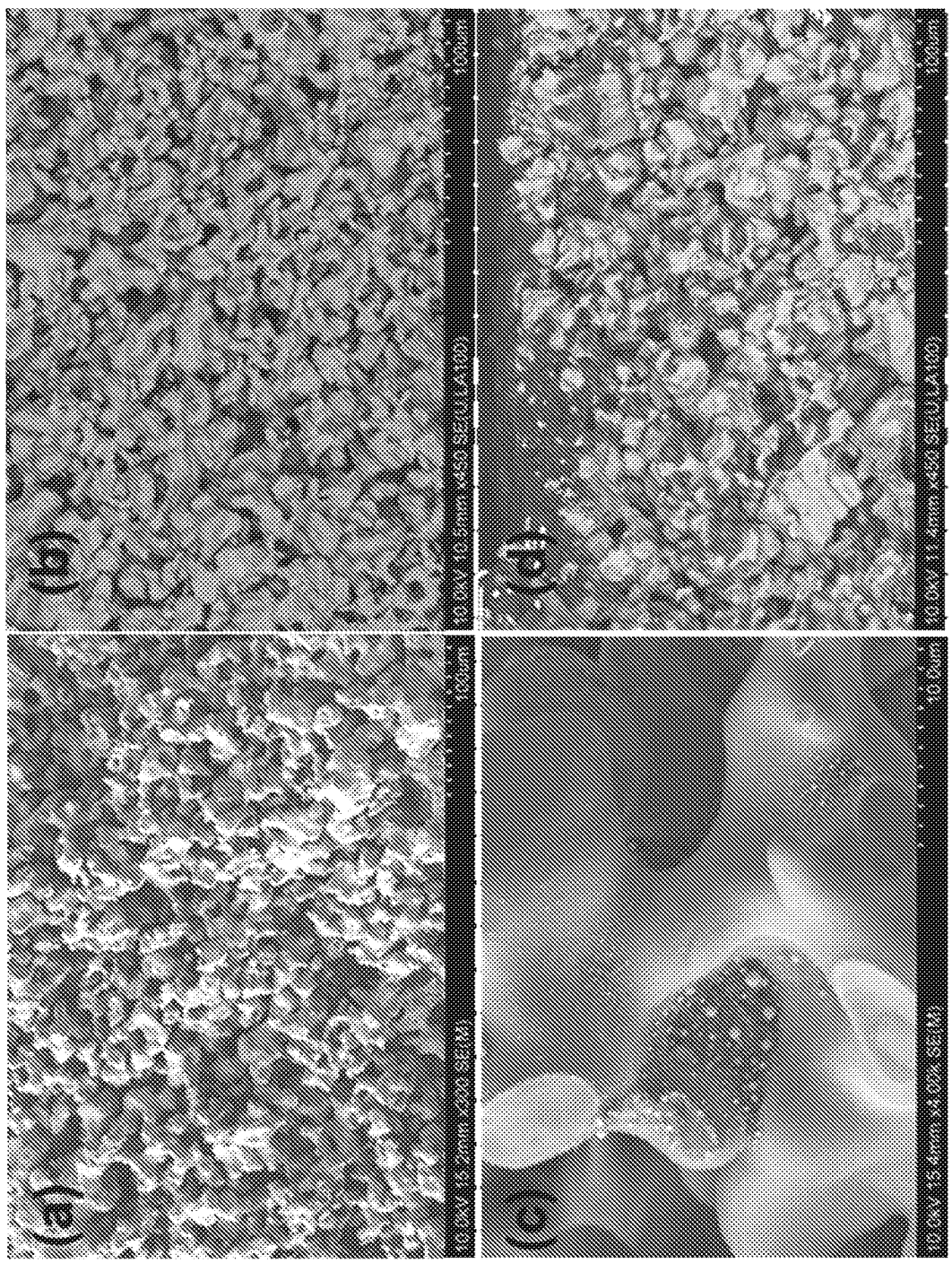
FIG. 15 shows SEM images of lithium infiltration into porous garnet. (a) The back-scattering SEM image of pristine porous garnet. (b) The SEM images of porous garnet coated with Sn nanoparticle using solution process; and (c) the zoom in image. (d) The back-scattering SEM images of lithium infiltrated, Sn coated porous garnet.

Another advantage of solution process is that the solution can easily access into the porous structure due to the capillary effect, which will make the lithium infiltration possible into a porous garnet structure. Considering volume change of lithium anode during charge-discharge process of lithium battery, a structure support material is necessary to maintain the structure of the battery and the good contact between lithium anode and the electrolyte. For this reason, a porous solid state electrolyte would be a perfect support material for lithium anode, since it can offer more contact area for lithium while maintain the volume of anode. However, due to the large difference of surface energy between melt lithium and solid state electrolyte, it is very hard to infiltrate lithium into porous garnet directly. And for other surface modification techniques, it is not easy to coat porous structure. With the solution process provided by this disclosure, we can easily modify the inner porous structure uniformly. As FIG. 15b and c show, the Sn nanoparticles was coated uniformly inside the porous garnet. After this surface modification, the melt lithium was successfully infiltrated into the porous structure (FIG. 15d).

It will be recognized from the foregoing that we developed a surface modification technique using a solution process, which can improve the wettability of garnet for melt lithium significantly. The continuous, uniform interface between lithium and garnet is very stable during the plating-stripping process. Since the solution can easily access the pores, this surface modification technique can be also applied to the porous garnet solid electrolyte, where lithium can be infiltrated into the porous structure.

EXAMPLE 3

This example provides a description of a method to increase the Li wettability of a garnet surface.

To address the challenge that garnet solid electrolytes generally have poor contact with Li metal, which causes high resistance and uneven current distribution at the interface. challenge, we demonstrated a strategy to engineer the garnet solid electrolyte and Li metal interface by forming an intermediary Li-metal alloy which changes the wettability of the garnet surface (lithiophobic to lithiophilic) and reduces the interface resistance by over an order of magnitude: 950 ohm*cm$^2$ for the pristine garnet/Li and 75 ohm*cm$^2$ for the surface engineered garnet/Li. Li$_7$La$_{2.75}$Ca$_{0.25}$Zr$_{1.75}$Nb$_{0.25}$O$_{12}$ (LLCZN) was selected as the SSE in this example due to its low sintering temperature, stabilized cubic garnet phase, and high ionic conductivity. This low area specific resistance enables a solid-state garnet SSE/Li metal configuration. Described is a new way to address the garnet SSE wetting issue against Li and get more stable cell performances for lithium-ion and lithium-sulfur batteries towards the next-generation of Li metal batteries.

In this present example, we modify the garnet solid electrolyte and Li metal interface by forming an ultrathin, artificial intermediary Li-metal alloy layer to increase the Li wettability of the garnet surface. A low interfacial resistance of tens of ohm*cm$^2$ can be achieved, which approaches the current state-of-the-art Li-ion batteries. In our design, a thin layer of Al is introduced to form an ionically conducting Li—Al alloy that acts as an interfacial layer between the garnet SSE and Li metal anode. By forming a Li—Al alloy at the interface, the garnet surface becomes lithiophilic (Li metal wets the garnet surface) which provides good physical contact between the SSE and Li metal and decreases the area specific resistance (ASR), which is good for ion transport. In this way, the polarization is minimized and the interfacial resistance is stabilized. FIG. 1a schematically depicts the interface morphologies of the garnet electrolyte and Li anode. The pristine garnet SSE has poor contact with Li metal and gaps remain at the interface; however, the Al coating will alloy with the Li metal and enable the garnet SSE to be fully coated with Li metal. This engineered interface utilizes more of garnet's surface area and facilitates ion and electron transfer. With the Li—Al alloy interface, the interfacial resistance was reduced from 950 to 75 ohm*cm$^2$ at room temperature (20° C.). We also investigated the interfacial resistance as a function of temperature, and the results indicate that the interfacial resistance was greatly reduced at elevated temperatures. For example, the interfacial resistance was reduced to 30 ohm*cm$^2$ at 60° C. Galvanostatic Li stripping and plating in symmetric cells exhibited a flat voltage plateau, illustrating a stable interfacial resistance as Li diffuses back and forth through the Li—Al alloy interface.

Figure 16:
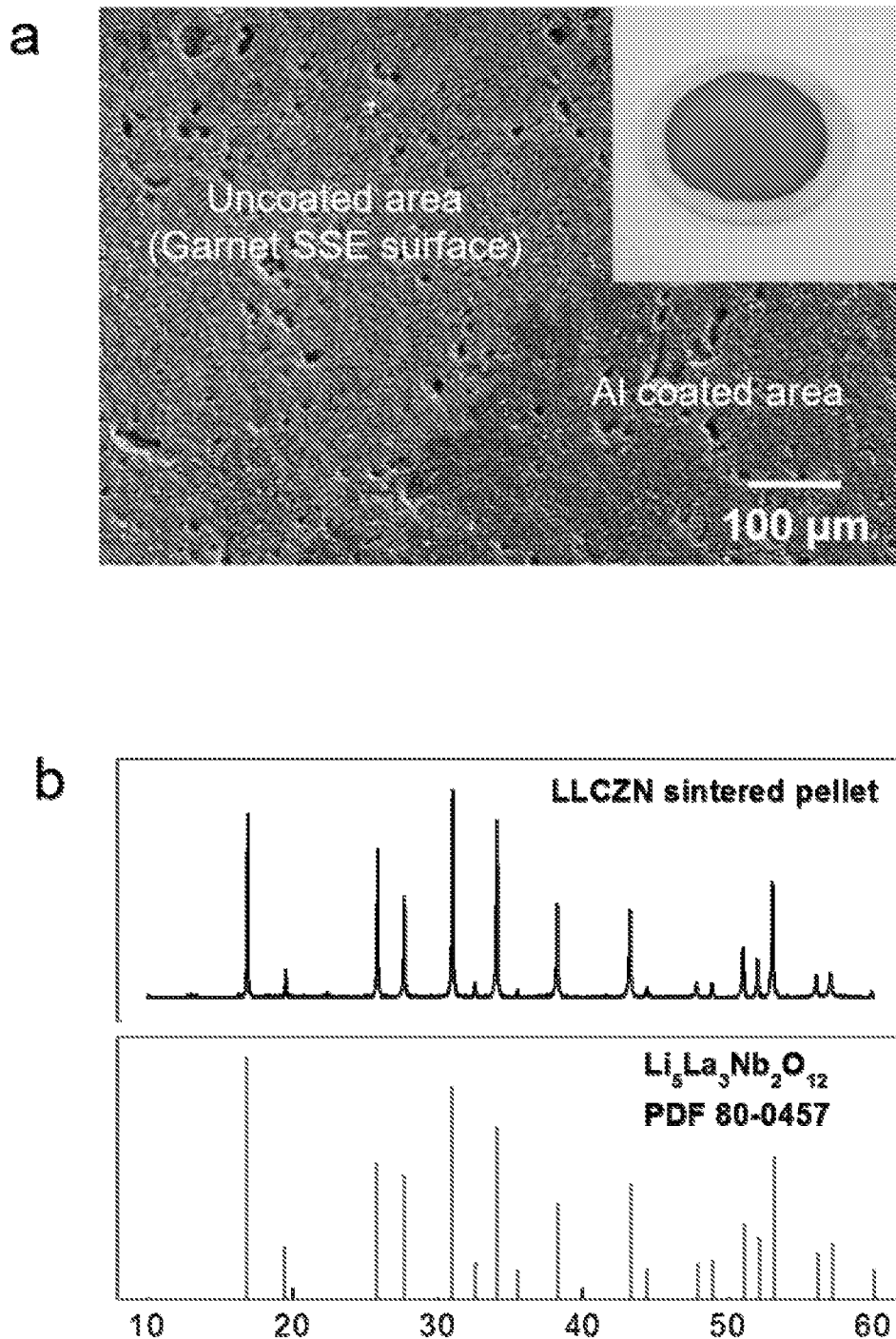
FIG. 16 shows characterization of LLCZN solid-state electrolyte. (a) SEM image of the surface morphology of the Al-coated LLCZN ceramic surface. Inset is a digital image of an Al-coated LLCZN ceramic disk. The yellow ceramic disk is coated by Al and appears grey in color. (b) XRD pattern of the as-synthesized LLCZN. (c) EIS profiles of the LLCZN at different temperatures. (d) Arrhenius plot of LLCZN conductivity.
Figure 16:
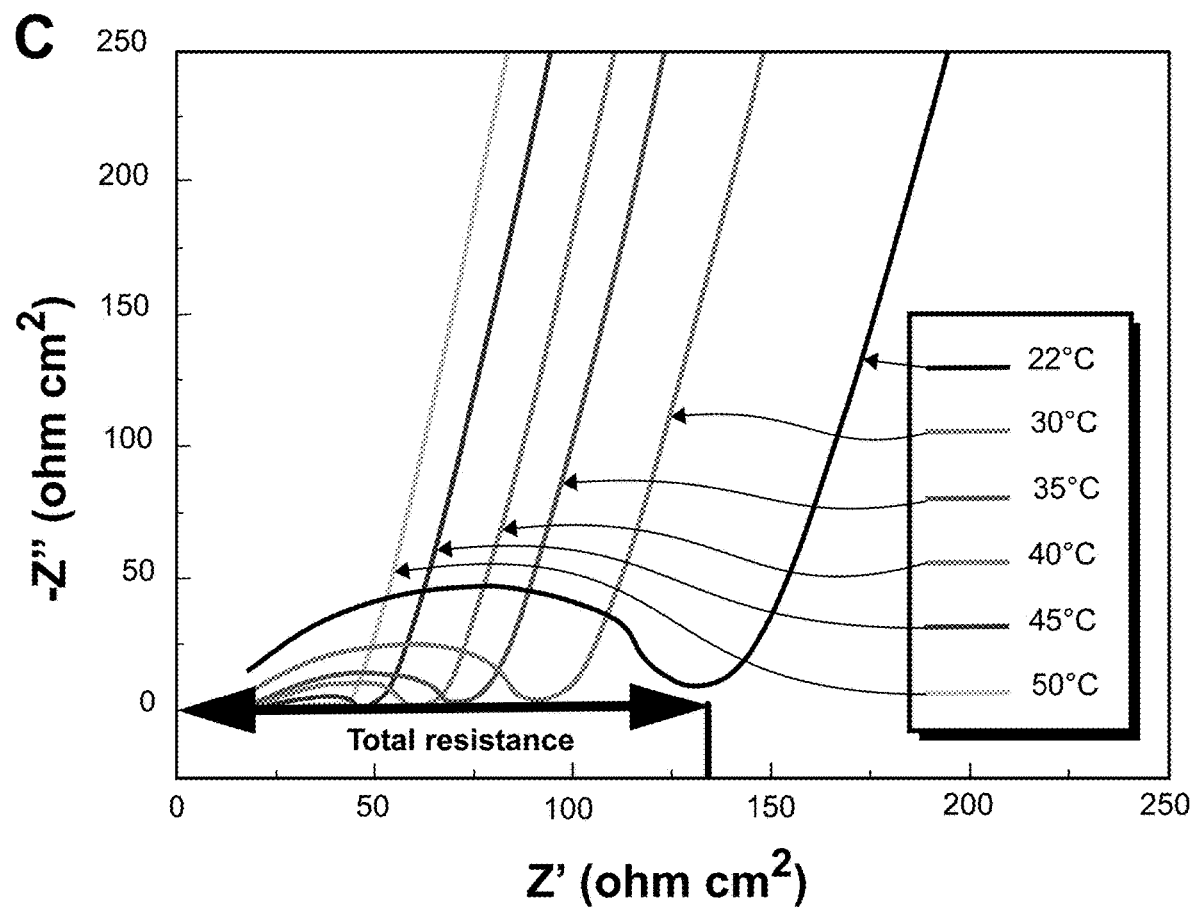
Figure 16:
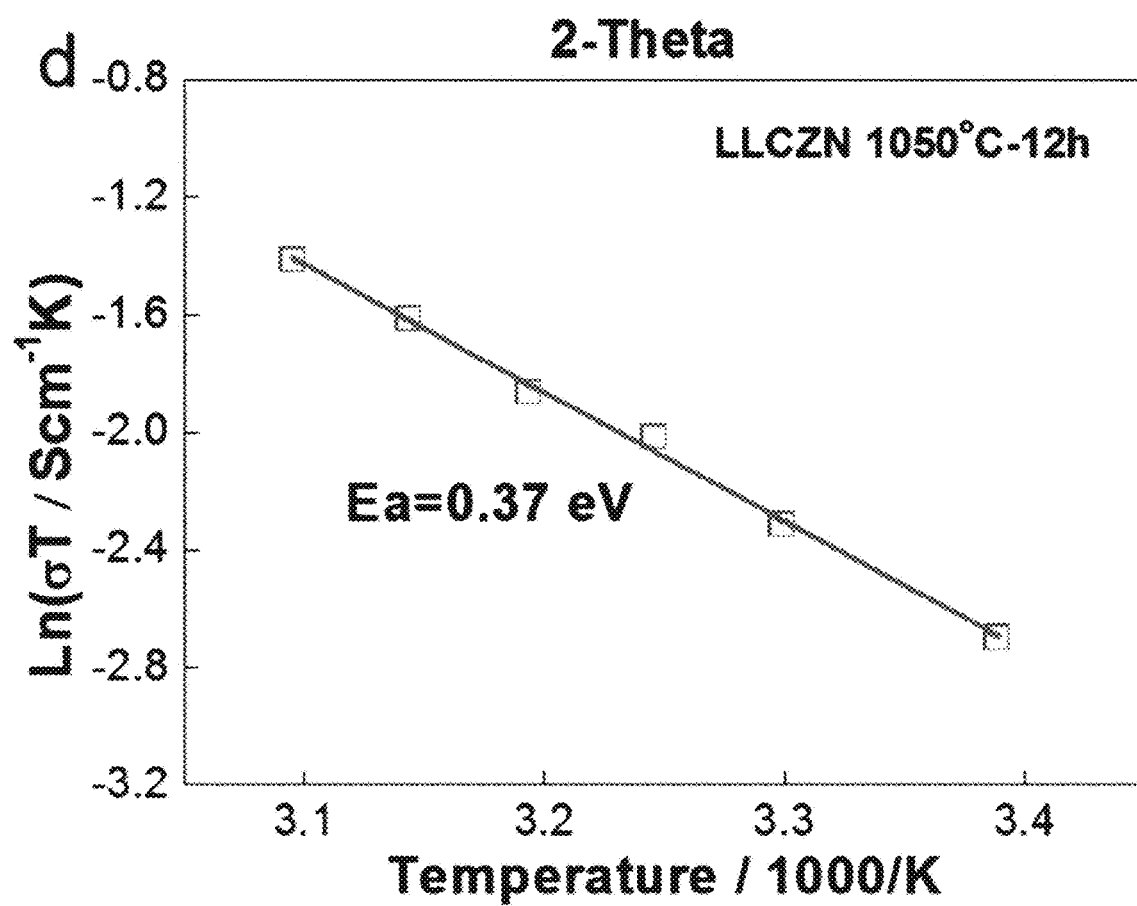
Figure 21:
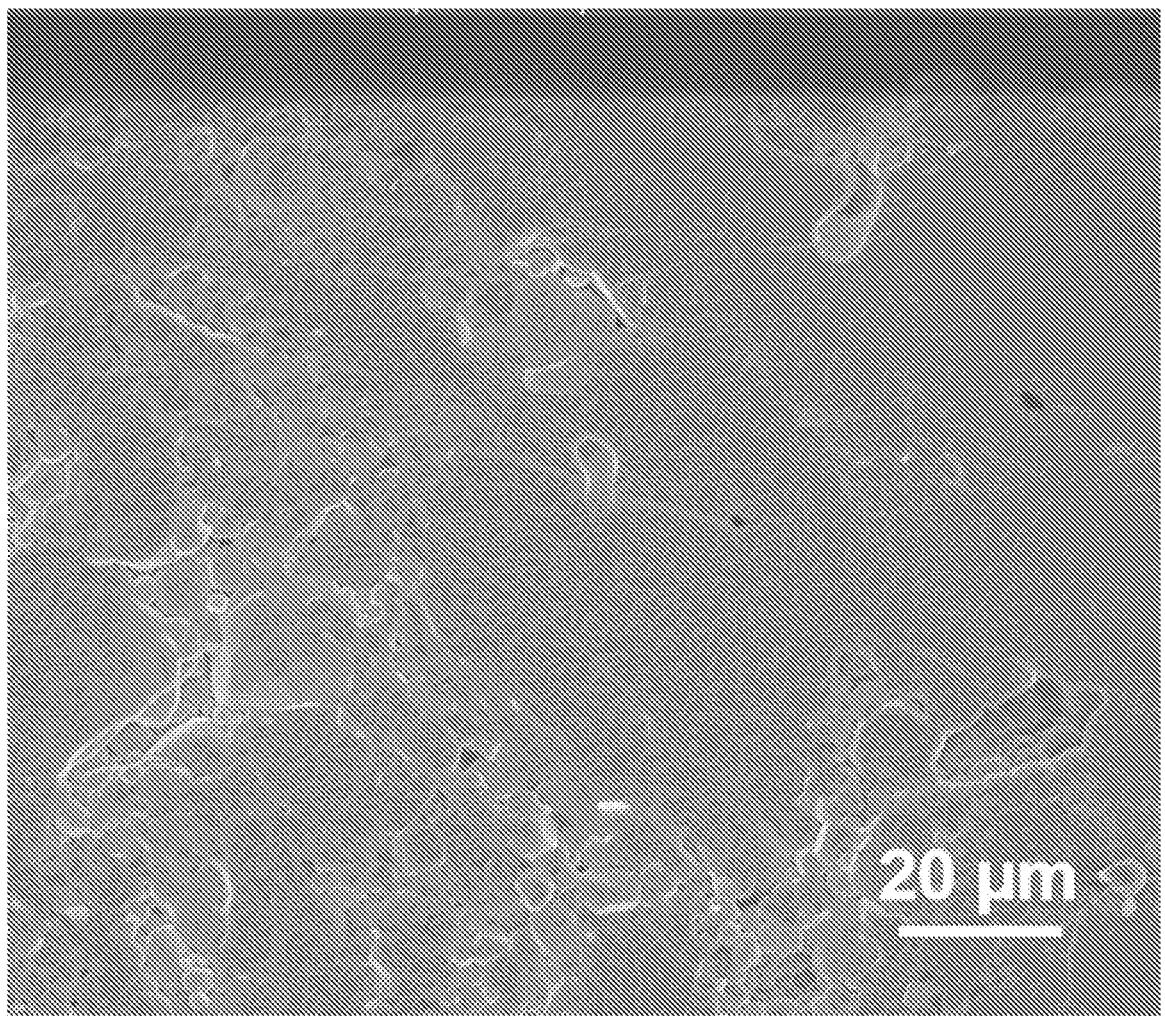
FIG. 21 shows a cross-section SEM of Garnet SSE. Micron-sized garnet grains were well sintered together to form a dense solid electrolyte.
Figure 22:
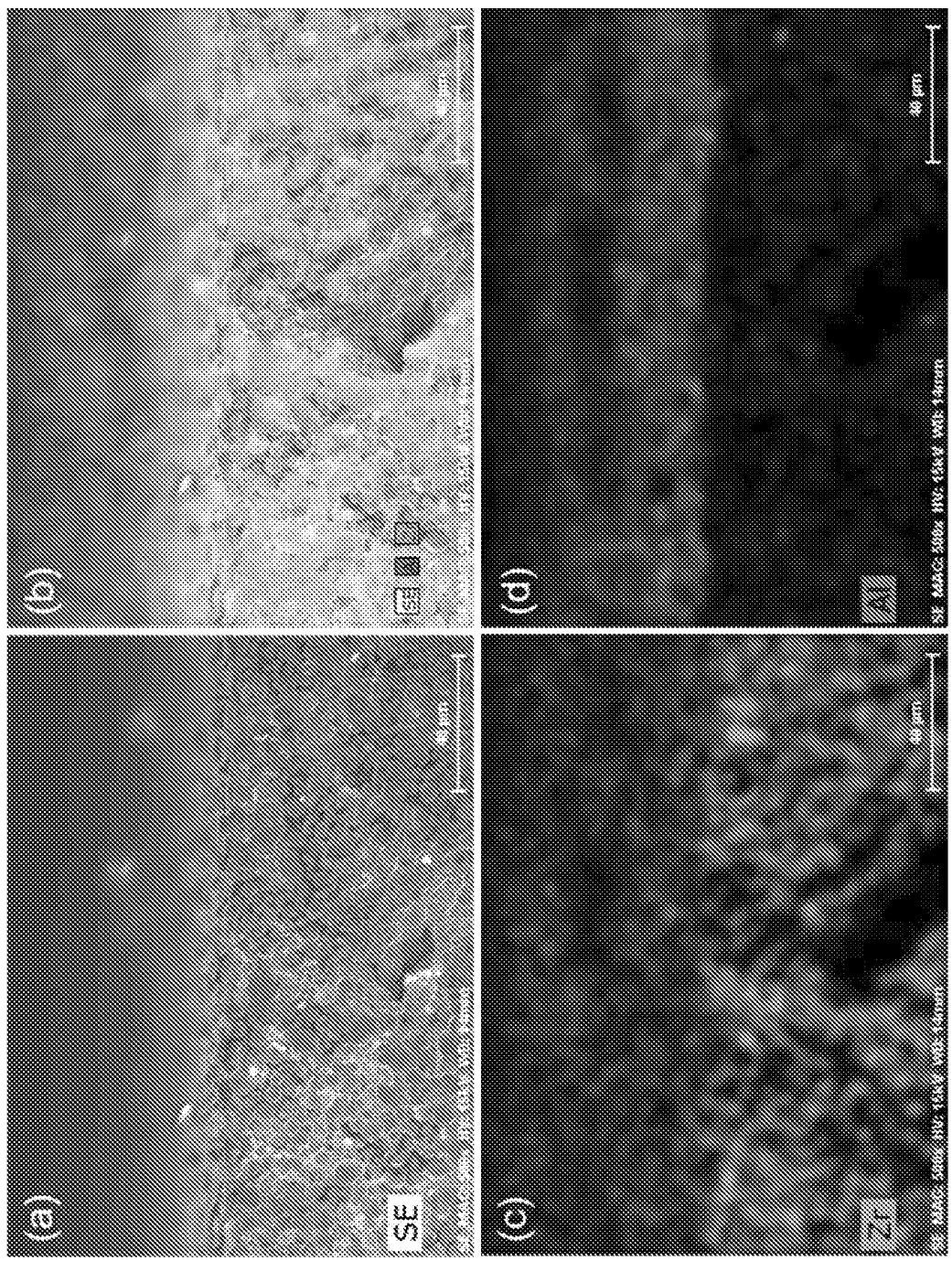
FIG. 22 shows a cross-section of Al coated garnet SSE pellet.
Figure 23:
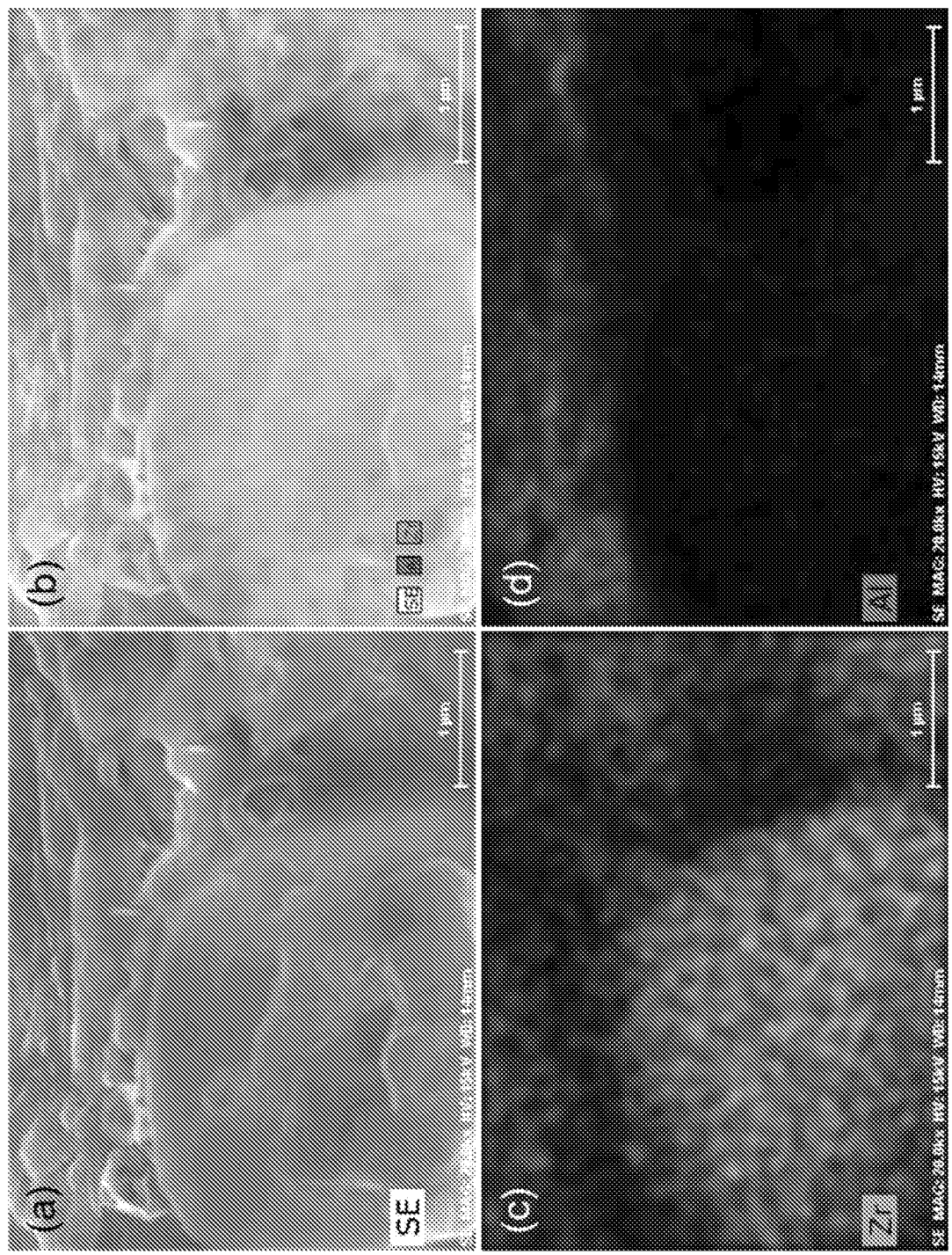
FIG. 23 shows a magnified SEM micrograph of Al coated garnet SSE.

Characterization of garnet solid-state electrolyte. Li$_7$La$_{2.75}$Ca$_{0.25}$Zr$_{1.75}$Nb$_{0.25}$O$_{12}$ (LLCZN) was selected as the SSE due to its low sintering temperature, stabilized cubic garnet phase, and high ionic conductivity. LLCZN was synthesized using a modified sol-gel method, followed by thermal sintering. The density of the sintered pellet (92% of the theoretical value) was measured by the Archimedes method in ethanol. FIG. 16a shows the polished surface structure of the sintered garnet (bright area) and Al coating (dark area). Some isolated pores remained in the sintered pellet surface after polishing. A cross-section of the garnet ceramic disk exhibits the micron-sized garnet grains sintered together to form a solid electrolyte with a 20 nm thick Al layer coating (FIG. 21). The Al coating conformed to the polished garnet surface by using vapor deposition method (FIGS. 22 and 23). The inset of FIG. 16a is a digital image of the Al-coated garnet ceramic disk with a grey Al coating on a yellow garnet ceramic. X-ray diffraction (XRD) was used to analyze the phase of the sintered LLCZN pellet in FIG. 16b. The peaks match well with cubic garnet Li$_5$La$_3$Nb$_2$O$_{12}$ (PDF 80-0457). Li$_5$La$_3$M$_2$O$_5$ (M=Nb, Ta) is the first structural example of a rapid, lithium ion conductive garnet and is the conventional structure used to study the garnet-type LLZO materials. Electrochemical impedance spectroscopy (EIS) was used to measure the lithium ion conductivity of sintered LLCZN. The impedance curves measured from room temperature to 50° C. were plotted in the Nyquist form, as shown in FIG. 16c. All the Nyquist plots are composed of a semi-circle at medium frequency and a nearly vertical low-frequency tail. The real axis intercept at high frequency can be assigned to the LLCZN bulk resistance, while the depressed-arc is associated with the grain boundary response. The total resistance of both the bulk and grain boundary contributions are calculated using the low frequency intercept. The low frequency tail corresponds to the capacitive behavior of the gold electrodes, which blocks lithium ion diffusion. Since lithium ion conduction in LLCZN is thermally activated, the total pellet resistance decreases as the temperature increases. The logarithmic conductivity is plotted against the inverse of temperature, and the activation energy of lithium ion conduction (0.37 eV) is calculated using the Arrhenius equation (FIG. 16d).

Figure 17:
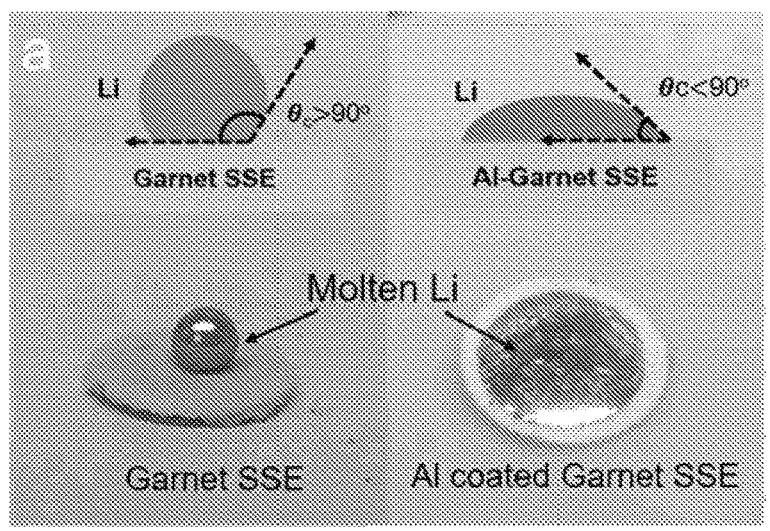
FIG. 17 shows wetting behavior and interfacial morphology characterization of Li|Garnet SSE and Li|Al-coated Garnet SSE. (a) Wetting behavior of molten Li with Garnet SSE and Al-coated Garnet SSE. Inset is a schematic showing the contact angles of a molten Li droplet wetting the surface of both uncoated and Al-coated Garnet SSEs. Improved Li wettability is demonstrated after Al coating the garnet surface. (b-c) SEM images of Li|Garnet SSE, showing the poor Li wettability of uncoated garnet. (d-f) SEM images of Li|Al-Garnet SSE-Al Li, exhibiting superior Li wettability with Al-coated garnet. (g) Phase diagram of Li—Al. (h) Elemental mapping of Li|Al-Garnet SSE in cross-section. Al signal was detected in bulk Li. (i-j) Elemental mapping of the very top area of Li metal to show the diffusion process of Al.
Figure 17:
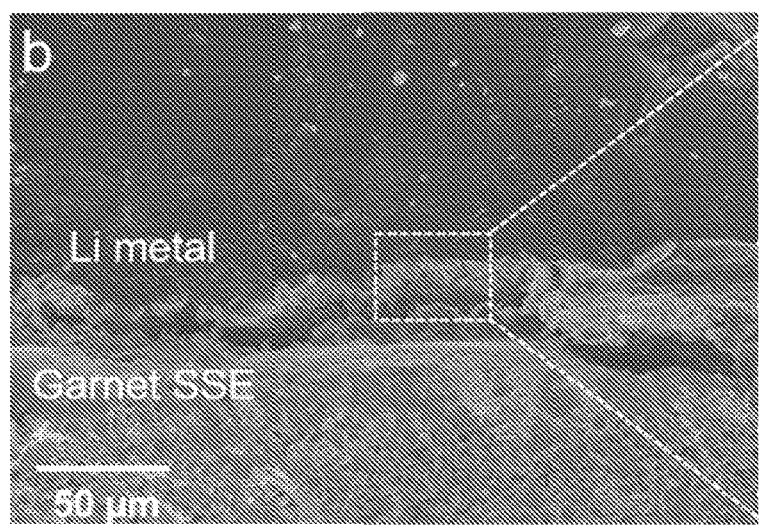
Figure 17:
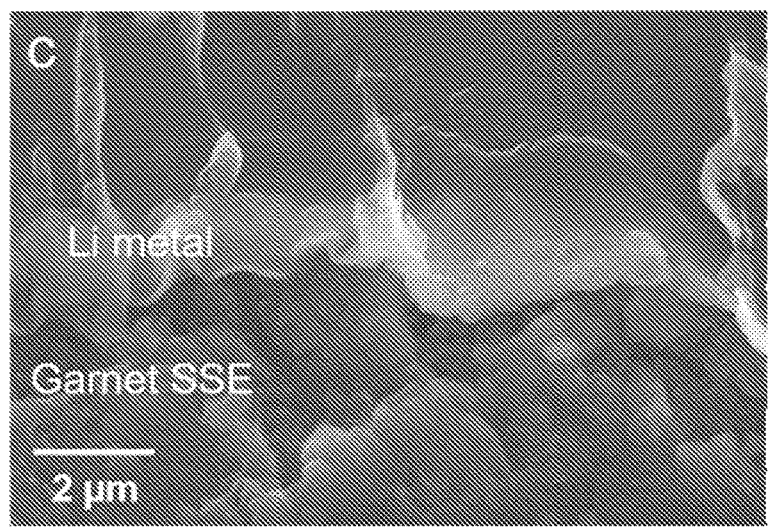
Figure 17:
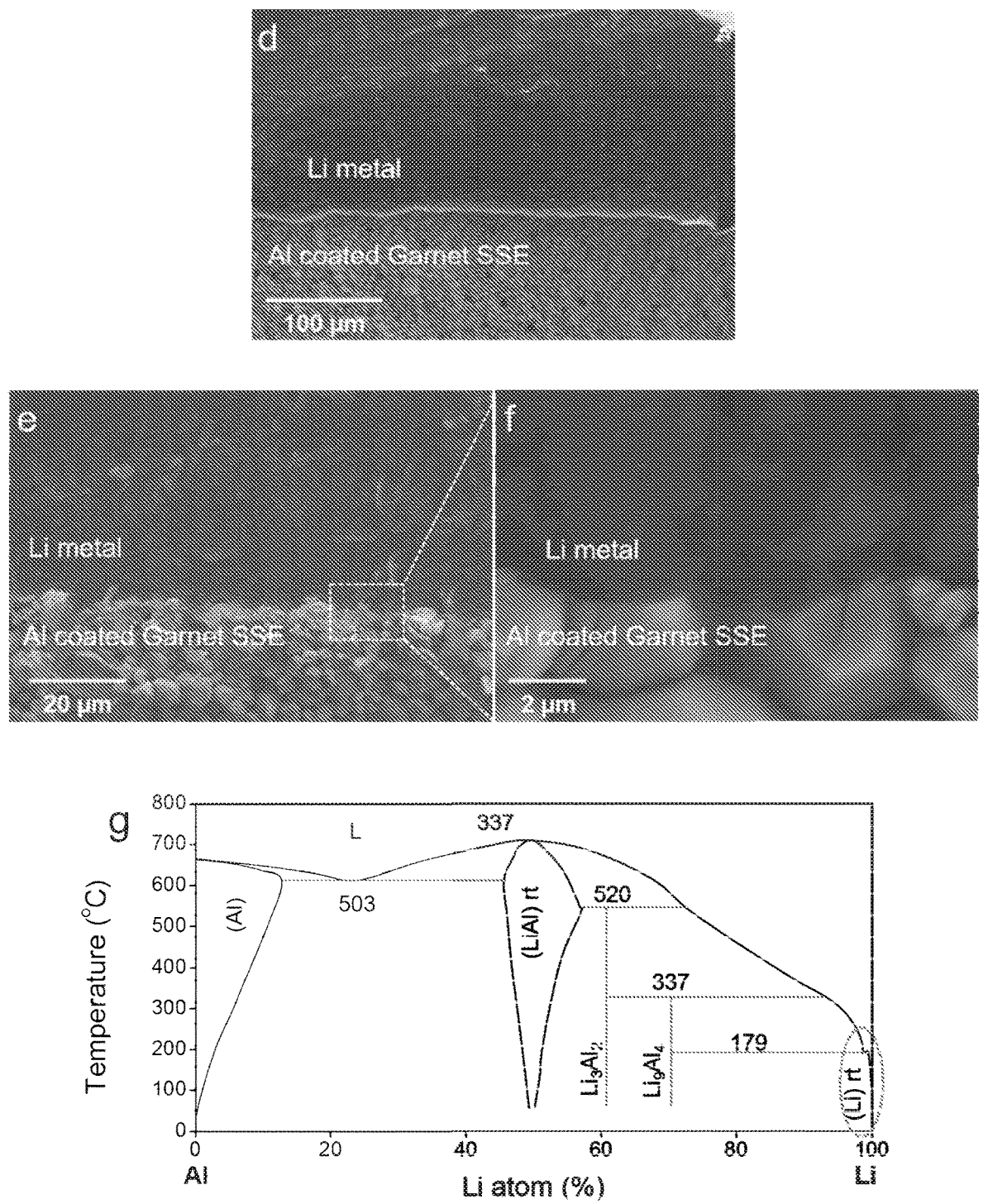
Figure 17:
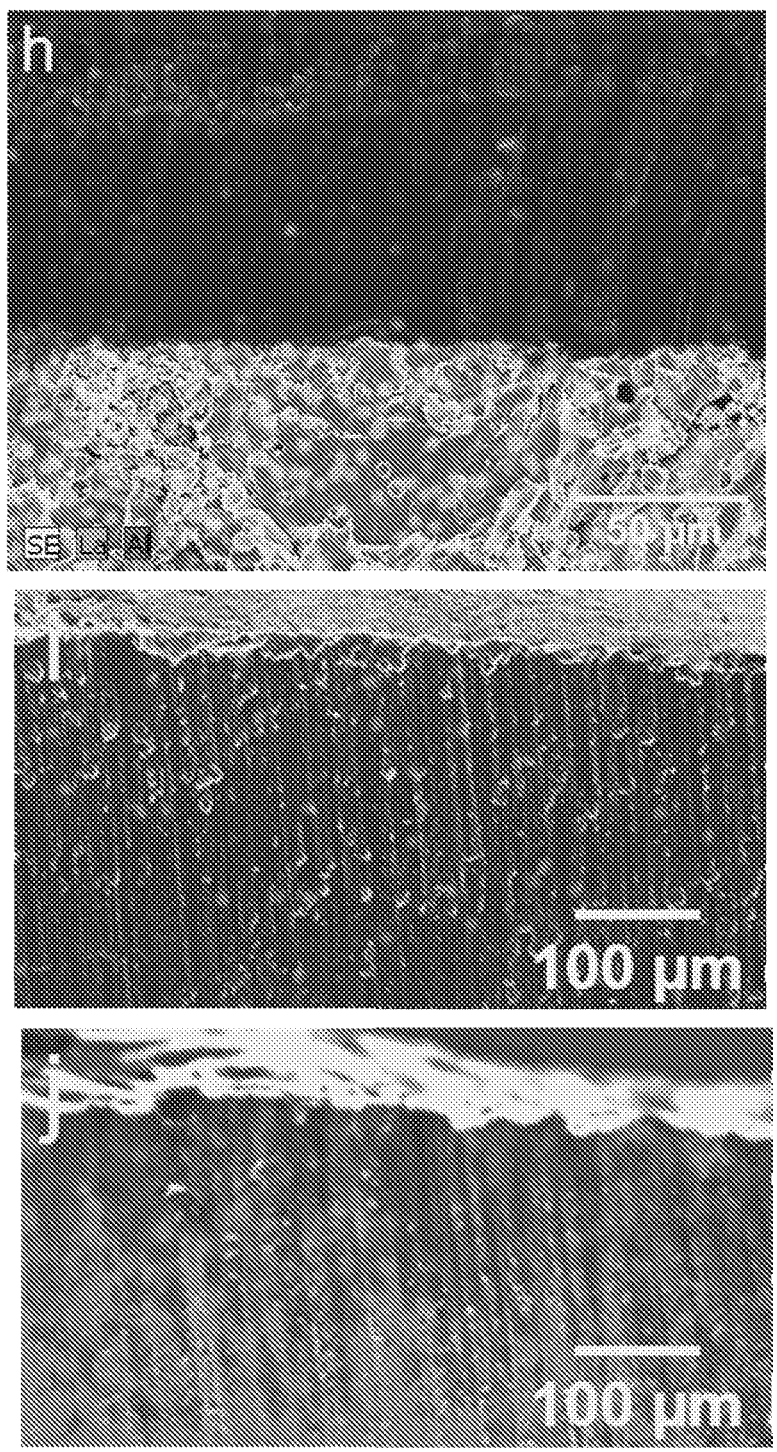

A droplet of molten Li was applied to the garnet and Al-coated garnet surfaces to observe the material's wettability. As shown in FIG. 17a, for the pure garnet, the molten Li instantly formed a ball on top of the garnet disk, which demonstrates poor wetting. For the Al-coated garnet, the molten Li spread out quickly which covered the engineered garnet surface. Note that an obtuse contact angle indicates poor Li contact with uncoated garnet due to Li's higher surface energy than the garnet; an acute angle demonstrates good wettability between Li and the Al coating on the garnet surface.

Figure 24:
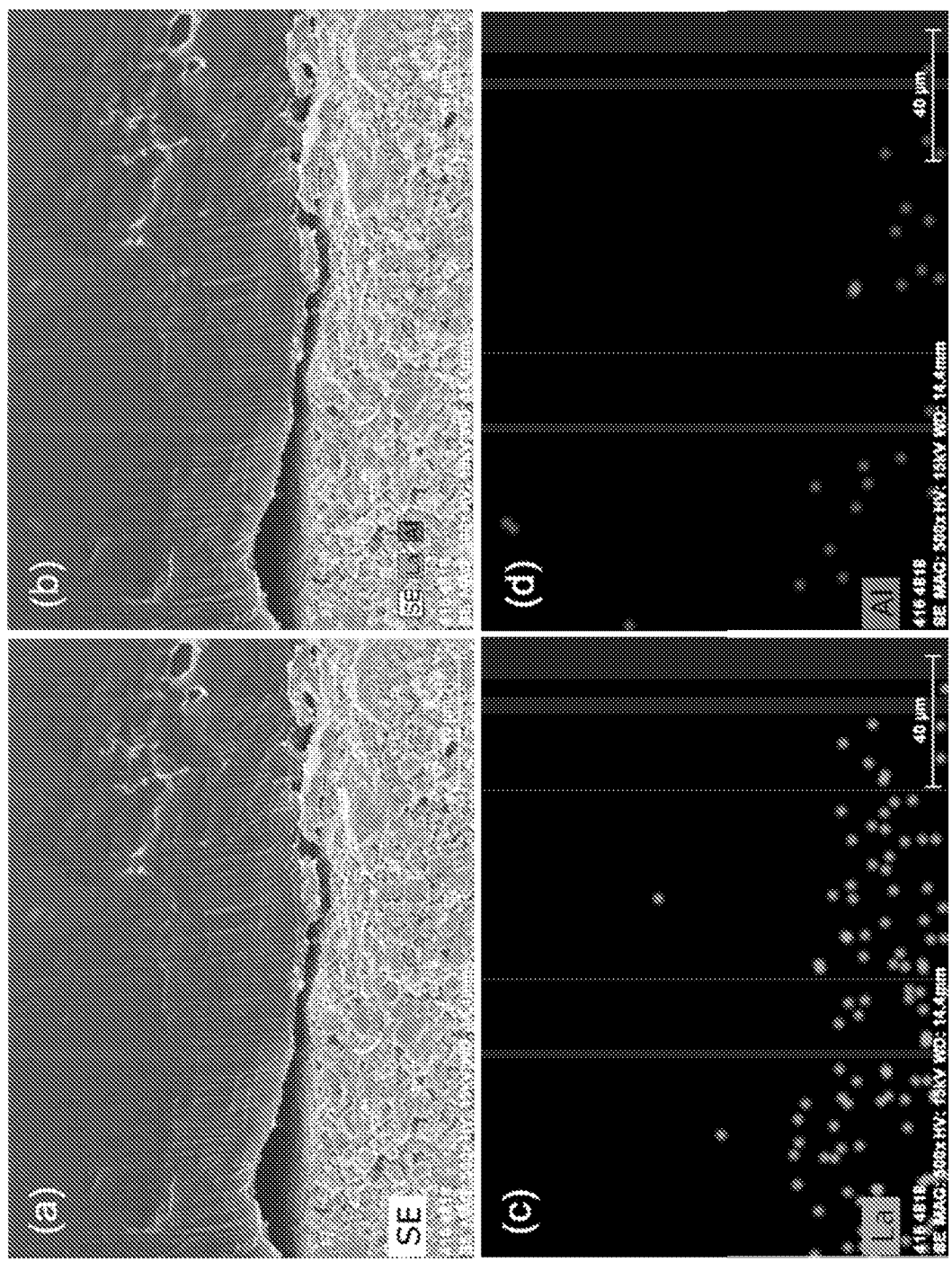
FIG. 24 shows a cross-section SEM and elemental analysis of Garnet-Li metal interface without Al coating showing poor interfacial contact and no Al in Li phase.

The interface morphology was characterized by scanning electron microscopy (SEM) as shown in FIG. 17b-f, which compares the Li wetting behavior of garnet SSE with/without an Al coating. Due to poor wetting with pristine garnet, only a small Li contact area can be used to characterize the interface morphology for the Li|Garnet SSE sample. As shown in FIG. 17b-c, a large gap separated the top Li metal and bottom garnet. Only a few contact spots can be observed which illustrates that proper Li wetting is important to reduce the interfacial resistance of Li and garnet. Elemental mapping of Li|Garnet SSE sample shows La and Al distribution on the cross-section (FIGS. 24 *c* and *d*). Al in garnet sample was from the contamination of Al$_2$O$_3$ crucible during sample preparation and sintering.

Figure 25:
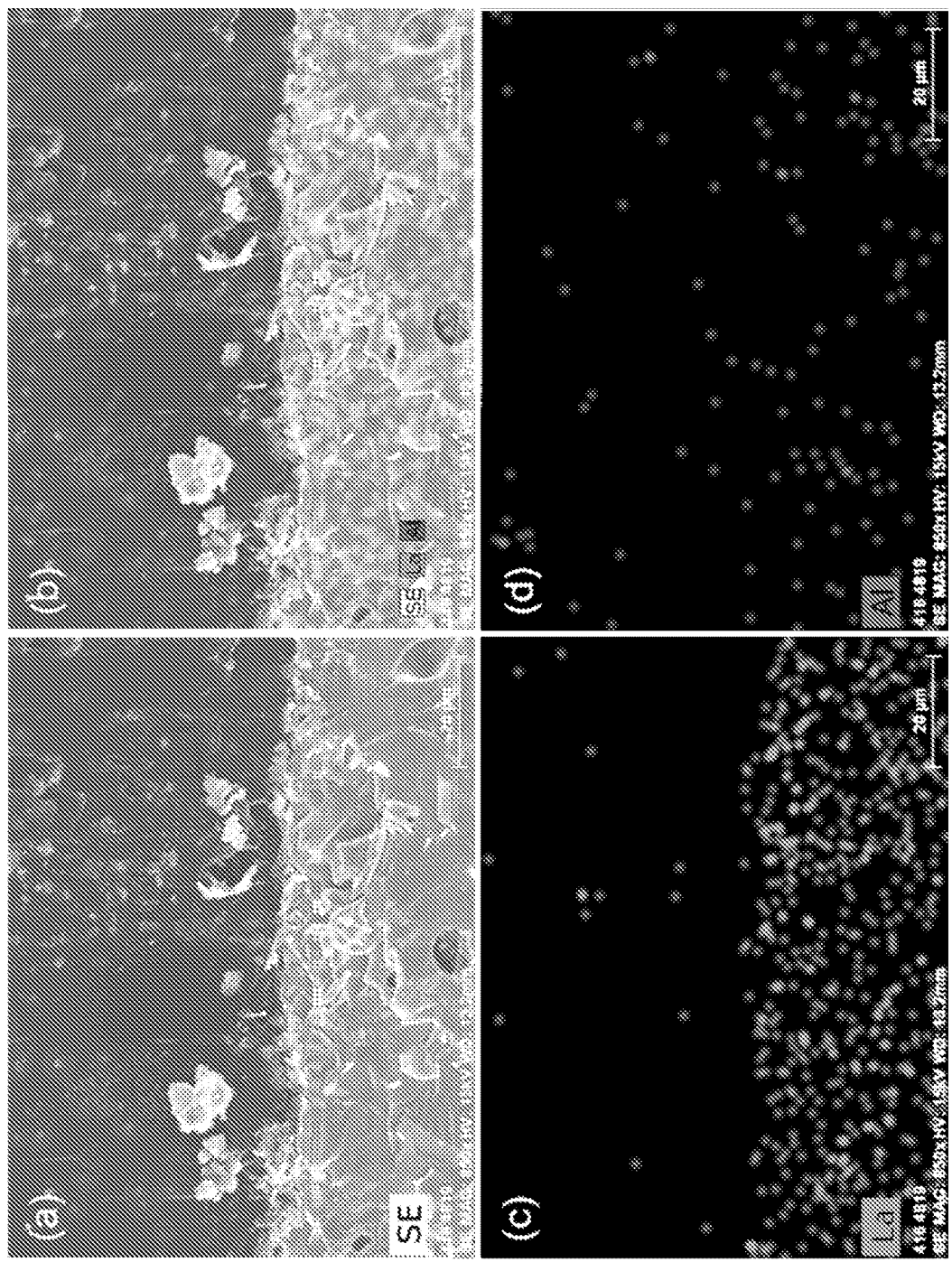
FIG. 25 shows a cross-section SEM and elemental analysis of the interface between Li metal and Al-coated garnet SSE. Excellent Li wetting of garnet interface is observed and Al signal was detected in the Li metal, indicating the diffusion of Al into molten Li.

This effect is further seen by comparing lack of Li wetting, large gap between Li and garnet, in FIG. 24 with no Al in garnet surface with excellent Li wetting in FIG. 25 with Al in garnet surface and extending into Li phase.

Figure 26:
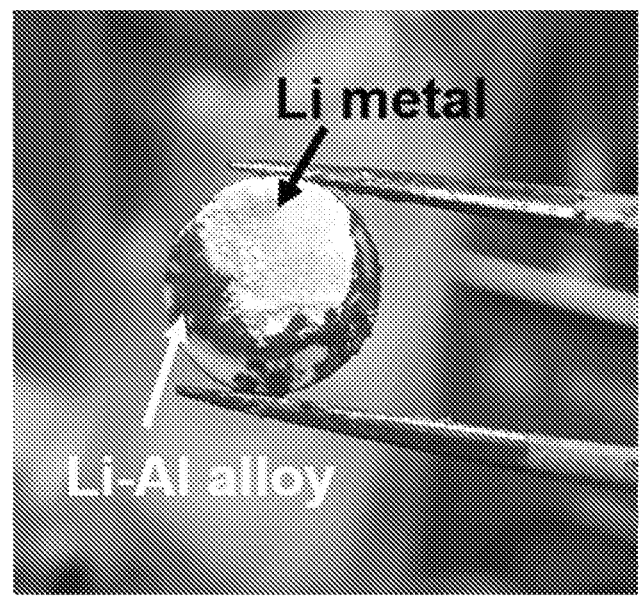
FIG. 26 shows a digital image and XRD of the lithiated Al-coated garnet SSE. The lithiated Al-coated garnet SSE was prepared by partially wetting molten Li on the ceramic surface. The Al coating became dark grey as shown above. The XRD pattern identified LiAl and Li$_3$Al$_2$ peaks.
Figure 26:
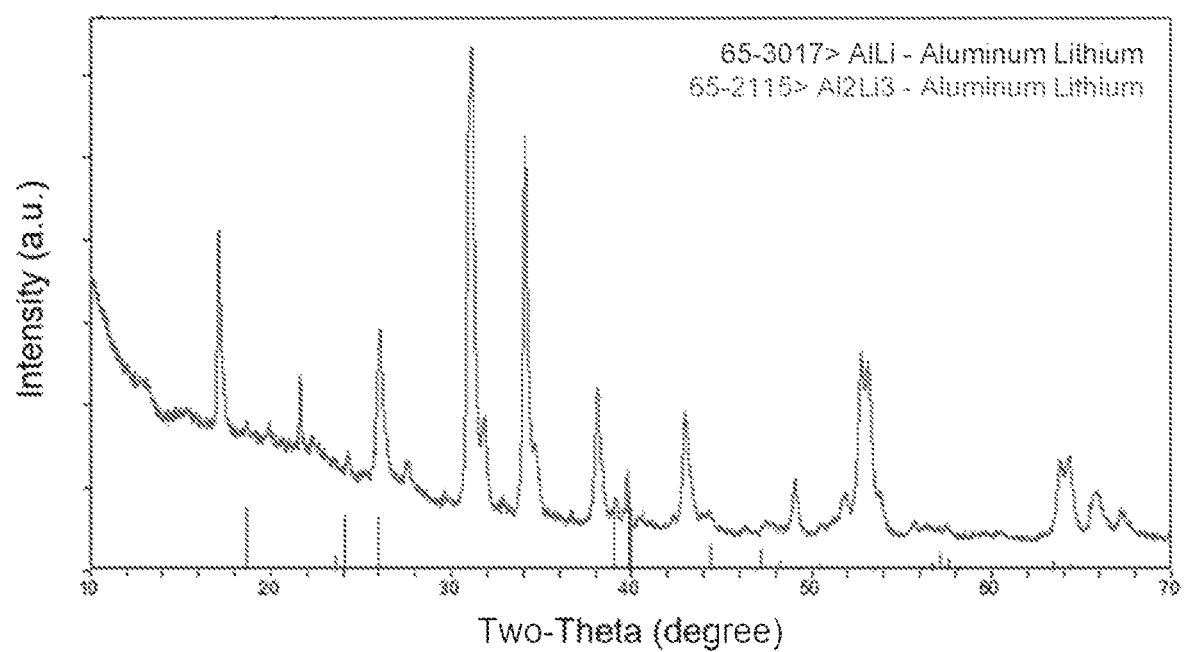

As seen in FIG. 17d-f, Al-coated garnet maintains superior contact with Li, due to the formation of a Li—Al alloy at the interface. The magnified SEM image illustrates the intimate contact between Li and garnet due to the conformal Al coating and Li—Al interfacial layer (FIG. 17f). Moreover, we can see that Li filled the pores of garnet particles and grain boundaries, which greatly increases the Li-garnet contact area. Al signal was detected in the bulk Li metal of Li|Al coated Garnet SSE sample (FIG. 17h and FIG. 25), indicating the diffusion of Al into the Li. When alloying with lithium metal by heating, this ultra-thin Al layer would be replaced by lithium metal immediately and then migrated towards the bulk lithium anode. Since the Li/Al weight ratio is near 100% (see the Li—Al phase diagram in FIG. 17g), the solid solution can be considered as a pure Li phase. Additional experiment was carried out to show Al diffusion process. Two different thicknesses of Al foils (5 and 30 µm thick) were placed underneath a 1 mm thick Li metal foil to heat together at 200° C. We noticed that Al foil would be completely corroded and dissolved into the molten Li completely. By examining the cross-section of Li metal, Al signal can be detected on the very top part of Li metal showing different Li concentrations (FIGS. 17i and j). This observation can simulate the condition of Al coating diffusing into the molten Li state on garnet surface. It is anticipated that the ultra-thin Al coating (20 nm) could have a fast diffusion into molten Li. To determine the Li—Al alloy phase, XRD was used to detect the lithiated Al coating on the garnet ceramic disk. The pristine Al coating became dark in contact with molten Li. XRD identified LiAl and $Li_3Al_2$ peaks in the conformal coating layer (FIG. 26) yet, a $Li_9Al_4$ phase may mainly form on the interface based on the Li—Al phase diagram.

Figure 18:
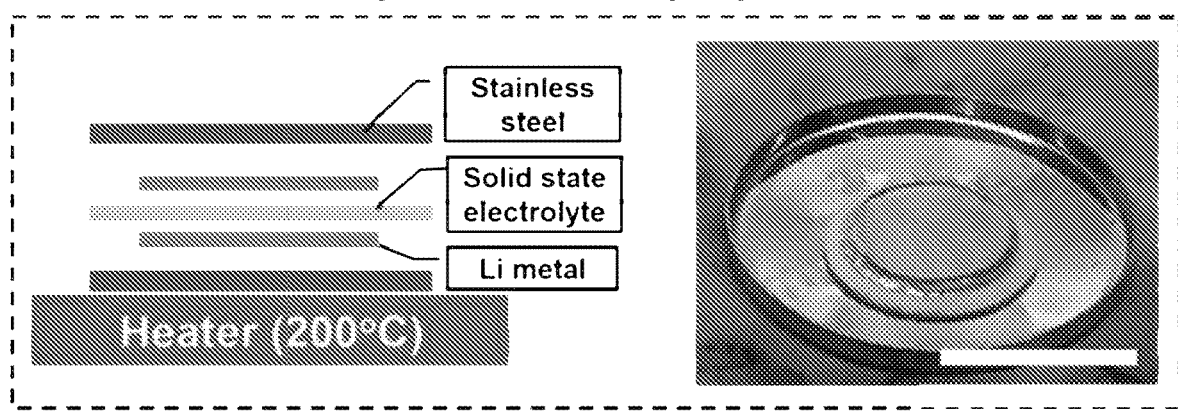
FIG. 18 shows electrochemical stability of the Li and garnet interface. (a) Schematic of the symmetric cell preparation and a digital image of Li metal melting on a garnet SSE. The scale bar is 10 mm. (b-c) Comparison of Nyquist plots of L| Garnet SSE|Li and Li|Al-Garnet SSE-Al|Li in the frequency of 1 MHz to 100 mHz at 20° C. (d) Nyquist plots of Li|Al-Garnet SSE-Al|Li symmetric cell at various elevated temperatures. (e) The interfacial resistance of the Li|Al-Garnet SSE-Al|Li symmetric cell as a function of temperature during heating. (f) Voltage profile depicting the lithium plating/striping behavior for the Li|Garnet SSE|Li symmetric cell at a current density of 0.05 mA/cm$^2$. The voltage plateau continued to increase each cycle due to the high polarization at the unfavorable Li/SSE interface. The high voltage range reflects the large interfacial resistance for the pristine garnet with Li metal. (g) Li plating of the symmetric Li|Al-Garnet-Al|Li cell at 60° C. with current density of 0.05 mA/cm$^2$ for 24 hours. (h-k) Voltage profiles for the Li|Al-Garnet SSE-Al|Li symmetric cell at current densities of 0.1 mA/cm$^2$ and 0.2 mA/cm$^2$. The voltage plateau remained flat and stable during cycling, which proves that the Li—Al alloy creates a stable interface between the garnet solid-state electrolyte and Li metal. The low voltage range illustrates the small interfacial resistance in the cell.
Figure 18:
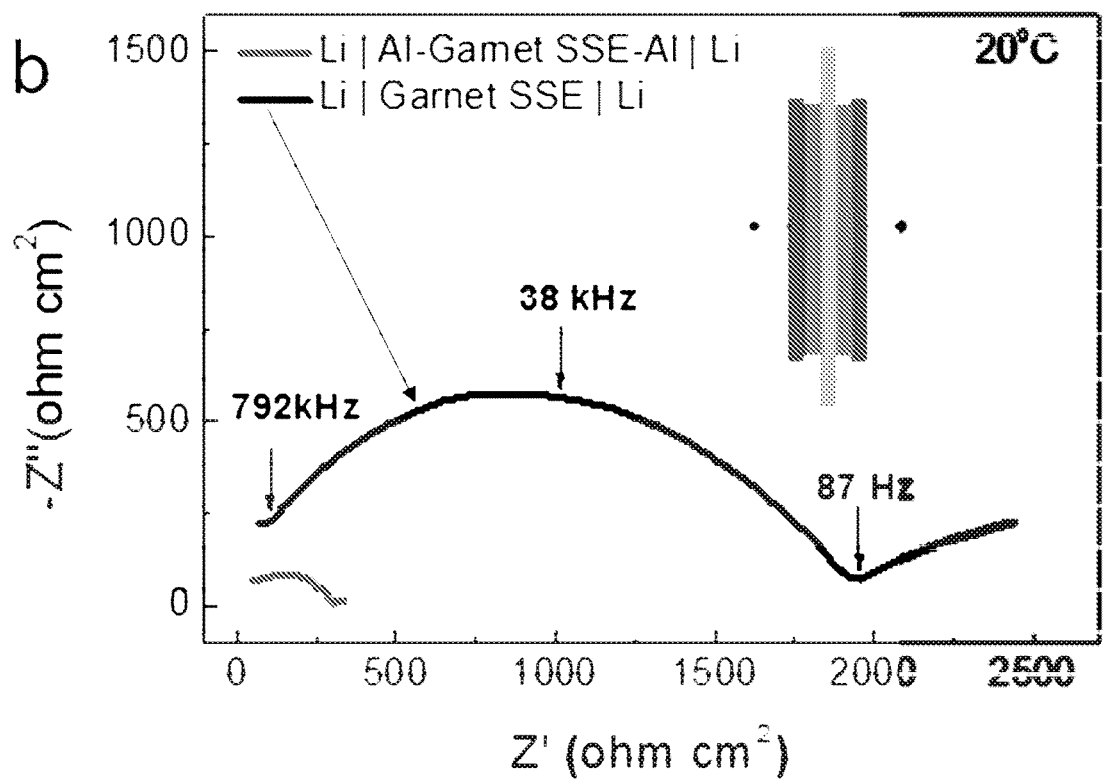
Figure 18:
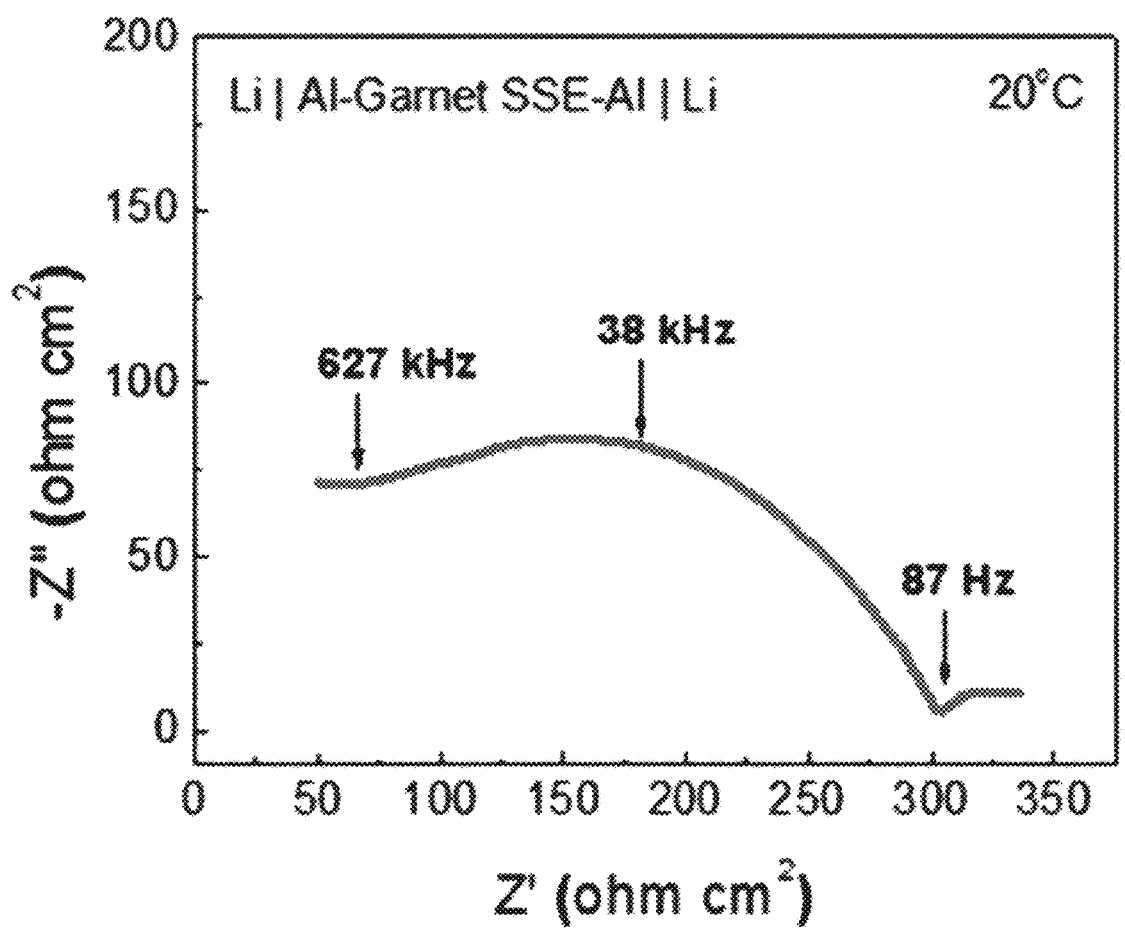
Figure 18:
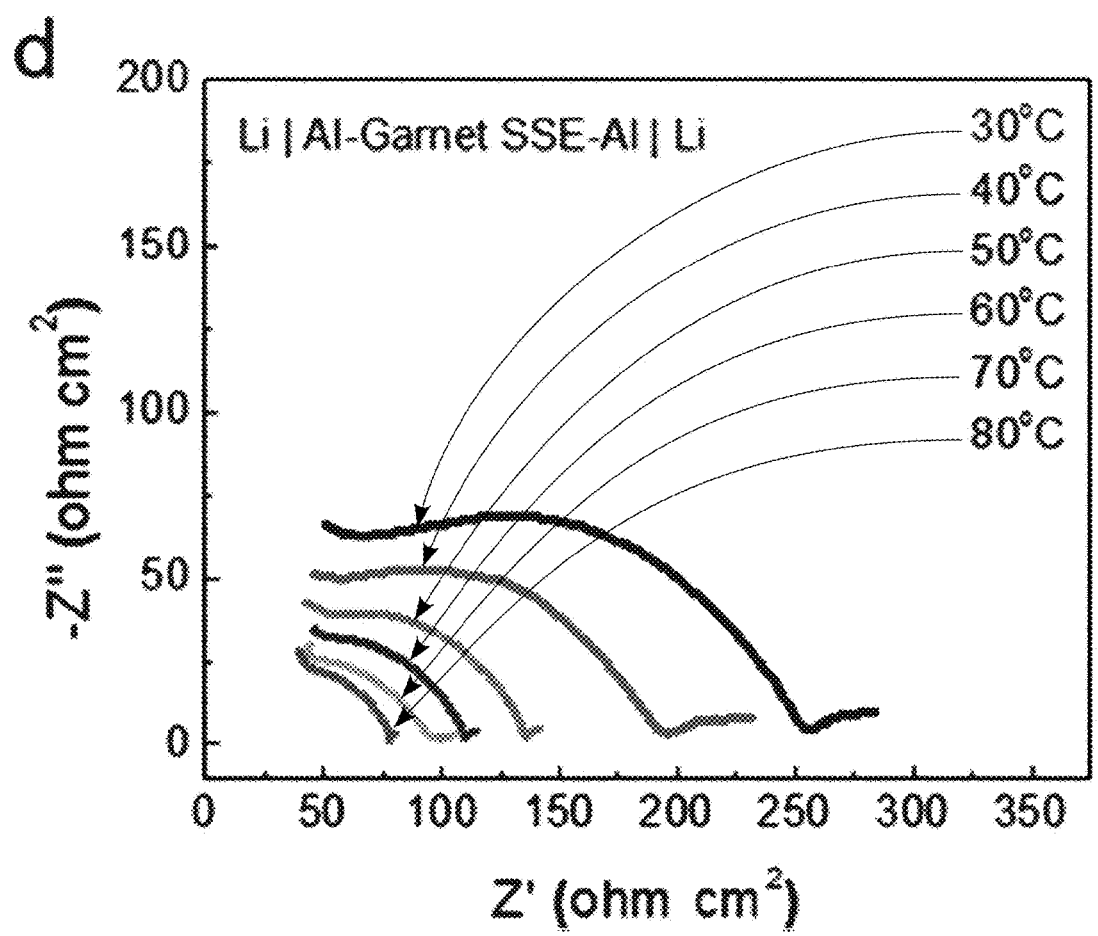
Figure 18:
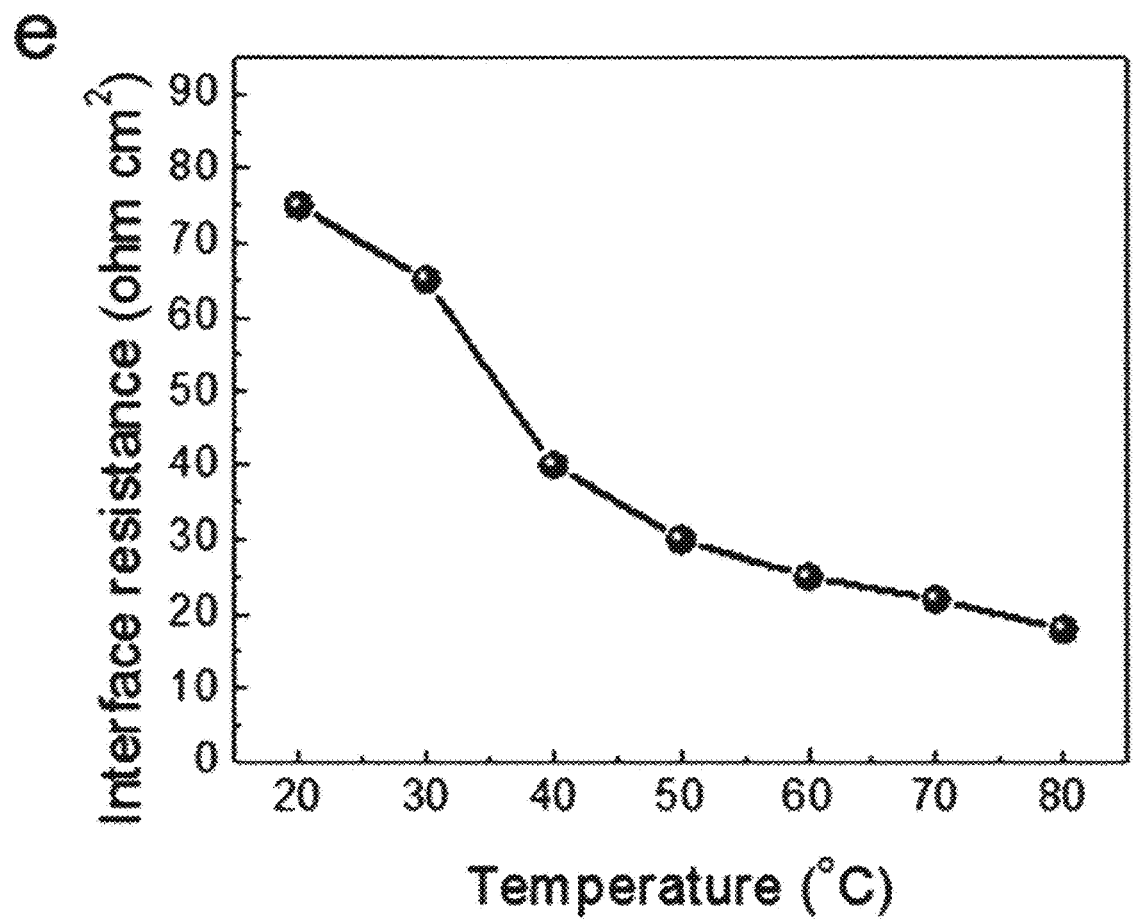
Figure 18:
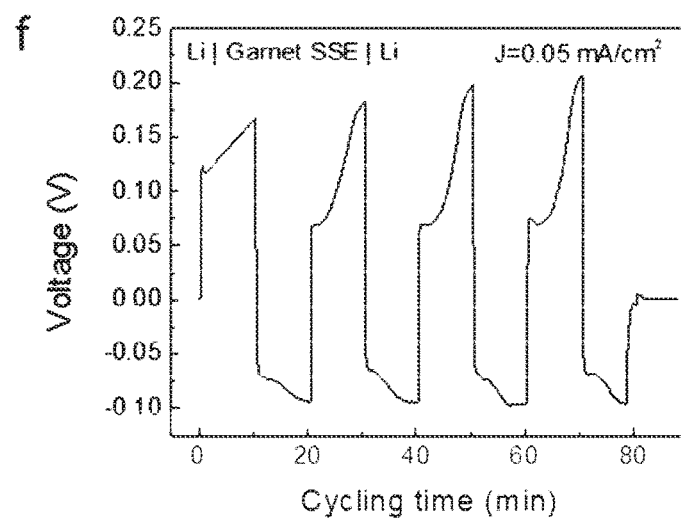
Figure 18:
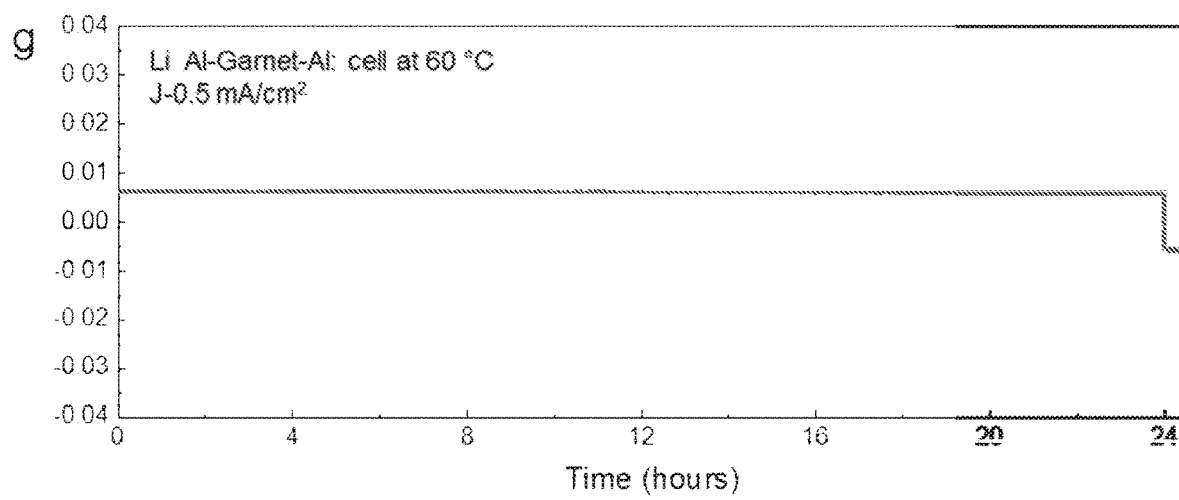
Figure 18:
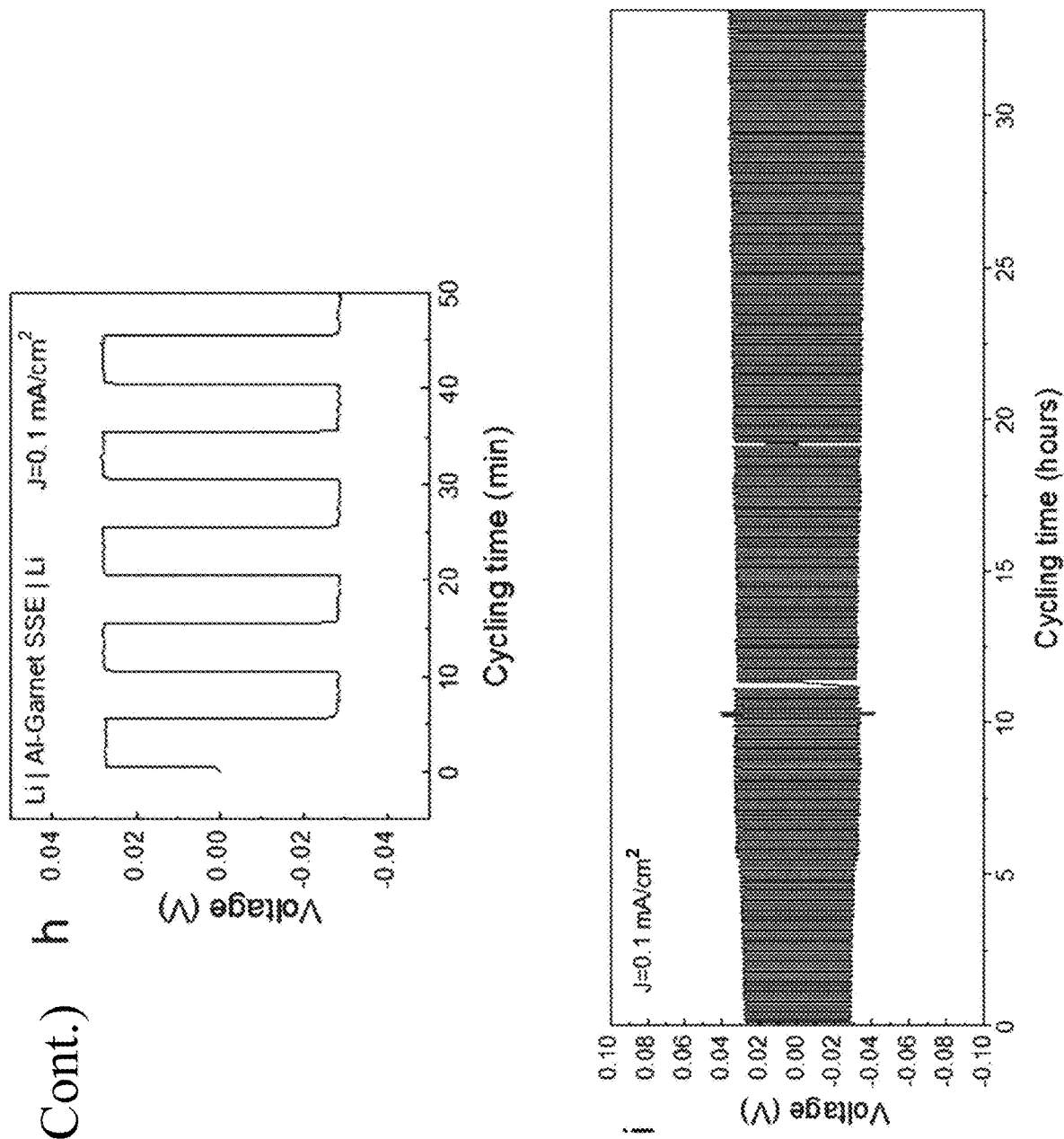
Figure 18:
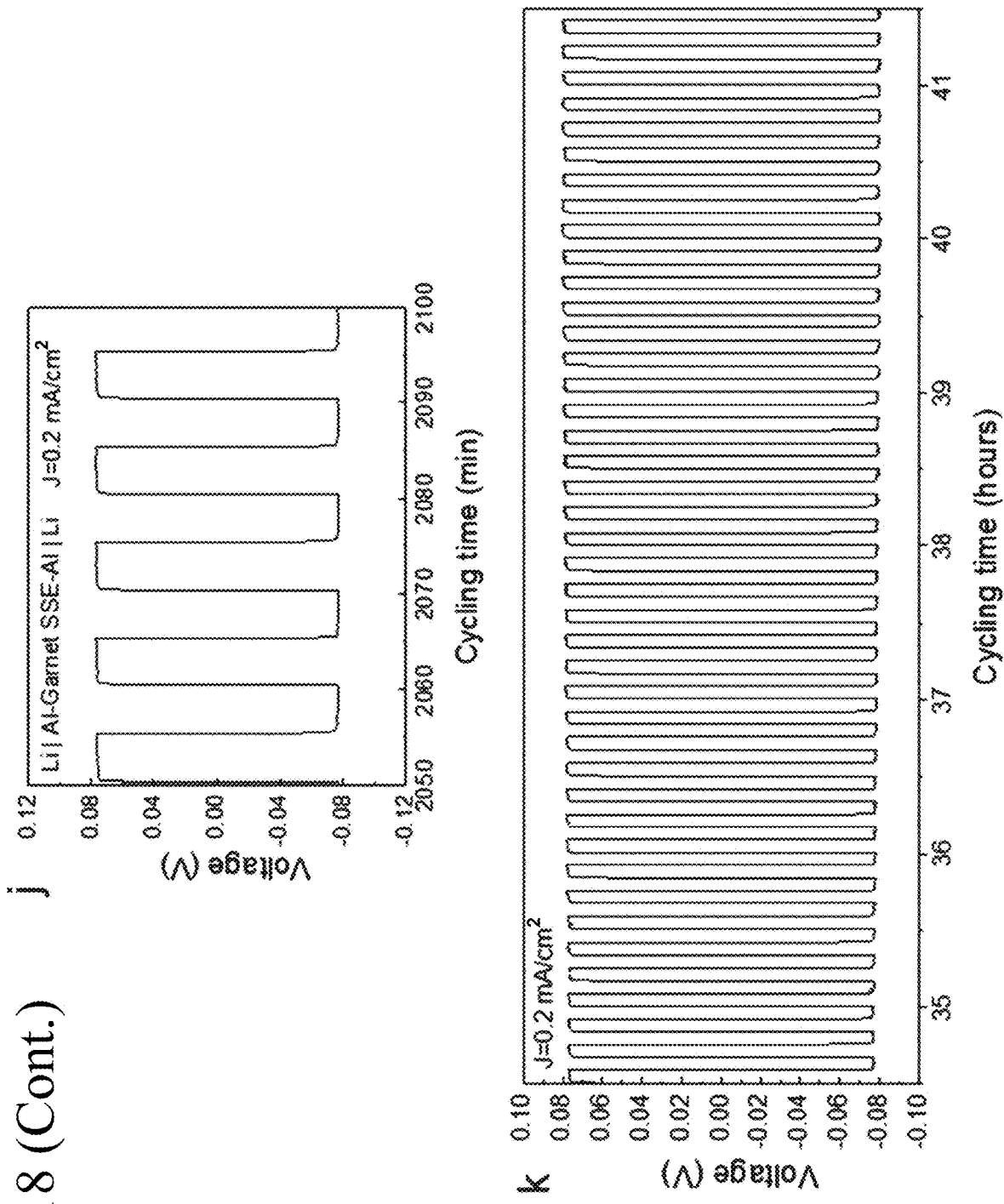
Figure 27:
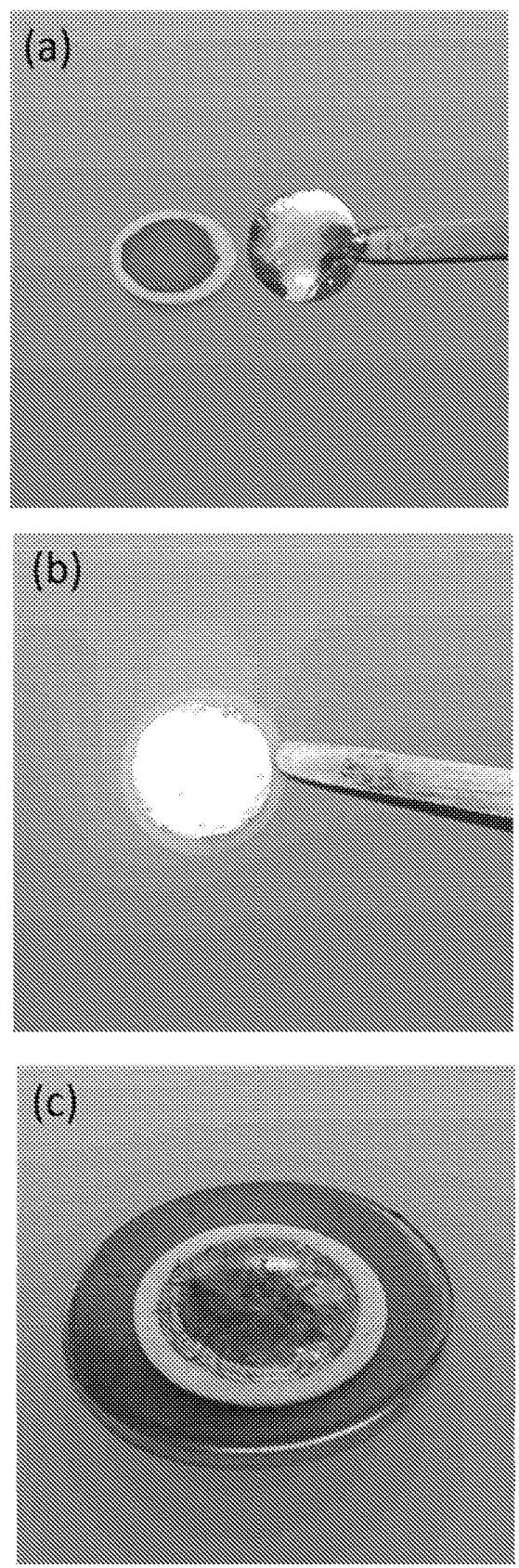
FIG. 27 shows preparation of Li|Al-Garnet SSE-Al|Li. Al was coated on the garnet SSE surface, exhibiting a dark grey color. A piece of Li metal was polished, attached onto the Al-coated area, and gently pressed by hand. The cell was then heated to let the lithium adhere to the garnet.

Electrochemical evaluation of interfacial resistance. The interfacial resistance was evaluated by EIS for Li|Garnet SSE|Li symmetric cells. The symmetric cells were prepared following the schematic shown in FIG. 18a. The SSE was sandwiched between two fresh Li metal foils, then covered by stainless steel plates to block Li diffusion. The cells were heated on a hot plate at 200° C. in an argon-filled glovebox to melt the Li. The digital image in FIG. 18a depicts the symmetric cell's structure and the preparation process is shown in Supplementary FIG. 27. The size of the stainless steel plates were cut to match the Li and attached to the Li surface gently by hand. The stainless steel plates prevent oxidation of Li on the outer surface during heating. Note that no high external pressure was applied to the garnet and Li system. Two symmetric cells, Li|Garnet|SSE|Li and Li|Al-Garnet SSE-Al Li, were prepared and tested directly in an argon-filled glovebox. The two cells showed large differences in total resistance, which depend on both the garnet's total resistance and the interface charge transfer resistance, as shown in the Nyquist plots (FIGS. 18b and 18c). The Li|Garnet SSE|Li cell had a total resistance of ~2000 ohm*$cm^2$ however, the Li|Al-Garnet SSE-Al|Li cell exhibited a resistance of ~300 ohm*$cm^2$, which is almost one order of magnitude smaller than the uncoated SSE. The small partial semicircle at high frequency can be assigned to the total resistance of the garnet material. The large semicircle at medium frequency and low frequency correspond to the charge transfer resistance, which is the combination of the solid-state electrolyte resistance as well as the Li interfaces within the symmetric cells. The decreased size of the semicircle indicates that the interfacial resistance was significantly reduced using the Al coating. The total garnet resistance was ~150 ohm*$cm^2$ and remained unchanged during the Li melting process. By subtracting the garnet ASR, the Li|Garnet SSE|Li cell charge transfer resistance was ~1900 ohm*$cm^2$ at 20° C. For the Li|Al-Garnet SSE-Al|Li cell, the charge transfer resistance was decreased to ~150 ohm*$cm^2$. Note that the interfacial resistance corresponds to two symmetric interfaces. The interfacial resistance is ~950 ohm*$cm^2$ and ~75 ohm*$cm^2$ for Li|Garnet SSE and Li|Al-Garnet SSE-Al, respectively.

The temperature dependent interfacial resistance was characterized using EIS at temperatures from 30 to 80° C. In FIG. 18d, the total impedance of the Li|Al-Garnet SSE-Al|Li cell decreased as the temperature increased. The semicircle at medium and low frequency decreased, which indicates the Li—Al alloy interfacial resistance negatively correlated with temperature. The interfacial resistance was calculated by subtracting the total resistance of the garnet material and the data was plotted as a function of temperature (FIG. 18e). The interfacial resistance reduced with temperature: ~75 ohm*$cm^2$ at 20° C., ~27 ohm*$cm^2$ at 60° C., and ~20 ohm*$cm^2$ at 80° C. These values are approaching the typical Li-ion battery impedance of tens of ohm*$cm^2$.

Figure 28:
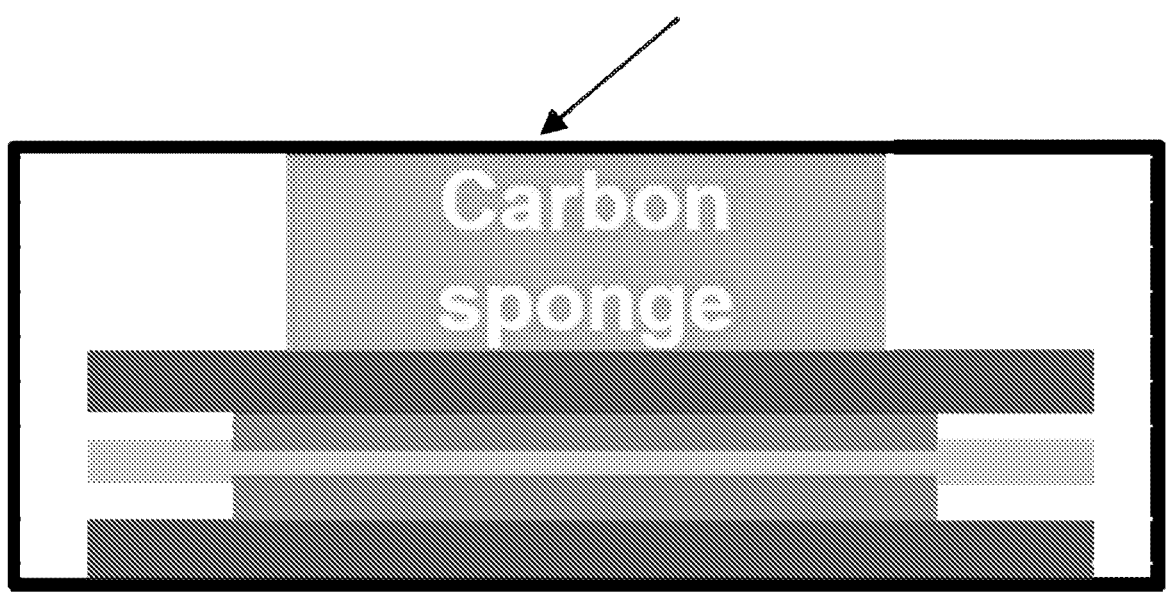
FIG. 28 shows a symmetric cell setup for charge and discharge tests. A highly conductive carbon sponge was used as a cushion to absorb the pressure when assembling the coin cell. The cell was assembled in an argon-filled glove box and sealed with epoxy resin.
Figure 29:
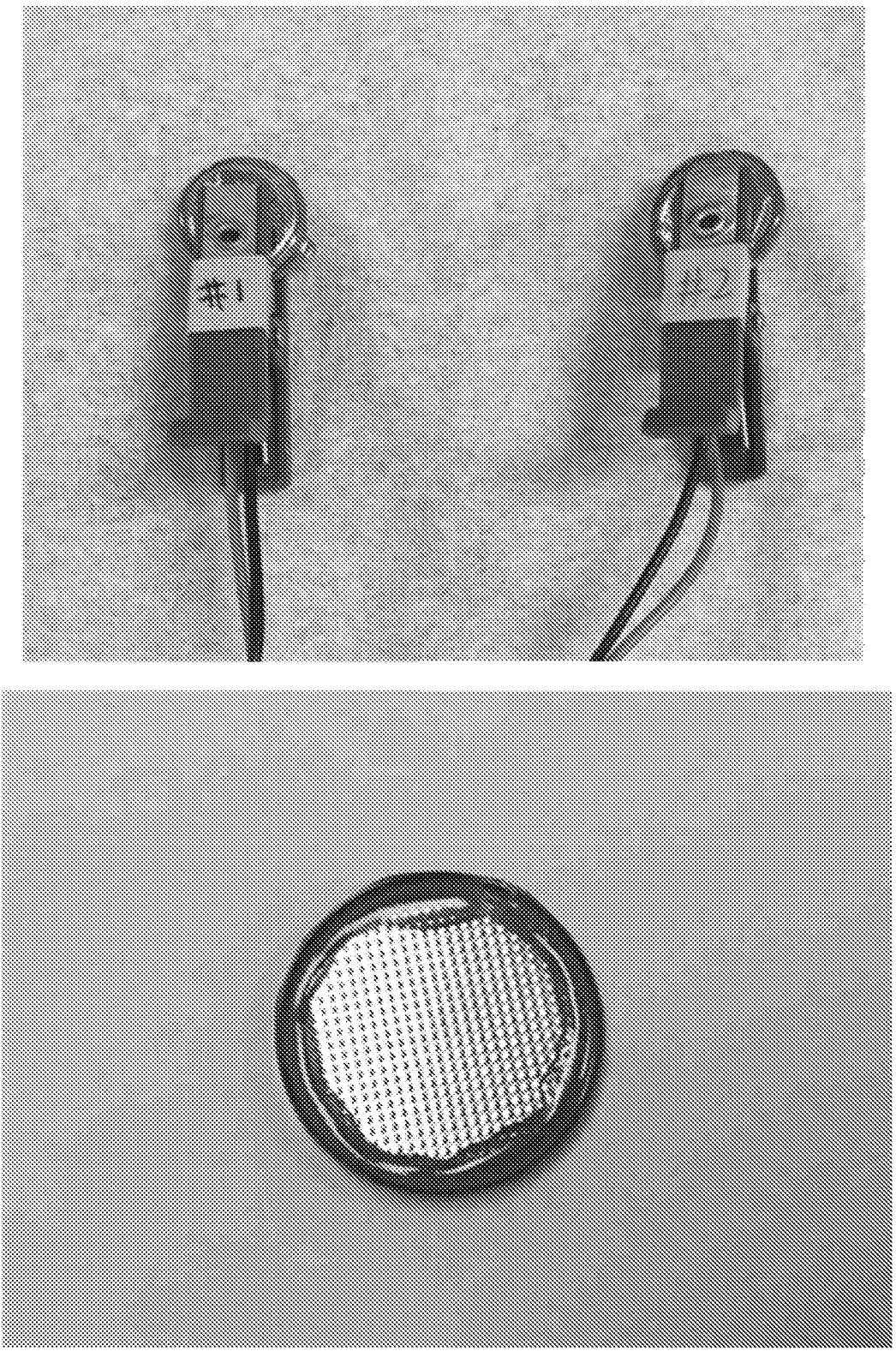
FIG. 29 shows an image of the symmetric cells assembled into 2032 coin cells. Battery test clips provide pressure to make good contact of the cells before epoxy resin sealing.

The interface stability was measured by galvanostatically charging and discharging at a constant current to plate/strip $Li^+$ and mimic the operation of lithium metal batteries. Symmetric cells with two Li electrodes were prepared and assembled into 2032 coin cells (FIG. 28). The cell was tightened using a battery clip and epoxy resin was used to seal the coin cells (FIG. 29). All the cells were assembled and tested in an argon-filled glovebox at 20° C. FIG. 18f shows the time-dependent voltage profile of the Li|Garnet SSE|Li symmetric cell at a current density of 0.05 mA/$cm^2$. The positive and negative voltage denotes Li stripping and Li plating, respectively. The cell exhibited a high voltage (~0.2 V) for Li stripping and a low voltage (~0.1 V) for Li plating, which is likely due to contact area differences between garnet and Li causing polarization to occur during stripping and plating. In each cycle, the voltage increased: the voltage of Li stripping in the $1^{st}$ cycle increased from 0.12 to 0.16 V. With subsequent cycles, the voltage continuously increased, indicating an unstable interface where the interfacial resistance increases with time. Poor contact between Li and garnet is the likely culprit causing large currents to accumulate at interfacial points/areas, which leads to substantial cell polarization. Therefore, a stable interface is important to decrease the polarization and maintain good cycling performance with solid-state electrolyte systems.

Figure 30:
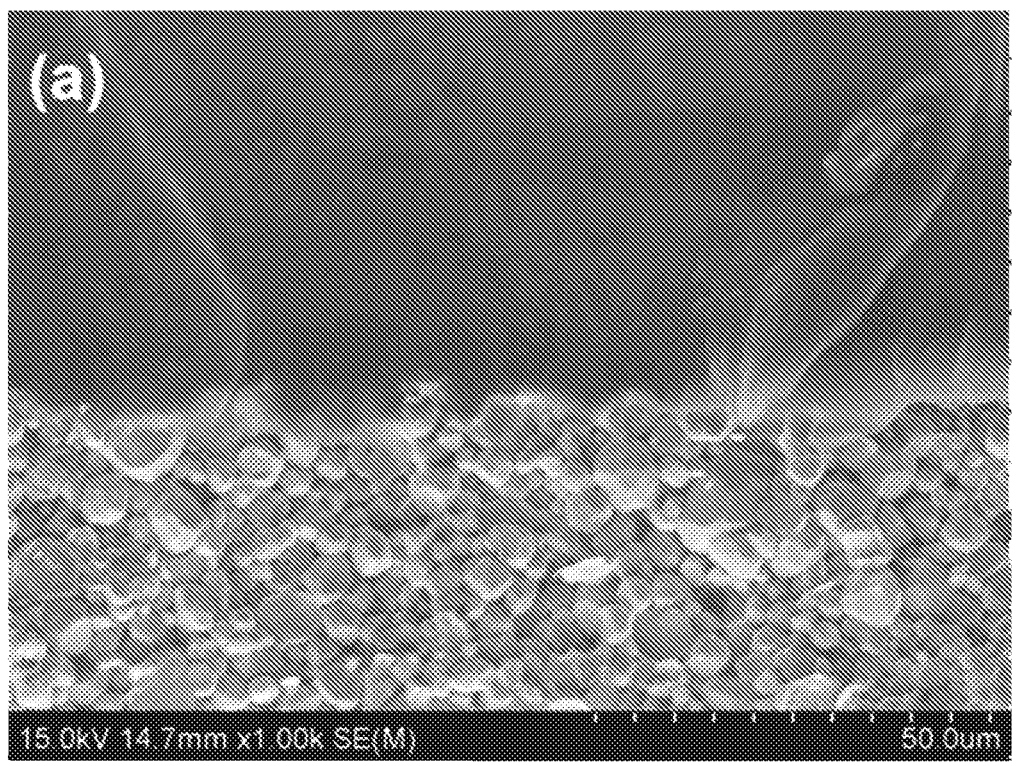
FIG. 30 shows a cross-sectional SEM images of the cycled Li|Al$_1$ coated Garnet SSE interface. The interface contact remained stable and there is no morphological changes due to cycling.
Figure 30:
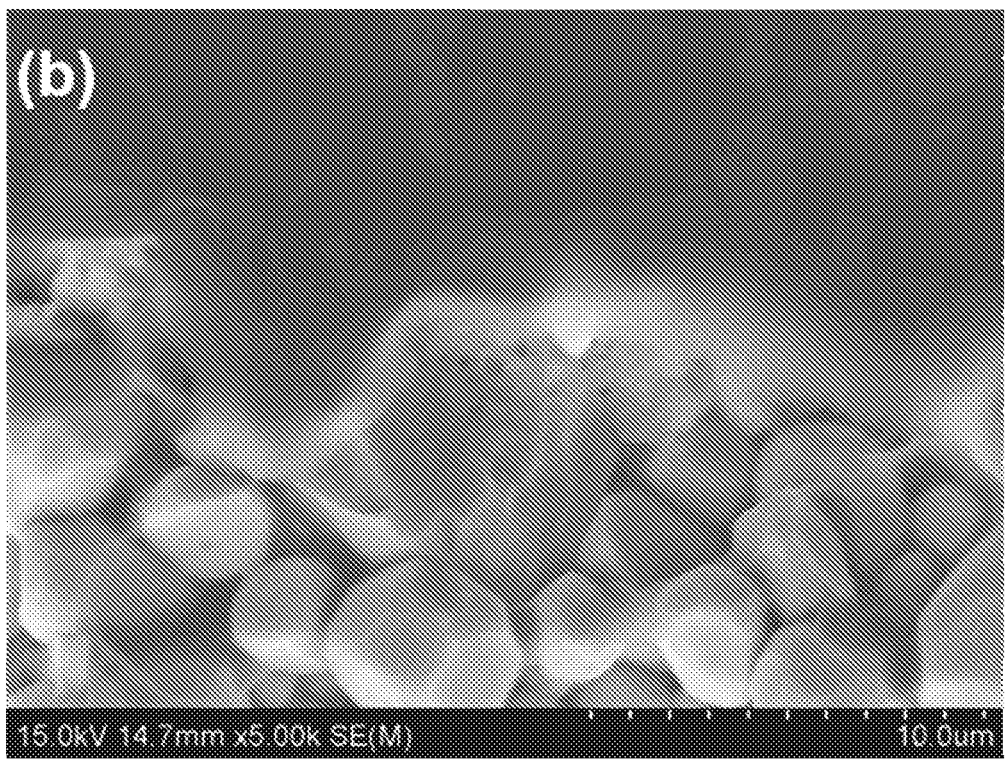

In contrast, the Al coating effectively stabilized the interfacial resistance during reversible Li stripping and plating. The symmetric Al-Garnet-Al|Li cell was tested at 60° C. at a current density of 0.05 mA/$cm^2$ for 24 hours, which delivered a capacity of 1.2 mAh (FIG. 18g). We use theoretical capacity of Li metal (3860 mAh/g) to calculate the mass of stripped/plated lithium is 0.31 mg, which accounts ~3.1% of the total ~10 mg Li metal used. We can see the voltage shows a flat plateau, indicating stable Li ion flow through the interface between garnet SSE and Li metal. The Li|Al-Garnet SSE-Al|Li symmetric cell exhibited superior stability at a current density of 0.1 mA/$cm^2$ (FIGS. 18h and 18i). The symmetric cell was periodically cycled for 5 minutes. The cell exhibited a flat voltage of ±28 mV for each cycle, and the total resistance calculated using Ohm's law was ~280 ohm*$cm^2$, which is in good agreement with the EIS measurements. The bulk resistance of the garnet solid electrolyte is ~150 ohm*$cm^2$, which contributes 15 mV to the total voltage of the symmetric cell at this current density. When a higher current density of 0.2 mA/$cm^2$ was applied to the symmetric cell, the voltage increased to 75 mV with a calculated ASR of ~375 ohm*$cm^2$. The voltage plateau still remained flat, indicating a good interface between Li|Al-Garnet SSE-Al (FIGS. 18j and 18k). Long-term cycling for over 30 hours was tested at a current density of 0.1 mA/$cm^2$. The overall voltage was smaller than 30 mV without major voltage fluctuations. When the current density doubled, the long-term cycling performance remained stable and no voltage hysteresis was observed. After cycling, the cell was opened and cross-section SEM images indicate that no morphological changes occurred at the interface due to cycling (FIG. 30). The stable and constant stripping and plating voltages confirm that alloy formation is a useful strategy to address the fundamental wetting challenge of garnet SSEs with Li metal.

Figure 19:
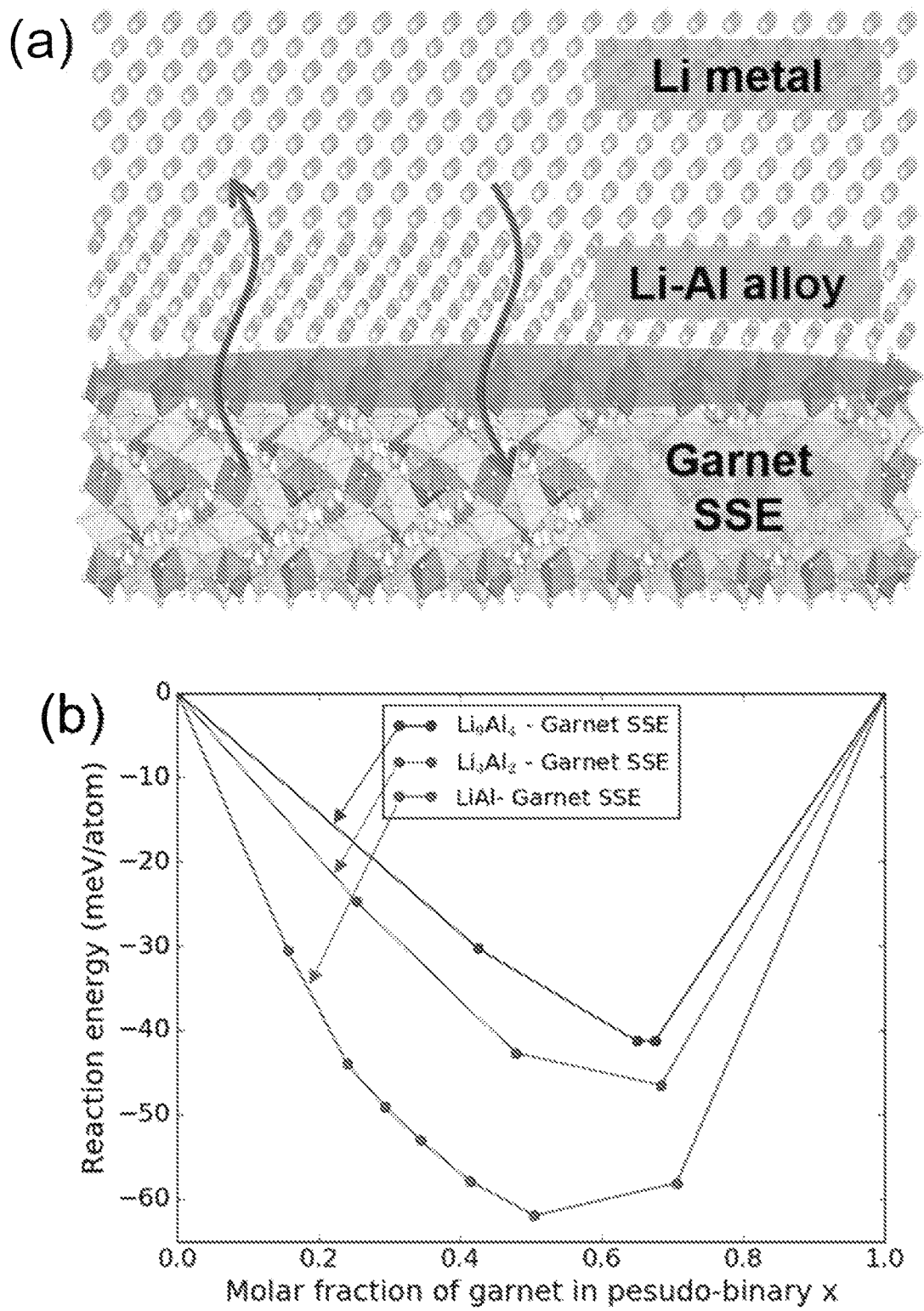
FIG. 19 shows a schematic and first principles computation of the Li—Al alloy interface between Li metal and the garnet solid-state electrolyte. (a) The reaction between Al and Li promotes enhanced molten Li infusion onto the garnet's rough surface while the formation of a Li—Al alloy fills the gap between the garnet solid electrolyte and the Li metal to improve interfacial contact and enhance Li$^+$ transport. (b) Calculated mutual reaction energy $\Delta E_{D,mutual}$ of the garnet and Li—Al alloy interfaces.

The conformal Al coating on the garnet ceramic disk drastically altered the garnet surface's Li wettability due to the formation of a Li—Al alloy. The reaction between Al and Li promotes enhanced molten Li infusion onto the garnet's rough surface while the formation of a Li—Al alloy fills the gap between the garnet solid electrolyte and the Li metal to improve interfacial contact and enhance Li$^+$ transport. In this case, a new interface between the Li metal anode and garnet is formed (FIG. 19a). We applied first principles calculations to investigate the interface stability between the garnet SSE and the intermediary Li—Al alloy layer using the approach using known techniques. By considering the interface as a pseudo-binary system consisting of an Li—Al alloy and garnet SSE, we identified the most thermodynamically favorable interphase and calculated the mutual reaction energy between the two materials. The first principles computation shows that Li—Al alloys and garnet SSE have stability with mutual reaction energies in the range of −60 to −40 meV/atom (FIG. 19b). This small amount of interfacial reaction indicates potential kinetic stabilization and the absence of significant interfacial degradation as observed in other solid electrolytes. In addition, such minor reactions significantly improve the wettability at the interface. Therefore, the interface between the Li—Al alloy and the garnet SSE may exhibit both good wettability and chemical stability, which enhance interfacial contacts and reduce interfacial resistance.

TABLE 2

The phase equilibria and decomposition energies of the Garnet SSE and Li—Al alloy interfaces. Ratio x is the molar fraction of the garnet SSE in the pseudo-binary composition (The parent composition of the garnet SSE and Li—Al alloy are already normalized to one atom per formula).

| Ratio x | $\Delta E_{D,mutual}$ (meV/atom) | Phase Equilibria |
|---|---|---|
| a) Garnet SSE and Li$_9$Al$_4$ | | |
| 0.425 | −30.32 | ZrAl$_2$, LaAl$_2$, Li, Li$_2$O |
| 0.649 | −41.26 | ZrAl$_2$, La$_2$O$_3$, Li, Li$_2$O |
| 0.675 | −41.29 | Zr$_2$Al$_3$, ZrAl$_2$, La$_2$O$_3$, Li$_2$O |
| b) Garnet SSE and Li$_3$Al$_2$ | | |
| 0.253 | −24.78 | ZrAl$_2$, LaAl$_2$, Li$_9$Al$_4$, Li$_5$AlO$_4$ |
| 0.479 | −42.72 | ZrAl$_2$, LaAl$_2$, Li$_2$O, Li$_5$AlO$_4$ |
| 0.684 | −46.54 | ZrAl$_2$, La$_2$O$_3$, Li$_2$O, Li$_5$AlO$_4$ |
| c) Garnet SSE and LiAl | | |
| 0.156 | −30.54 | ZrAl$_3$, LaAl$_3$, Li$_3$Al$_2$, LiAlO$_2$ |
| 0.24 | −44.00 | ZrAl$_3$, LaAl$_3$, Li$_3$Al$_2$, Li$_5$AlO$_4$ |
| 0.293 | −49.09 | ZrAl$_3$, LaAl$_2$, Li$_3$Al$_2$, Li$_5$AlO$_4$ |
| 0.343 | −53.07 | ZrAl$_2$, LaAl$_2$, Li$_3$Al$_2$, Li$_5$AlO$_4$ |
| 0.414 | −57.91 | ZrAl$_2$, LaAl$_2$, Li$_9$Al$_4$, Li$_5$AlO$_4$ |
| 0.505 | −62.00 | ZrAl$_2$, LaAl$_2$, Li$_2$O, Li$_5$AlO$_4$ |
| 0.706 | −58.12 | ZrAl$_2$, La$_2$O$_3$, Li$_2$O, Li$_5$AlO$_4$ |

Figure 20:
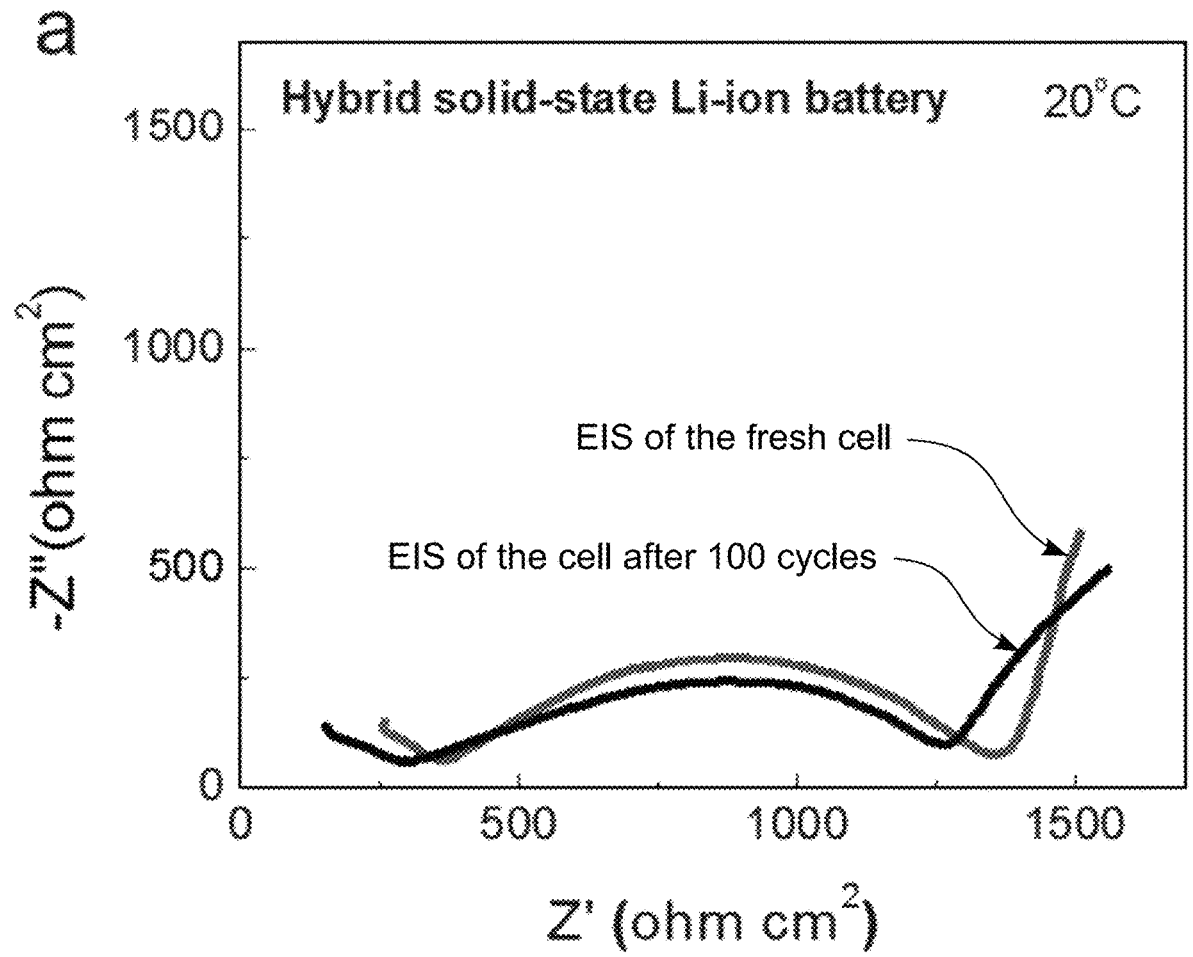
FIG. 20 shows solid-state battery demonstrations. (a) EIS of the solid-liquid Li-ion batteries. LiFePO$_4$ cathode is used with a conventional electrolyte on the cathode side: 1M LiPF$_6$ in EC/DEC (1:1 by volume). (b) Galvanostatic charge/discharge profiles of the solid-liquid Li-ion cell. (c) Cycling performance of the cell over 100 cycles at different current densities. (d) Electrochemical performance of the solid-liquid Li—S cell. Elemental sulfur was used as the cathode and 1M LiTFSI in DME/DOL (1:1 by volume) was used as the electrolyte on the cathode side. (e) Electrochemical performance of the solid-liquid Li—O$_2$ battery. Highly conductive carbon was used as the cathode and 1M LiTFSI in TEGDME was used on the cathode side.
Figure 20:
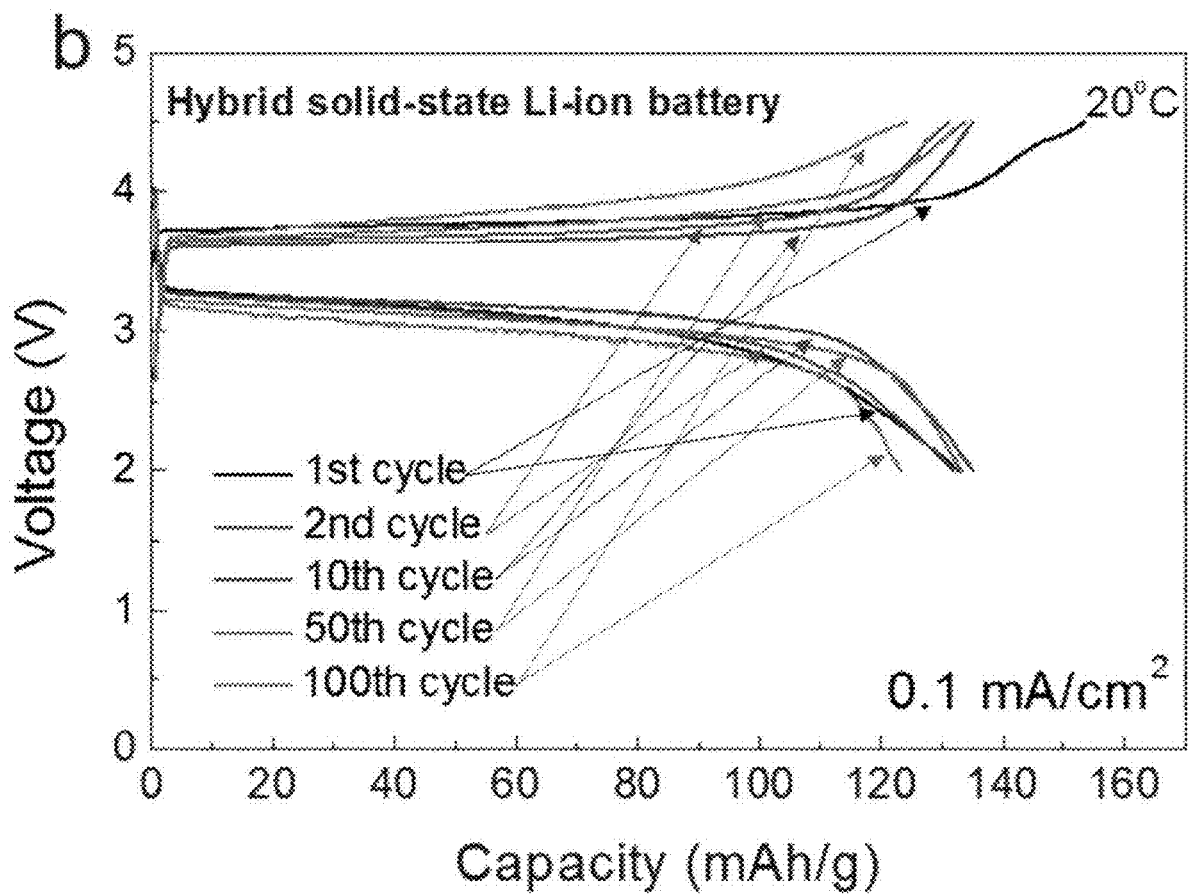
Figure 20:
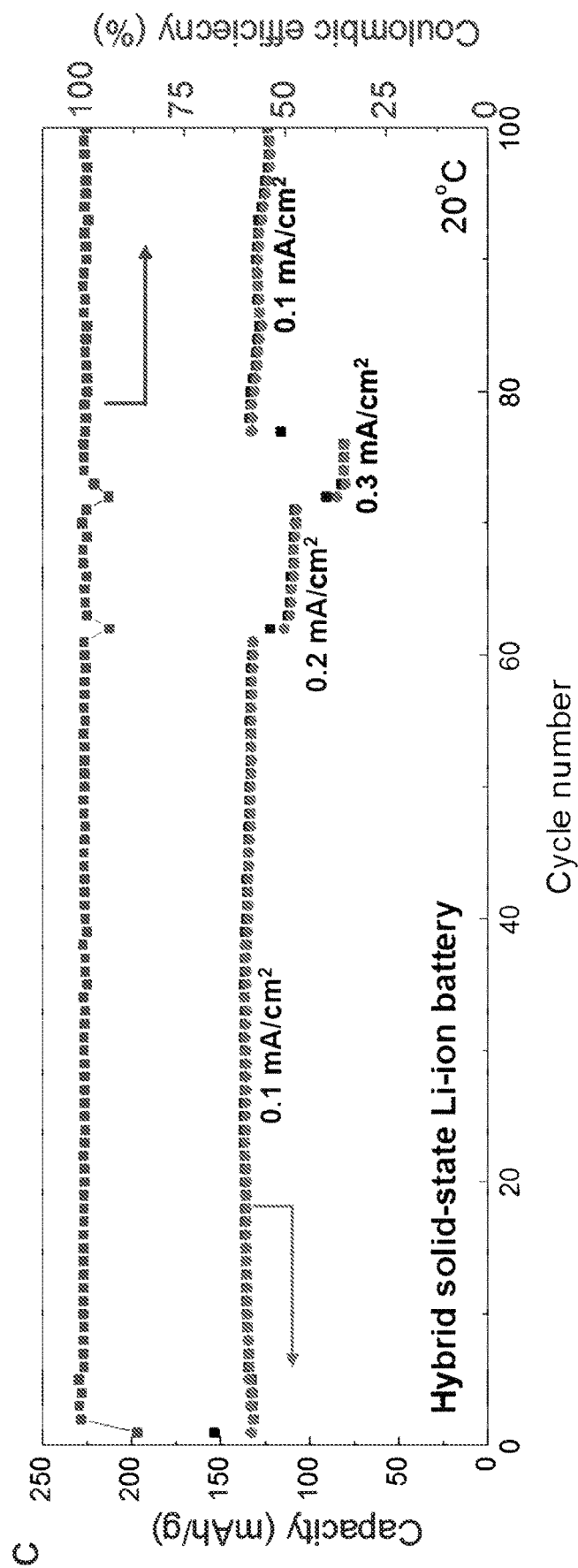
Figure 20:
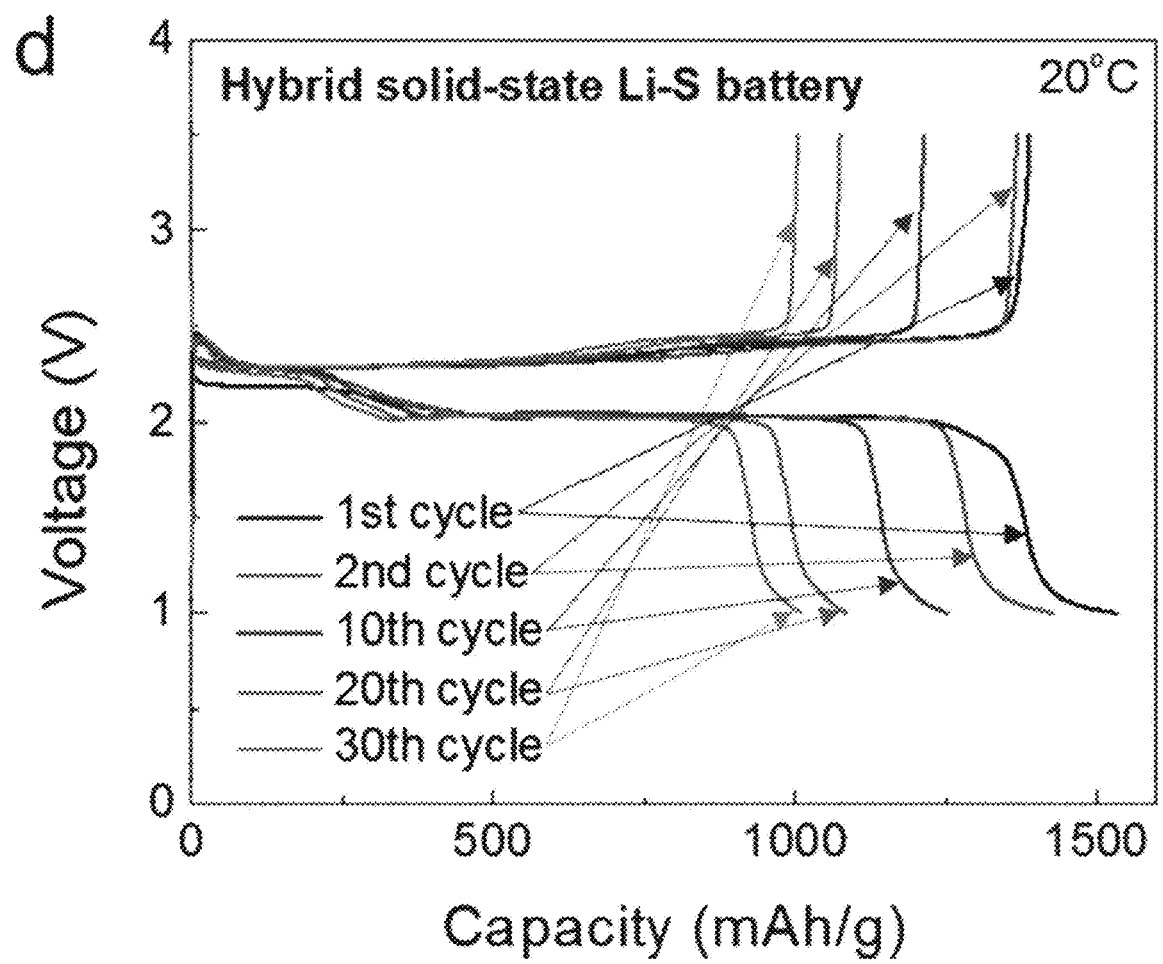
Figure 20:
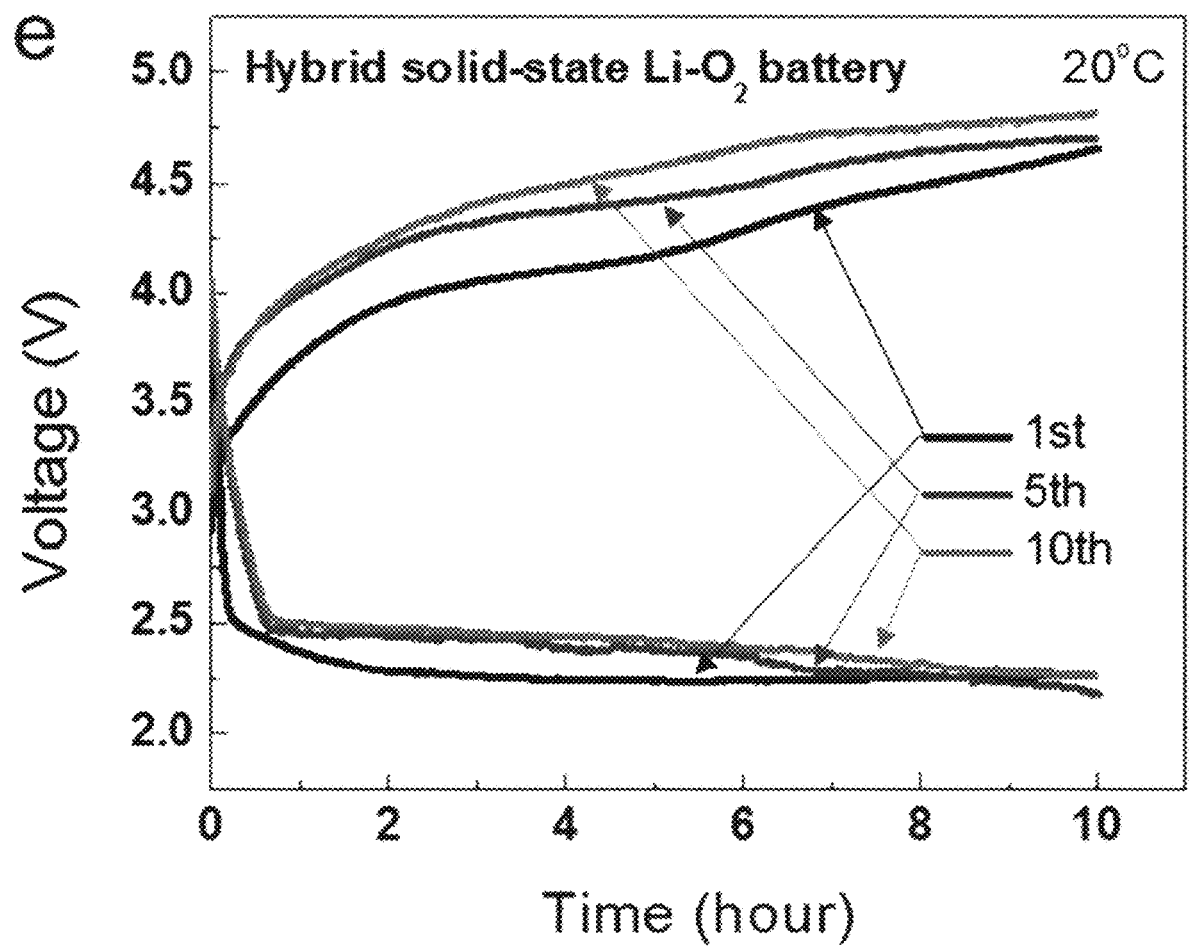

The electrochemical performance of the solid-state Li-ion batteries using a lithium iron phosphate (LiFePO$_4$) cathode are shown in FIG. 20a-c tested at 20° C. The impedance profiles of the fresh and cycled solid-state LIBs are shown in FIG. 20a. The partial semicircle at high frequency is similar to the impedance profile of the symmetric Li|Al-Garnet SSE-Al|Li cell. The large semicircle in the medium frequency is attributed to a mix of the charge transfer and diffusion processes in the liquid electrolyte system of the cathode. The fresh cell had an overall impedance of 1360 ohm*cm$^2$. After 100 cycles, the overall impedance decreased to 1260 ohm*cm$^2$. The slight decrease of the partial semicircle at high frequency demonstrates the reduced interfacial resistance of garnet SSE against Li metal after cycling. The charge and discharge profiles of the solid-state LIB cell is shown in FIG. 20b. The cathode active material has a loading of 1.0 mg/cm$^2$. At a current density of 0.1 mA/cm$^2$, the cell delivered an initial charge and discharge capacity of 153 and 132 mAh/g, with a 86% Coulombic efficiency (defined as the ratio of charge capacity over discharge capacity). With further cycling, the capacities remain relatively stable (>120 mAh/g over 100 cycles). As shown in FIG. 20c, the Coulombic efficiency was ~100% and the cell exhibited good rate capability when higher current densities (0.2 and 0.3 mA/cm$^2$) were applied.

Figure 31:
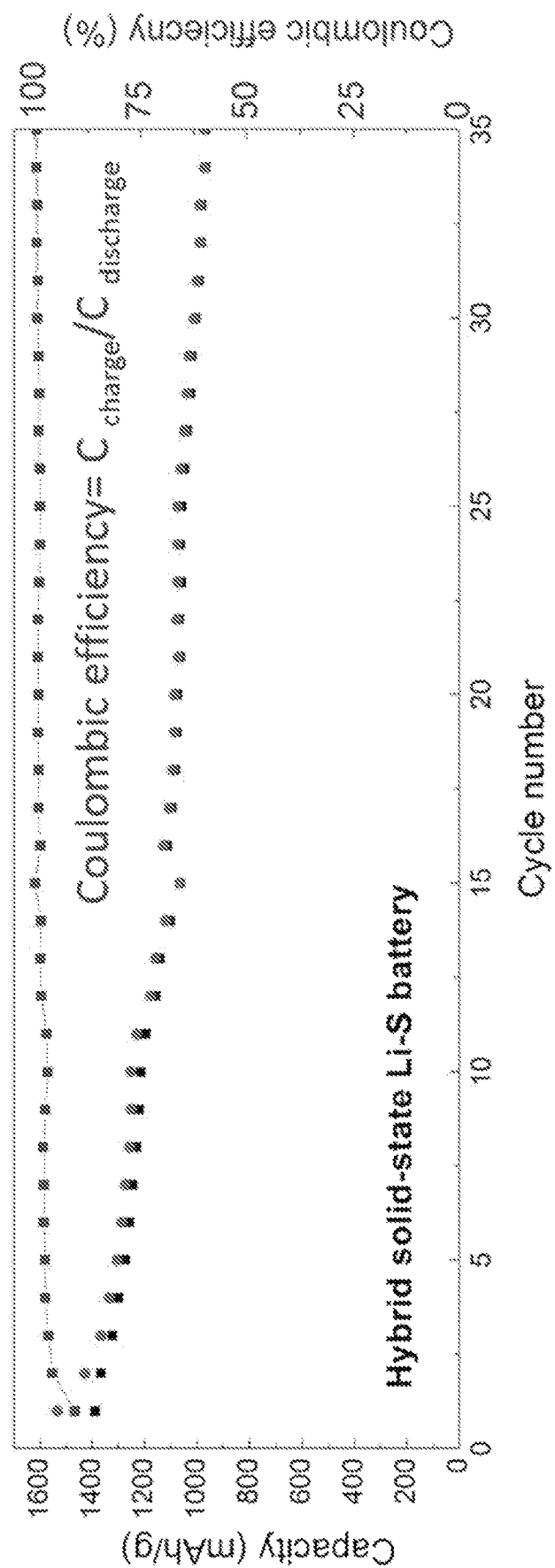
FIG. 31 shows electrochemical performance of solid-state Li—S battery: cycling stability of the cell and Coulombic efficiency of the cell. Note that the Coulombic efficiency is defined as the ratio of charge capacity divided by the discharge capacity.
Figure 32:
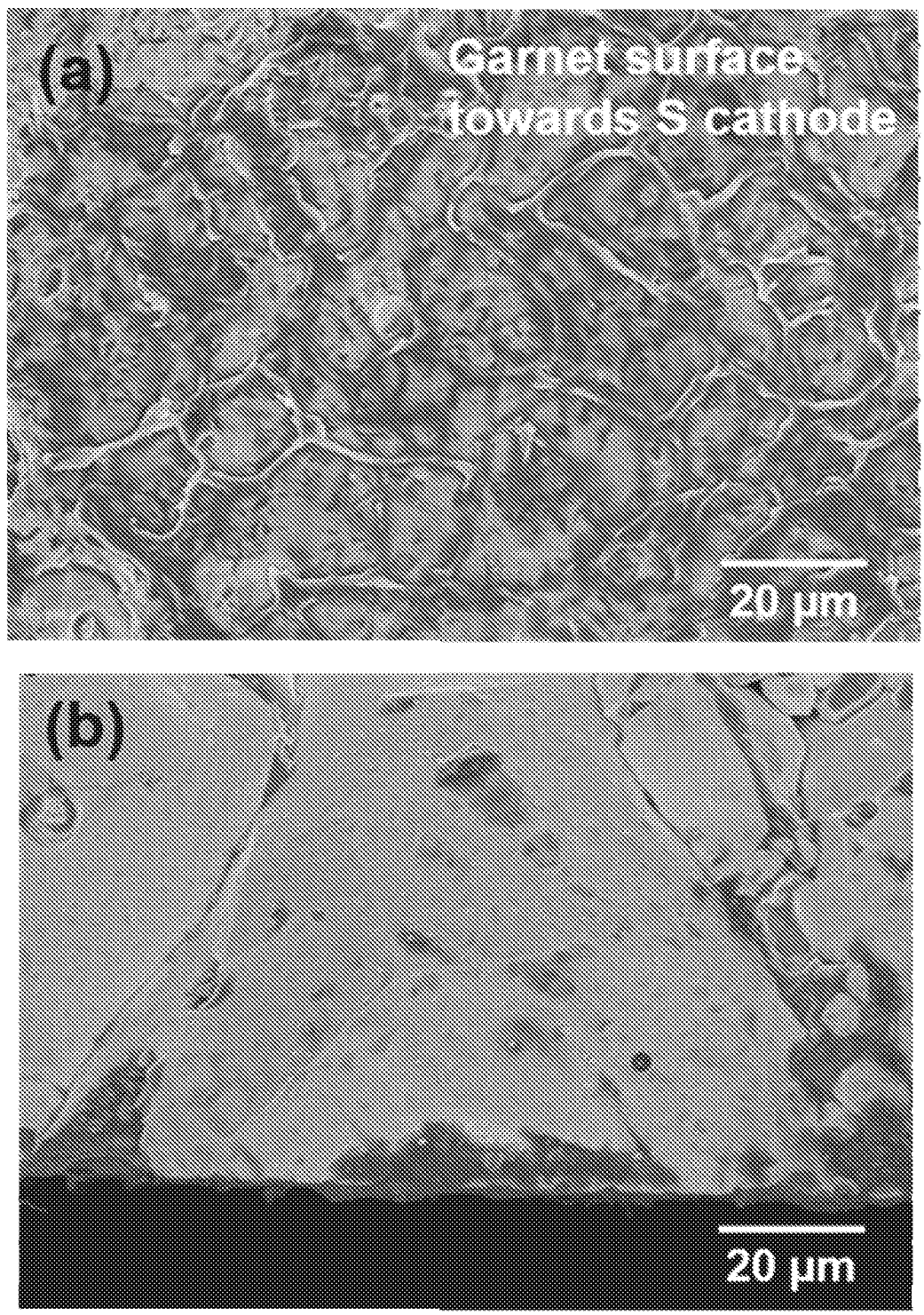
FIG. 32 shows an SEM of the garnet SSE in cycled Li—S cell. (a) Top-view of garnet SSE surface towards S cathode. Large amount sulfur and polysulfides were deposited on garnet SSE surface. (b) Cross-section of garnet SSE. The isolated pores were filled with sulfur and polysulfides.
Figure 33:
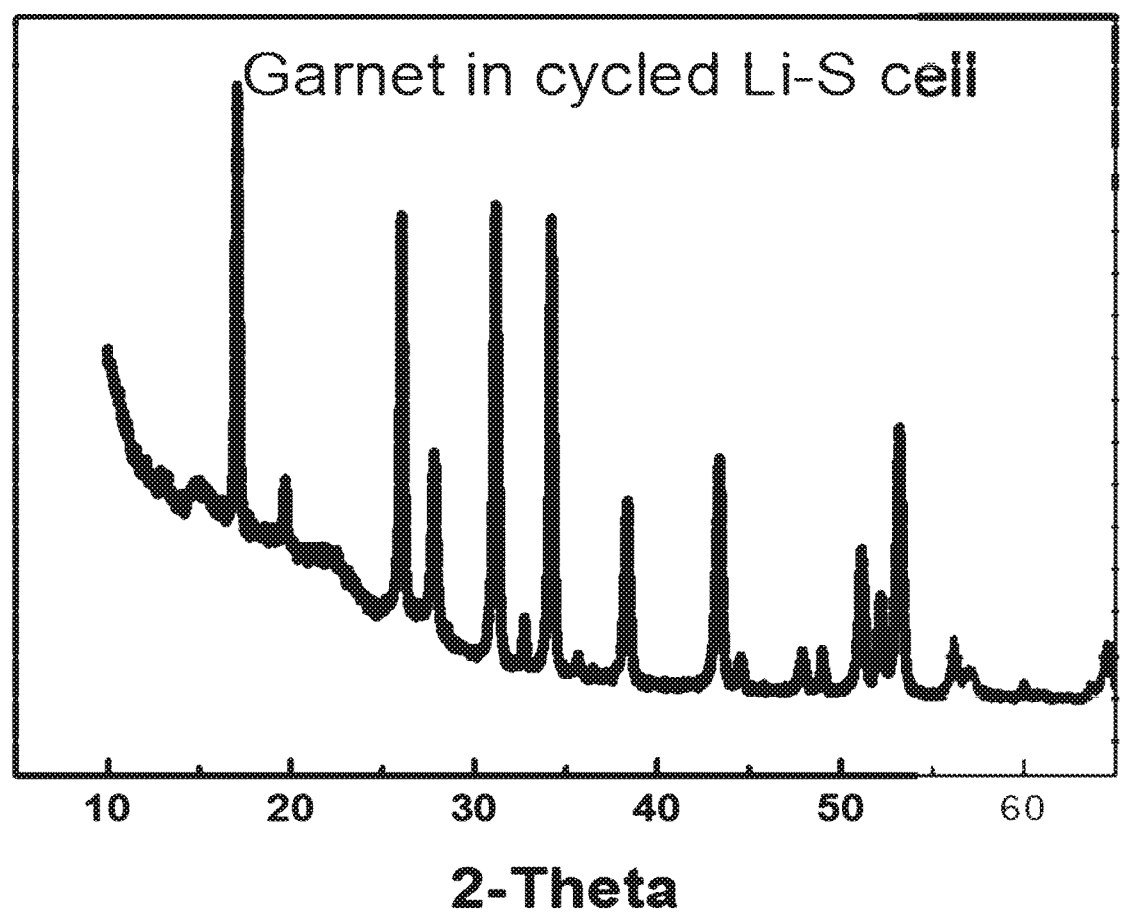
FIG. 33 shows an XRD profile of the garnet after cycling in Li—S cell.

Conventional Li—S batteries employing liquid electrolyte suffer from the polysulfide shuttling effect as well as side reactions with Li metal that cause significant capacity decay and low Coulombic efficiency. The solid-state electrolyte system can avoid these issues. The dense garnet SSE can physically block the dissolved polysulfides from reacting with the Li metal, and locally confine the sulfur/polysulfide active materials to the cathode side. To demonstrate the garnet SSE blocking effect in the Li—S system, an elemental sulfur cathode was used to construct the solid-liquid Li—S battery full cell. 1M LiTFSI in DME/DOL (1:1 by volume), was applied to the sulfur cathode. The sulfur loading was ~1.0 mg/cm$^2$. The galvanostatic discharge and charge curves are shown in FIG. 20d. The initial discharge and charge capacity was 1532 and 1388 mAh/g, respectively, which corresponds to 90.6% Coulombic efficiency. The cycling performance exhibited both high capacity and >99% Coulombic efficiency, which indicates that the garnet SSE can effectively block the polysulfide migration/shuttling effect for Li—S batteries (FIG. 31). Note that the shuttling effect in liquid electrolyte-based Li—S batteries exhibits a higher charge capacity than the discharge capacity. In this system, the Coulombic efficiency is typically defined as the ratio of discharge capacity over charge capacity. The cell performance degradation is possible due to the deposition of the dissolved sulfur and polysulfide materials into the isolated pores on garnet SSE surface (FIG. 32). These deposited active materials lack sufficient electron transfer pathway and became "dead active materials" that cannot be used anymore, which leads to fast capacity decay. Garnet SSE remained stable and no phase change after cycling in batteries (FIG. 33).

We demonstrated an effective strategy to modify the garnet solid electrolyte (Li$_7$La$_{2.75}$Ca$_{0.25}$Zr$_{1.75}$Nb$_{0.25}$O$_{12}$) and Li metal by introduction of an ultrathin conformal metal coating. We discovered that the metal layer would be replaced by molten lithium metal immediately and then migrated towards the bulk lithium metal. The alloying process significantly improves the wettability between the molten lithium metal and garnet SSE. By forming this Li-rich solid solution, the garnet surface becomes lithiophilic which allows the bulk Li electrode to adhere conformally to the garnet surface after solidification of molten lithium metal. Since the Li/metal weight ratio is near 100%, their solid solution can be considered as a pure Li phase. As a result, intimate contact between garnet and Li metal is achieved which decreases the interfacial resistance, minimizes polarization and stabilizes the voltage plateau during lithium stripping/plating. The interfacial resistance at 20° C.

was drastically reduced from 950 to 75 ohm*cm$^2$ using the Al-coated garnet SSE. Li stripping and plating behavior of the symmetric cells exhibited a flat voltage plateau, demonstrating a stable charge transfer at the lithium/garnet SSE interface. It is expected that a series of metals, which could be alloyed with molten Li, can be used to modify the interface wettability with Li metal. This has addressed the main challenge of surface wettability between a garnet solid-state electrolyte and Li metal. This avoids some fundamental challenges linked with conventional liquid-based electrolytes, such as Li dendrite growth, which paves the way for next-generation Li metal batteries.

Garnet solid-state electrolyte preparation. The LLCZN powder was synthesized via a modified sol-gel method. The starting materials were LiNO$_3$ (99%, Alfa Aesar), La(NO$_3$)$_3$ (99.9%, Alfa Aesar), Ca(NO$_3$)$_2$ (99.9%, Sigma Aldrich), ZrO(NO$_3$)$_2$ (99.9%, Alfa Asear) and NbCl$_5$ (99.99%, Alfa Aesar). Stoichiometric amounts of these chemicals were dissolved in de-ionized water and 10% excess LiNO$_3$ was added to compensate for lithium volatilization during the high temperature pellet preparation. Citric acid and ethylene glycol (1:1 mole ratio) were added to the solution. The solution was evaporated at 120° C. for 12 h to produce the precursor gel and then calcined to 400° C. and 800° C. for 5 hours to synthesize the garnet powder. The garnet powders were then uniaxially pressed into pellets and sintered at 1050° C. for 12 hours covered by the same type of powder. The sintered LLCZN pellets were polished to 300 um thickness with a smooth surface. For the Al coating, 20 nm of Al was deposited using an Angstrom NexDep Ebeam evaporator at a rate of 0.2 nm/s. The pressure was kept below 5×10E-6 Torr during the deposition process.

Material characterization. The phase analysis was performed with powder X-ray diffraction (XRD) on a D8 Advanced with LynxEye and SolX (Bruker AXS, WI, USA) using a Cu Kα radiation source operated at 40 kV and 40 mA. The morphology of the samples was examined by a field emission scanning electron microscope (FE-SEM, JEOL 2100F).

Electrochemical characterization. The symmetric Li|solid-state electrolyte|Li cell was prepared and assembled in an argon-filled glovebox. The garnet electrolyte ceramic disk was wet polished using sand paper (400 and 800 grit) and rinsed with isopropanol alcohol (IPA) several times. The thickness (300 um) of the garnet ceramic was controlled. To measure the ionic conductivity of the garnet solid-state electrolyte, an Au paste was coated on both sides of the ceramic disk and acted as a blocking electrode. The gold electrodes were sintered at 700° C. to form good contact with the ceramic pellet. To prepare the non-blocking cell with Li metal, Li granular (99%, Sigma) was pressed into fresh Li foil then the surface was polished to remove the oxidized layer. Fresh Li electrodes were then attached to the ceramic disk's surfaces and gently pressed by hand. The symmetric cell was placed in between the stainless steel plates, and heated at 170° C. to soften the Li metal before being gently pressed by hand to improve contact with the stainless steel. The symmetric cell was heated to 200° C. to melt the Li and naturally cooled down to room temperature. The symmetric cell was then assembled into a 2032 coin cell with a highly conductive carbon sponge. Battery test clips were used to hold and provide good contact with the coin cell. The edge of the cell was sealed with epoxy resin. The EIS was performed in a frequency range of 1 MHz to 100 mHz with a 50 mV perturbation amplitude. Conductivities were calculated using $\sigma=L/(Z \times A)$, where Z is the impedance for the real axis in the Nyquist plot, L is the garnet ceramic disk length, and A is the surface area. The activation energies were obtained from the conductivities as a function of temperature using the Arrhenius equation. The symmetric cell was tested on a home-made hotplate. The galvanostatic Li stripping and plating test was performed with a Bio-logic MPG-2 battery cycler. All the cells were tested in an argon-filled glovebox.

First Principles Computation. We considered the interface as a pseudo-binary of Li—Al alloy and garnet SSE using a known approach. The phase diagrams were constructed to identify possible thermodynamically favorable reactions. The energies for the materials used in our study were obtained from the Materials Project (MP) database, and the compositional phase diagrams were constructed using the pymatgen package. The mutual reaction energy of the pseudo-binary is calculated using a known approach.

All the cells were assembled in an argon-filled glove-box. The solid-state cells were assembled in 2032 coin cells following the similar schematic shown in FIG. 28. The electrode slurry coating method was carried out in ambient environment. The LiFePO$_4$ electrode consists of 70% commercial LiFePO$_4$ powder from MTI Corporation, 20% carbon black and 10% polyvinylidene fluoride (PVDF) binder in N-methyl-2-pyrrolidone (NMP) solvent. The electrode was dried in vacuum at 100° C. for 24 hours. 1M LiPF$_6$ in a mixture of ethylene carbonate (EC) and diethyl carbonate (DEC) (1:1 by volume) was used as the electrolyte for the solid-state Li-ion batteries. The galvanostatic charge and discharge test was measured using a cutoff voltage window of 2-4.5 V. The sulfur electrode consists of 70% elemental sulfur powder (Sigma), 20% carbon black and 10% polyvinylpyrrolidone (PVP, Sigma, M$_w$=360,000) binder in water. The electrode was dried in vacuum at 60° C. for 24 hours. 1M bis(trifluoromethane)sulfonimide lithium salt (LiTFSI, Sigma) in a mixture of dimethoxyethane (DME) and 1,3-dioxolane (DOL) (1:1 by volume) was used as the electrolyte for the solid-state Li—S batteries. The galvanostatic discharge and charge test was measured using a cut-off voltage window of 1-3.5 V.

EXAMPLE 4

This example provides a description of metal-alloy layers of the present disclosure and methods of making such layers.

We developed a one-step soldering type technique to quickly coat molten Li onto different substrates including metals, ceramics, and polymers. By adding alloy elements, the surface energy and the viscosity of the molten Li are tuned to improve the wettability. When soldered onto the surface of garnet-based SSEs, the Li alloys exhibit a significantly improved contact, which leads to an interface resistance as low as ~7 Ω·cm$^2$. The electrochemical cycling also shows an excellent stability of the interface and the alloy electrodes. Additionally, several Li binary alloys as well as a Na binary alloy were successfully tested on various substrates to demonstrate the universality of this soldering technique. For example, the technique can be used for battery applications.

In more detail, we successfully demonstrated a universal soldering type technique that can quickly coat molten lithium or sodium metals onto different types of substrates for solid state battery applications. By adding the alloy elements, both the surface energy and viscosity of the molten Li were increased, and therefore the Li-rich molten alloys showed a much improved wettability on substrates including ceramics, metals, and polymers. To demonstrate this coating technique in solid state battery application, the molten Li—Sn alloy was successfully coated onto a fresh-polished garnet pellet like a quick soldering in less than 1 minutes. The SEM images confirmed the tight and conformal contact between the alloy and garnet surface, which resulted in an interfacial resistance as low as ~7 $\Omega \cdot cm^2$. The Li plating-stripping cycling further demonstrated stability of the Li-rich alloy anode and its interface with garnet SSEs. To demonstrate the universality of this soldering-like coating technique, several Li-based binary alloys were tested and successfully coated onto various substrates. Similar effect also applied to Na-based molten alloy, where Na—Sn alloy showed a significantly improved wettability on an aluminum substrate. Therefore, this alloy based soldering technique fundamentally solved the contact problem between Li metal anode and garnet SSEs for solid state Li metal battery applications. It also inspires new strategies to use Li or Na metals for battery applications, such as flexible Li or Na metal batteries, and solid state Na metal batteries.

Figure 34:
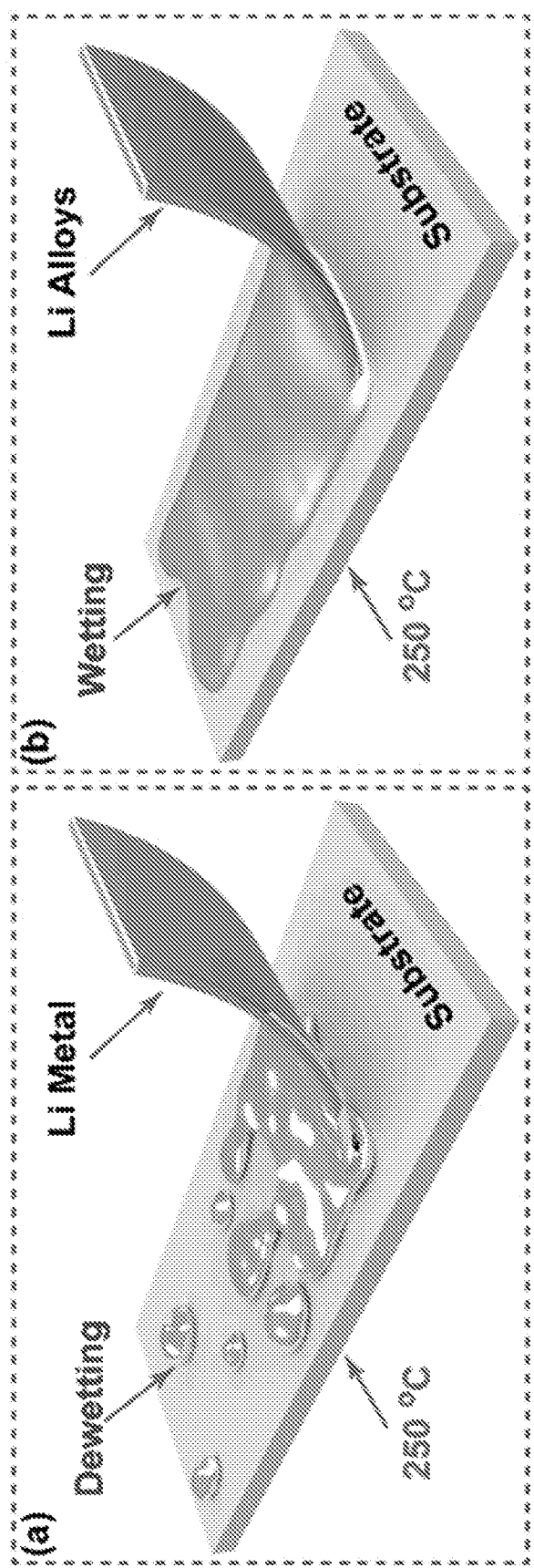
FIG. 34 shows a schematic of soldering Li and Li alloy onto substrates. (a) Pure molten Li shows a Poor wettability on the solid substrate. (b) Li alloy can be easily soldered on to the substrate with much improved contact.

FIG. 34 depicts the different wetting behaviors of pure lithium metal and lithium alloys on a solid substrate. The pure molten lithium is normally dewetting to most solid substrates, such as ceramics, polymers, and even metals due to the large difference in surface energy (FIG. 34a). By adding other elements that can alloy with Li, the surface energy of molten Li can be tuned so that the molten alloys can have an excellent wettability to those aforementioned substrates. The Li alloys can be easily soldered onto the substrates in 1 minutes and show much improved wettability (FIG. 34b).

Figure 35:
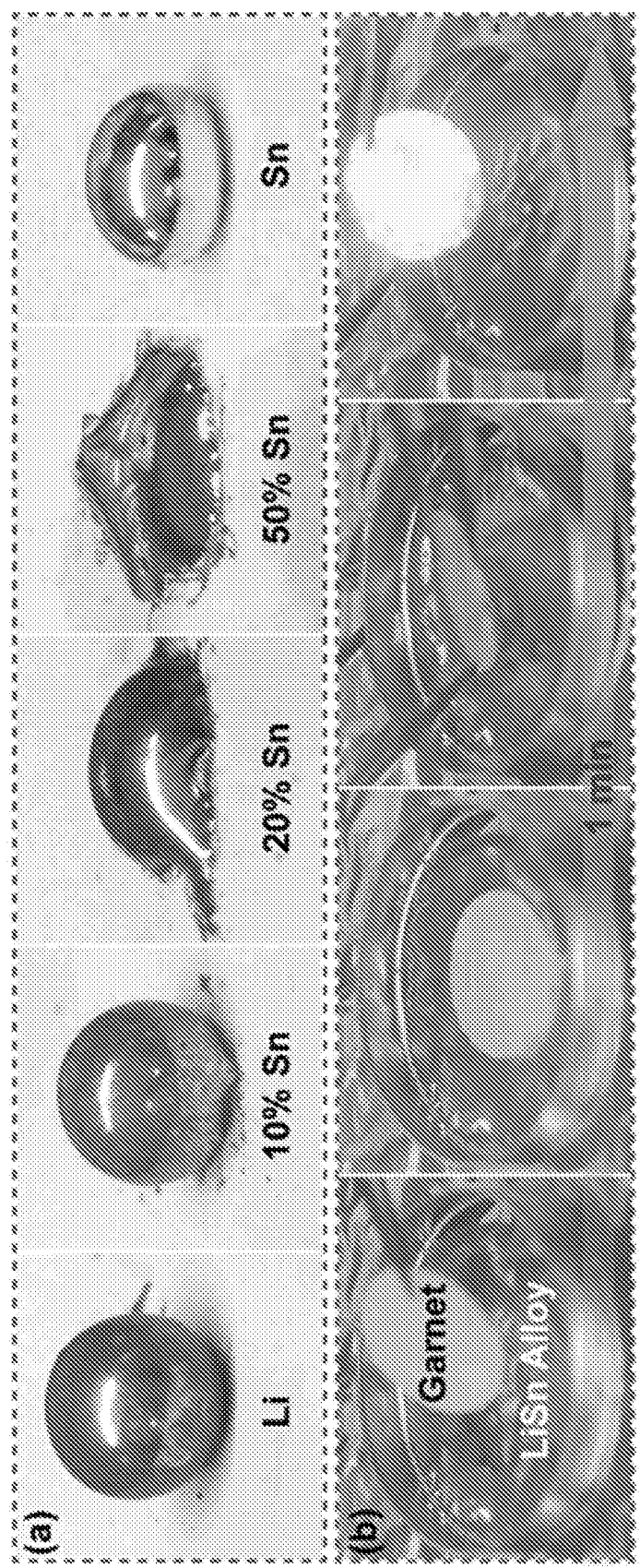
FIG. 35 shows wettability of Li—Sn alloys on ceramic substrates. (a) Wettability of molten Li—Sn alloys with different ratios of Sn on alumina substrates. The increasing contents of Sn significantly improve the wettability of molten Li against alumina. (b) Images demonstrate the effective and fast wielding process of Li—Sn alloy on garnet SSE pellets. In less than 1 minutes, the fresh-polished garnet pellet was successfully coated with uniform Li—Sn alloy. (c, d) Cross-section SEM images of the garnet pellet coated with Li—Sn alloy at different magnifications, which indicate a conformal and tight contact between the alloy and garnet SSE.
Figure 35:
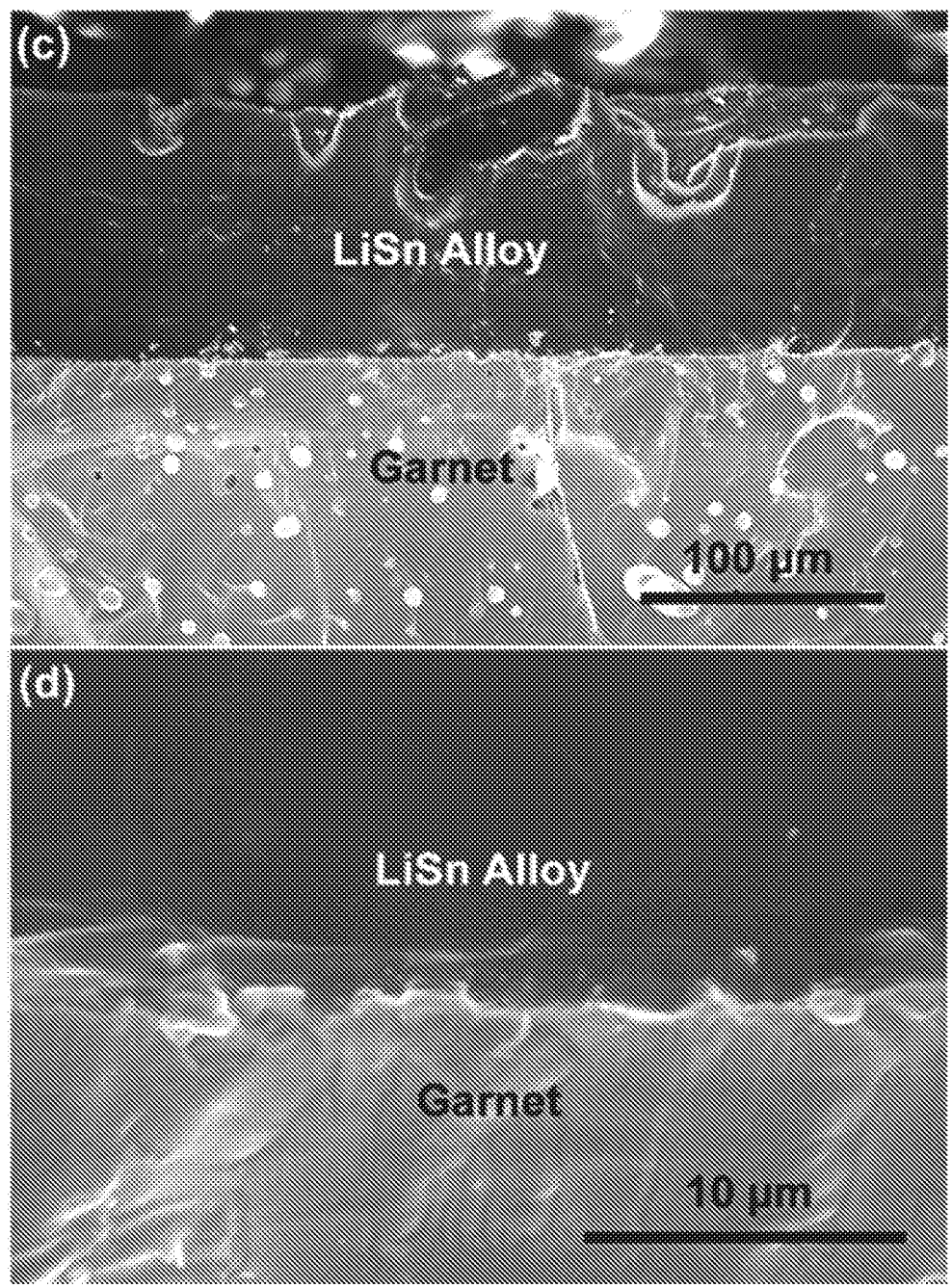

To demonstrate the effect of alloy elements on the wettability of molten Li, Li—Sn alloys with various weight ratio were prepared as examples to test the wetting performance on alumina ceramic substrates (FIG. 35a). While both pure molten Li and Sn are totally dewetting to alumina substrates, their binary alloys show improving wettability as the ratio of tin increases. When added 10 wt % tin, the molten Li starts to wet the substrate, but still has large contact angle (>90°). When the ratio of tin is increased to 20 wt %, the molten alloy already can wet the substrate with a contact angle smaller than 90°. The Li—Sn allolys with 50 wt % or more Sn can be easily smeared on to the substruate like paint with nigligible contact angle. To demonstrate the application in solid state Li metal batteries, Li—Sn allolly was coated onto garnet-based SSE to improve the contact between Li metal anode and garnet SSE. Unlike previous methods, no surface treatments are required for garnet pellet to improve the wettability against Li. In the demonstration (FIG. 35b), the fresh-polished garnet pellet can be quickly and uniformly wetted by molten Li—Sn alloy (20-50 wt % Sn) within 1 min, much faster than previously reported. The SEM images (FIGS. 35c and 35d) also confirm the excellent and uniform coating of Li—Sn alloy on garnet pellet. In the zoom-in SEM image (FIG. 35d), the alloy shows a tight and conformal contact with garnet SSE, which further demonstrate the effectiveness and efficiency of Li—Sn alloy in soldering Li metal anode onto garnet SSE.

Figure 36:
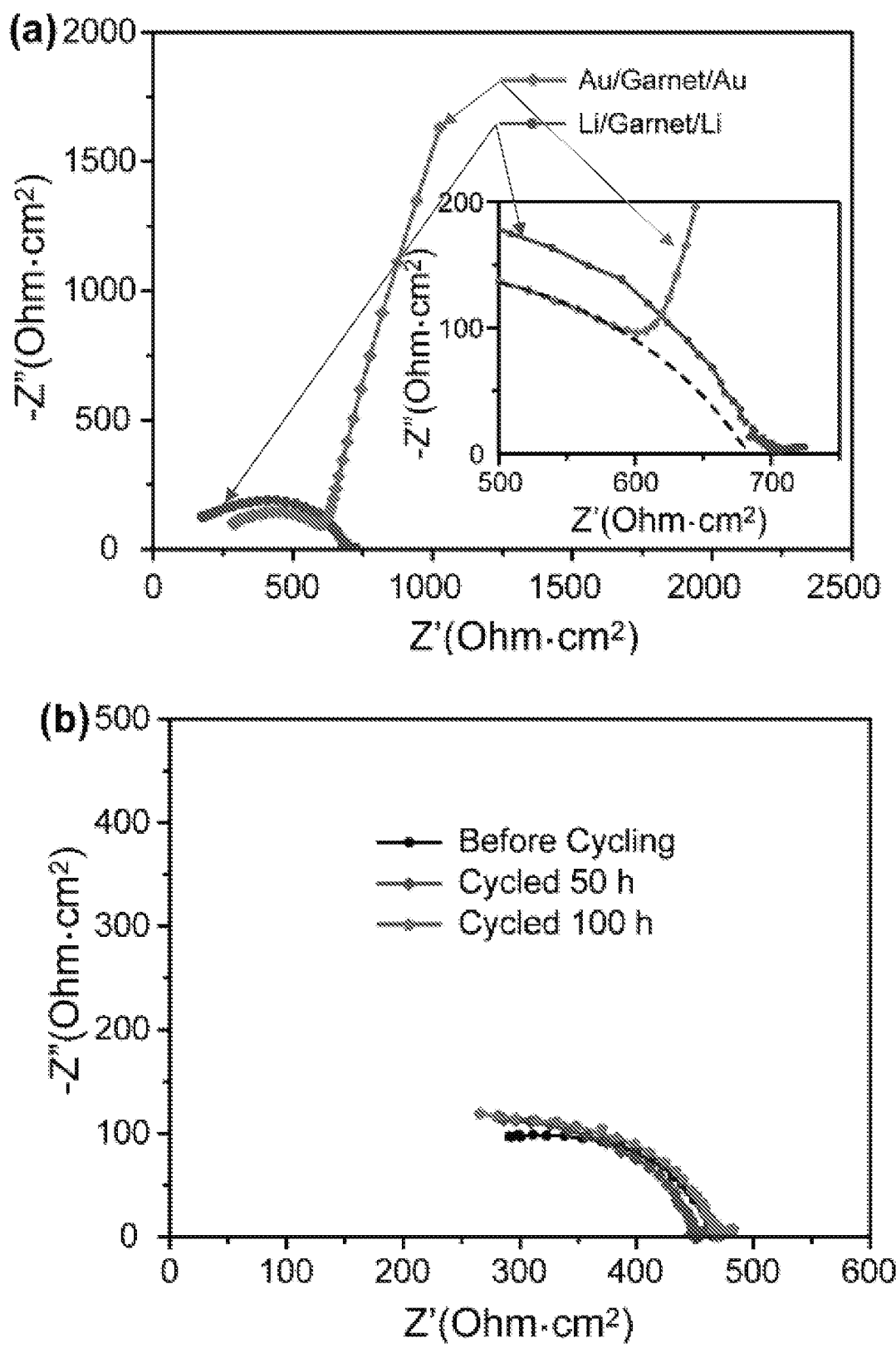
FIG. 36 shows electrochemical measurements of Li/garnet/Li symmetric cells made with Li—Sn alloy coating. (a) EIS measurements of Au/garnet/Au and Li/garnet/Li symmetric cells for calculating interfacial resistance. (b) EIS measurements of Li/garnet/Li symmetric cells before and during the Li plating-stripping cycling at different time, indicating a stable interfacial resistance. (c) Voltage profiles of the corresponding Li/garnet/Li symmetric cells during plating-stripping cycling at a current density of 50 μA/cm$^2$. The periodic variation is due the temperature change during day and night. The insets are the zoom in profiles at different time.
Figure 36:
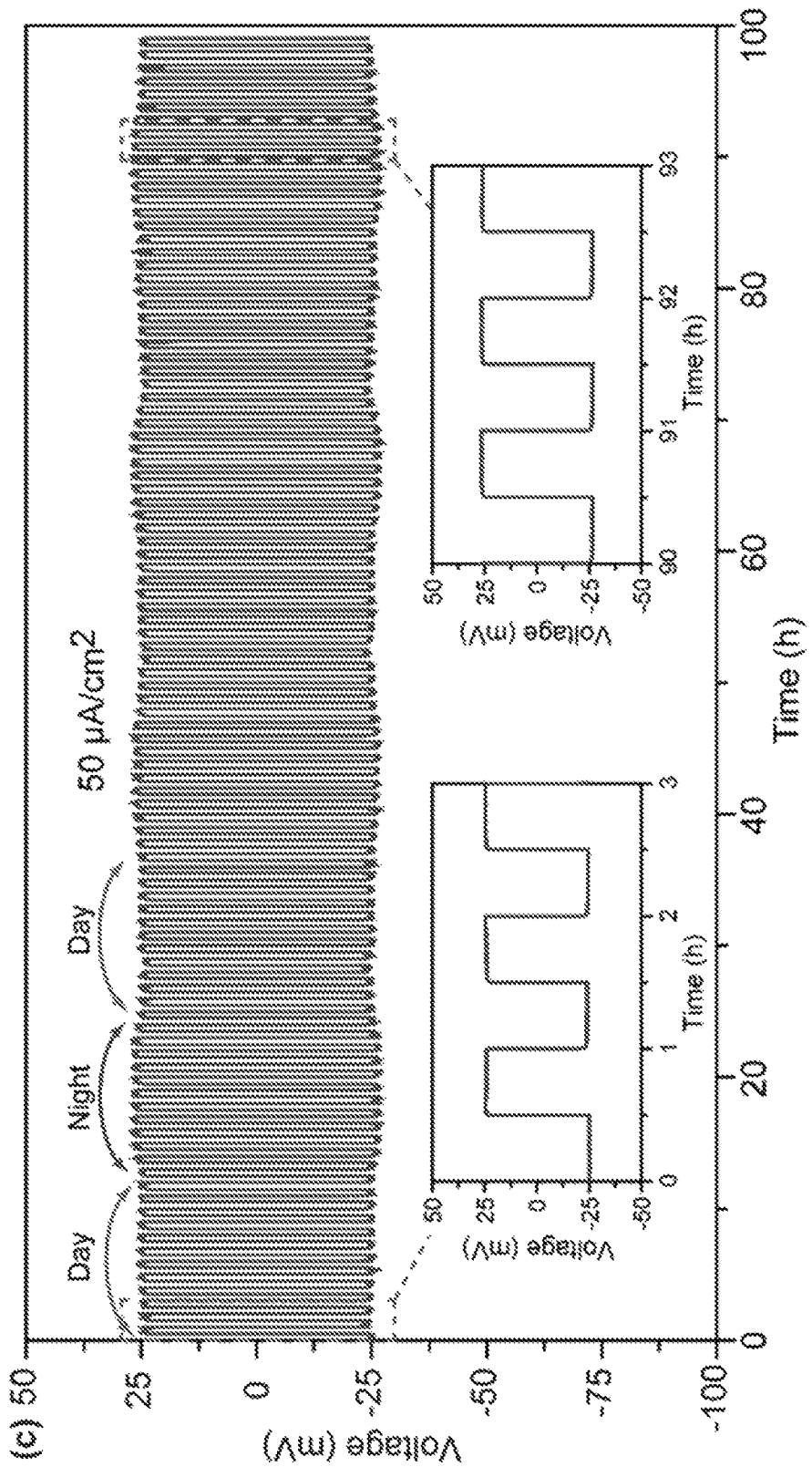

The continuous and tight contact between Li alloy and garnet SSE also results in excellent electrochemical performance in solid state cells. To evaluate the interfacial properties of Li alloy and garnet SSE, Li—Sn/garnet/Li—Sn symmetric cells were fabricated to conduct the electrochemical impedance spectroscopy (EIS) and the symmetric DC stripping-plating measurements. FIG. 36a exhibits the EIS measurements of the symmetric cells made with same garnet pellet coated with gold or lithium on both sides, respectively. Firstly, the Au/garnet/Au symmetric cell was made by coating the fresh-polished garnet pellet with gold paste on both sides and then annealed at 800° C. for 30 minutes to ensure a good contact. Since the gold electrodes can block Li ion transport, the EIS measures the bulk resistance of garnet pellet and has a long Warburg diffusion tail at low frequencies. The semicircle part of EIS is fitted to have an interception with real axis (inset of FIG. 36a), which is used to estimate the bulk resistance of garnet pellet. Secondly, the Au coated garnet pellet was carefully polished to remove the gold electrodes and then quickly coated with Li—Sn alloy (~30 wt % Sn) following the aforementioned procedure to prepare Li/garnet/Li symmetric cell. The EIS of Li/garnet/Li symmetric cell does have diffusion tail at low frequencies because of lithium metal on both sides. For this cell configuration, the overall resistance consists of bulk resistance of garnet pellet and the interfacial resistances between Li—Sn alloy and garnet pellet on both sides. Therefore, the difference of EIS intercepts on real axis between these two symmetric cells can be used to estimate the two interfacial resistances between Li—Sn alloy and garnet pellet. The interfacial resistance is calculated to about 7 $\Omega \cdot cm^2$, which is much smaller than most of values reported previously. Considering the efficiency and effectiveness of this technique, Li—Sn alloys have great potential in soldering Li metal anode onto garnet SSEs for practical solid state Li metal battery applications. To the best of our knowledge, this technique is the most effective and feasible way to solve the contact and interfacial resistance between Li metal anode and garnet-based SSEs. To further study the stability of the interface between Li—Sn alloy and garnet pellet during cycling, the Li/garnet/Li symmetric cells were conducted DC plating-stripping test. According to the EIS measurements shown in FIG. 36b, the resistance of the symmetric cells almost keep constant during the cycling, which also agrees with the corresponding voltage profile shown in FIG. 36c. During 100 hours cycling, the voltage profile only shows slightly periodic variation for about every 24 hours, which is due to the room temperature change during day and night. In the zoom in profiles at different time (inset of FIG. 36c), the curves are smooth and stable, indicating the excellent stability of the interface between the soldered Li—Sn alloy and garnet pellet during electrochemical cycling.

Figure 37:
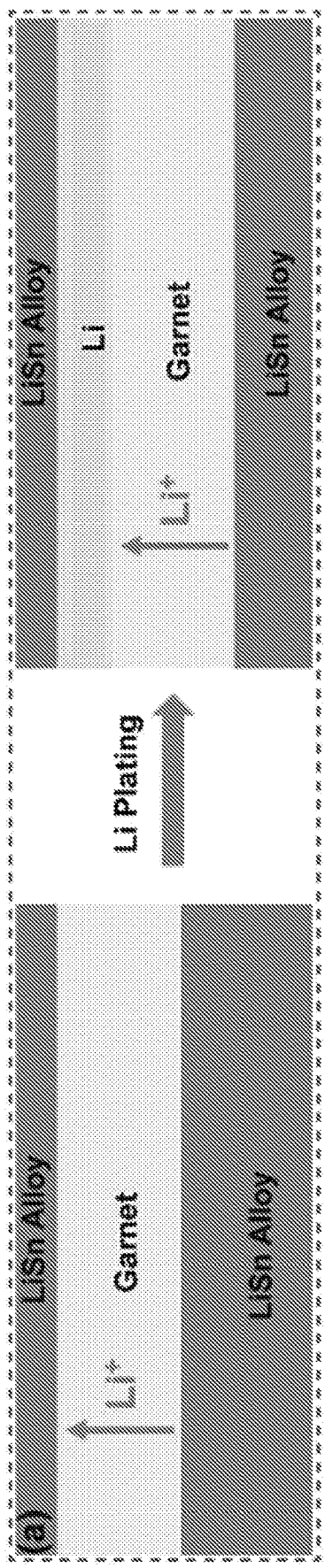
FIG. 37 shows morphology and interface changes of Li/garnet/Li symmetric cell during large capacity Li plating-stripping. Li is deposited under LiSn, e.g., Li is deposited directly on top of garnet. (a) Schematic of large capacity Li plating-stripping process for Li/garnet/Li symmetric cell, where Li is plated onto the thin Li—Sn alloy layer. Cross-section SEM images of Li—Sn alloy coated garnet before (b) and after (c) Li plated. (d) EDS mapping of Li plated area marked with green dashed line in (c). The newly plated Li is between the original Li—Sn alloy layer and garnet pellet. Cross-section SEM images of Li—Sn alloy coated garnet before (e) and after (f) Li stripped. (g) EDS mapping of Li stripped area marked with green dashed line in (f), where the leftover Sn does not show obviously local accumulation at the interface.
Figure 37:
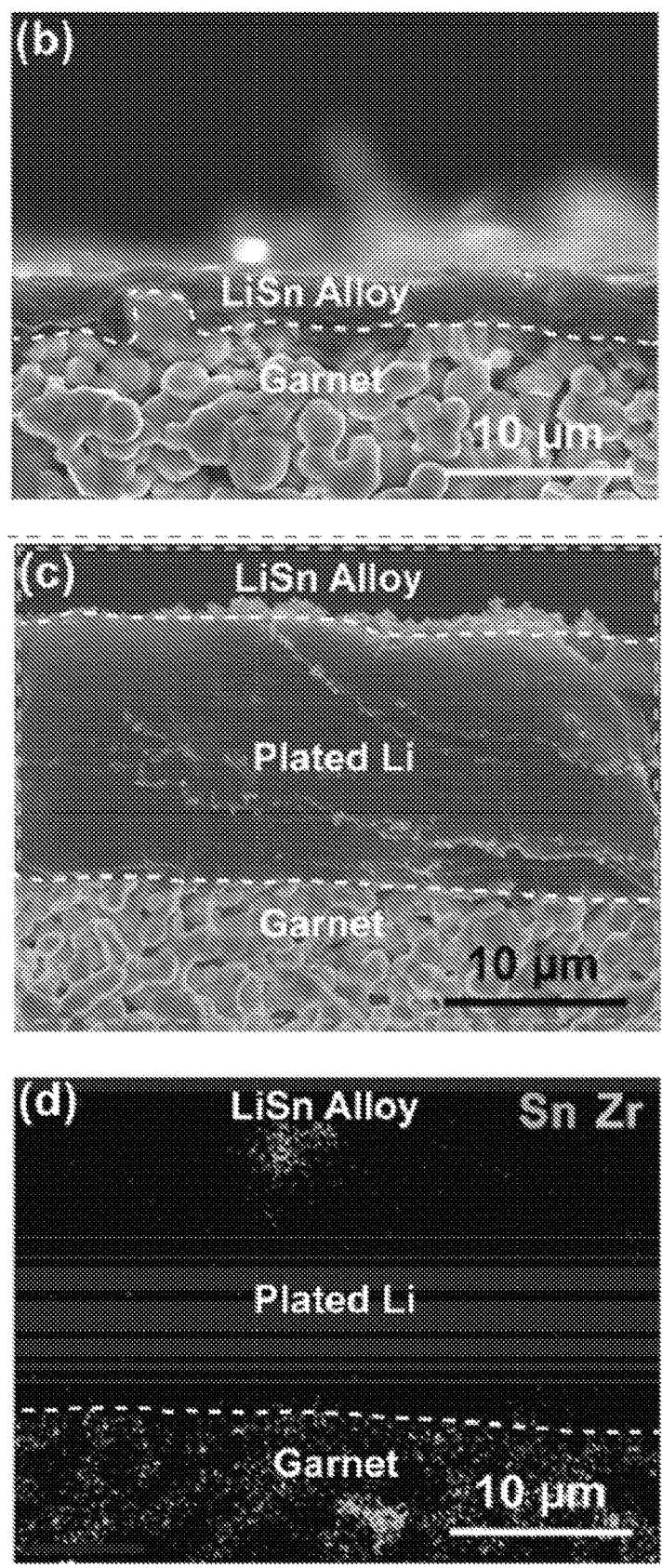
Figure 37:
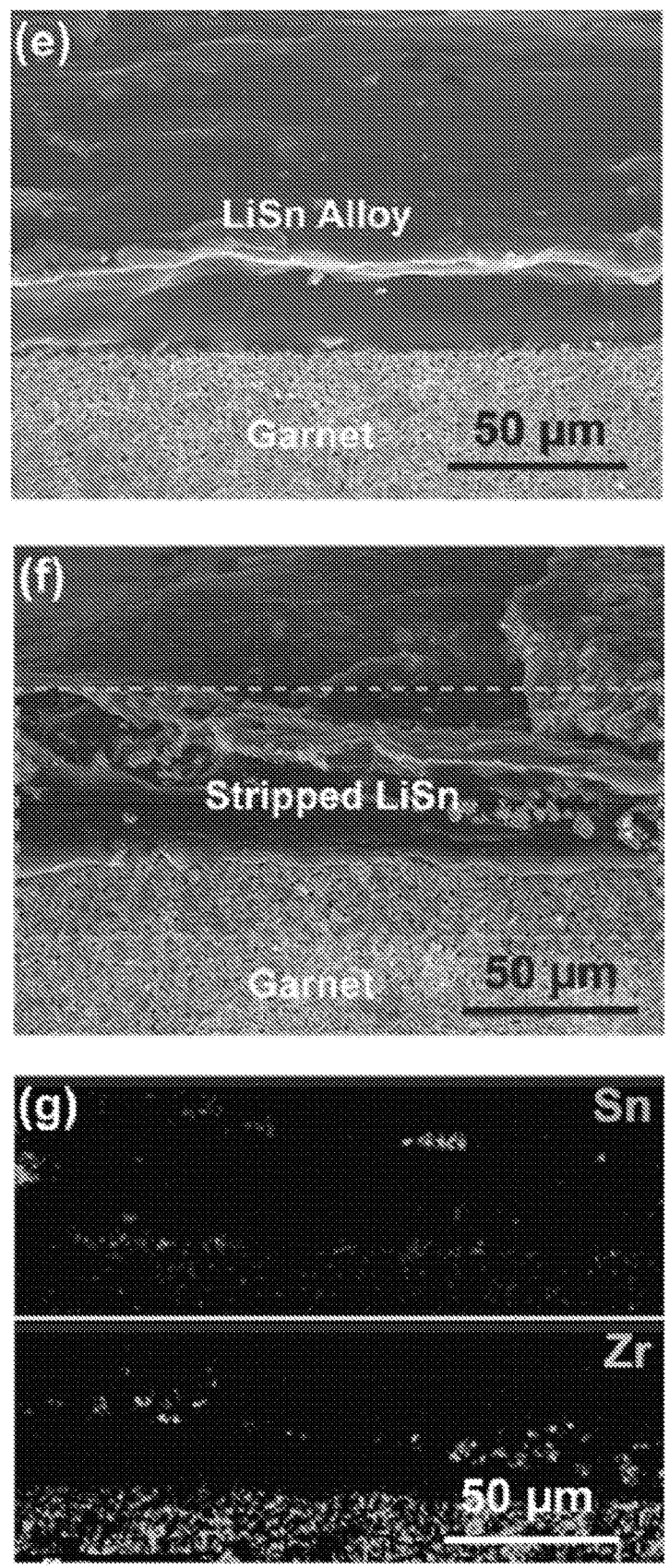

In the aforementioned study, the symmetric plating-stripping cycling only involved a small amount of lithium transport during the measurement. As the anode of lithium metal solid state battery for practical application, most of lithium in Li—Sn alloy will be involved in battery cycling. Therefore, the stability of interface and Li—Sn alloy electrode during large capacity cycling need to be further studied. For this case, a special symmetric cell was prepared to conduct the large capacity cycling. As FIG. 37a illustrates, one side of Li—Sn alloy is controlled to a thin layer, while the other side is much thicker to ensure enough Li. During the cycling, Li from the thick layer was continuously plated onto thin layer with a total amount of 1 mAh/$cm^2$. Initially, the thin layer only has about 2 μm Li—Sn alloy, but still has continuous and tight contact with garnet SSE, even the garnet pellet is not very dense (FIG. 37b). After 1 mAh/$cm^2$ Li was plated onto the thin layer, the total thickness of the plated Li increases to about 20 μm, meanwhile, the contact between the newly plated Li and garnet pellet still maintains continuous and tight (FIG. 37c). According to the energy-dispersive X-ray spectroscopy (EDS) mapping of the same area shown in FIG. 37d, the alloy element Sn is mainly on the top surface, indicating that the original Li—Sn alloy layer is lift up by the newly plated Li. For the stripped side, the original Li—Sn alloy layer is about 100 μm thick and has the same continuous and tight contact as the other side (FIG. 37e). After Li was stripped, the thickness of the Li—Sn alloy decreases to about 50-70 μm, however, the tight contact between the stripped Li—Sn alloy and garnet pellet still well maintains (FIG. 37f). Even a large amount of Li has been stripped from the alloy, the leftover Sn does not show any obviously local accumulation at the interface on the EDS mapping shown in FIG. 37g. Therefore, the interface and morphology changes on both sides after the large capacity platting-stripping cycling further demonstrate that the soldered Li—Sn alloy on garnet SSE can maintain the excellent interface during the battery cycling.

Figure 38:
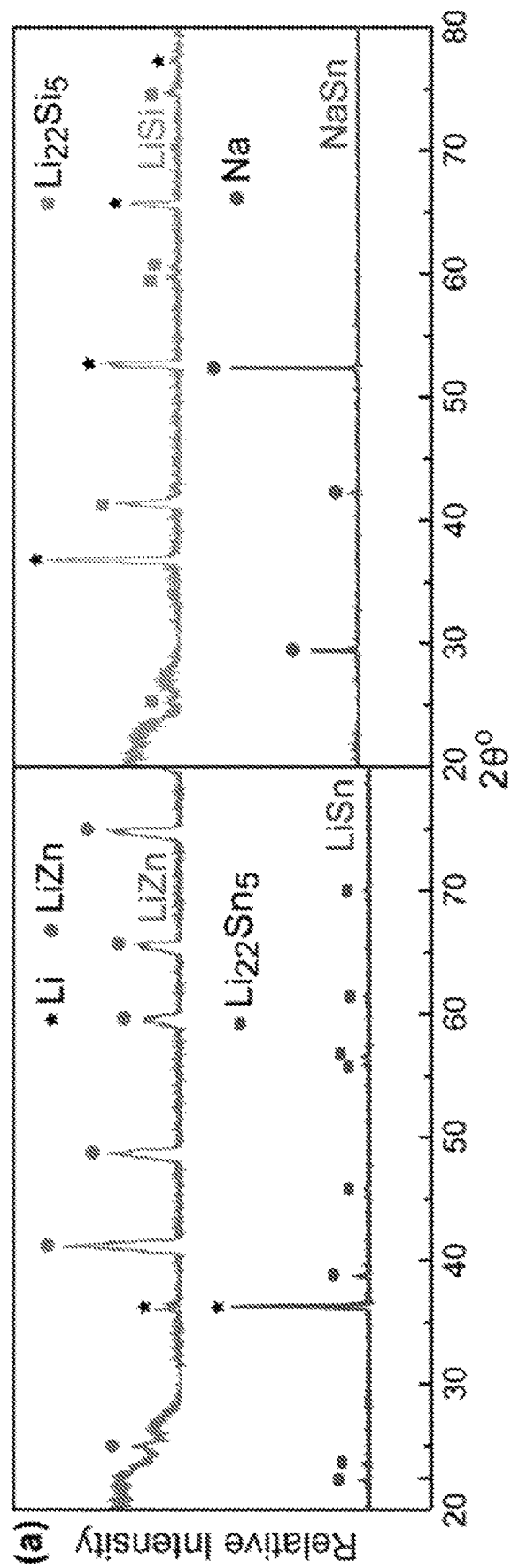
FIG. 38 shows different alloys for wetting various substrates. (a) XRD patterns of typical binary alloys having good wettability to substrates. Digital images of molten Li wetted (b) Ti foil and (c) Kapton film. (d) Digital image of molten Na on alumina substrate. (e-f) Digital images of Molten Li—Sn alloy coated Ti foil and Kapton film, indicating an improved wettability. (g) Digital image of molten Na—Sn alloy wetted alumina substrate.
Figure 38:
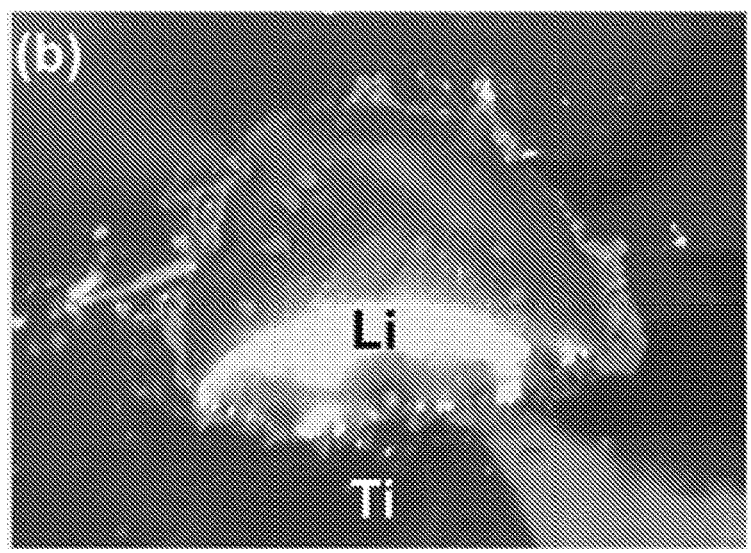
Figure 38:
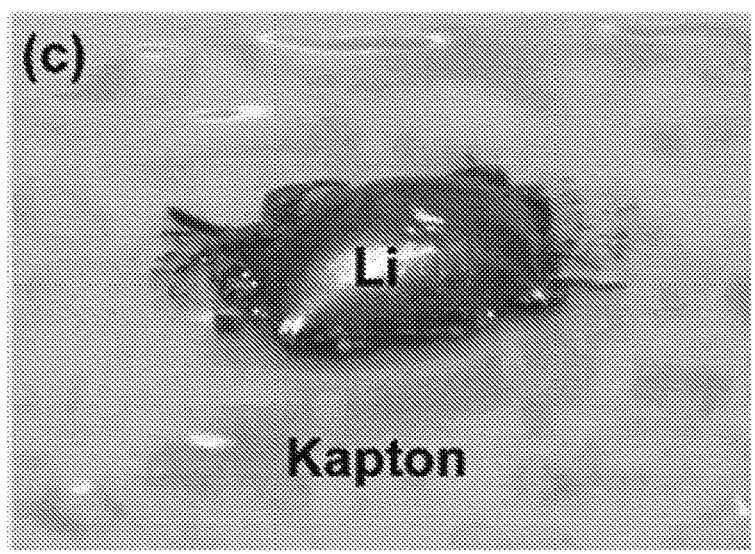
Figure 38:
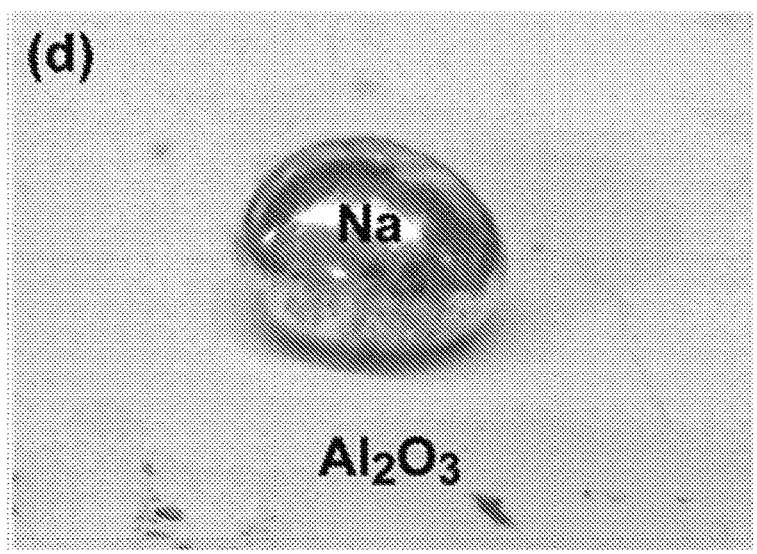
Figure 38:
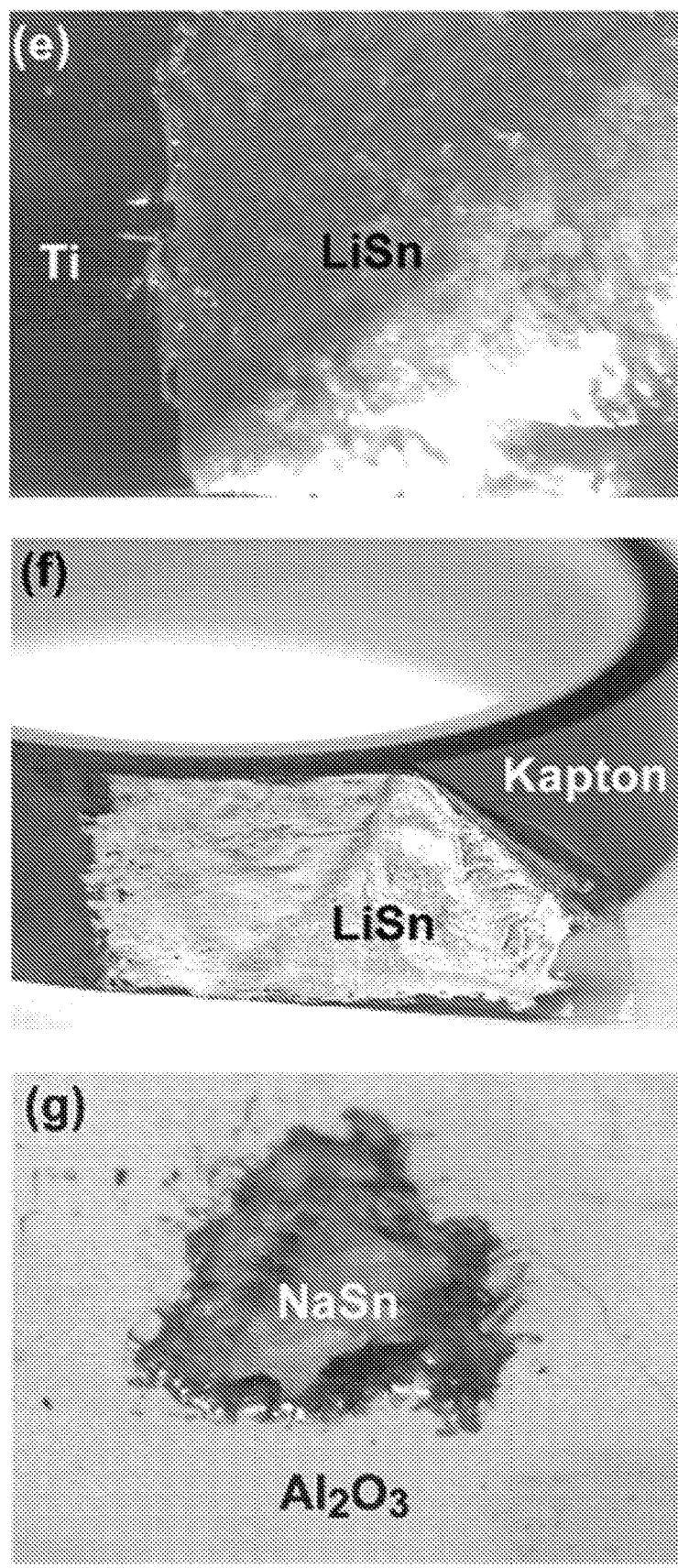

To further demonstrate the universality of this technique, we also studied this alloy based soldering technique using several different binary alloys and coated various substrates, including metals, polymers and ceramics. In this work, we tested four typical elements (Sn, Zn, Si, and Al) that can alloy with Li for soldering application, meanwhile, Na—Sn alloy was also successfully tested to solder molten Na on to alumina substrate. FIG. 38a exhibits the XRD patterns of several typical binary alloys that have been tested to have excellent wettability. For three Li based alloys, they all have peaks corresponding to Li metal phase, since Li is much excessive in those alloys. Besides, each of them has a binary alloy phase corresponding to the most stable component in phase diagram when Li metal is excessive (i.e. LiZn for Li—Zn alloy, $Li_{22}Sn_5$ for Li—Sn alloy, and $Li_{22}Si_5$ for Li—Si alloy). Therefore, we can propose that addition of another binary alloy phase can significantly improve the wettability of the molten Li metal. In the experiment, we also noticed that these soldering alloys have higher viscosity than Li metal at molten state, which makes the molten soldering alloys much stickier to the substrates than molten Li. The XRD pattern of Na—Sn alloy only shows the peaks of Na metal, which should be due to the little amount of Sn comparing to Na. FIGS. 38b and 38e are the digital images of titanium (Ti) foils wetted by molten Li and Li—Sn alloy, respectively. The molten Li can partially wet Ti foil, but shows a large contact angle (FIG. 38b). In contrast, Li—Sn alloy was coated onto the Ti foil like a paint and has a small contact angle, indicating the excellent wettability of the molten Li—Sn alloy to metal substrate (FIG. 38e). Besides the typical ceramic and metal substrates, the Li—Sn alloy can even be soldered onto some high temperature resistant polymer substrates. FIGS. 38c and 38f depict the digital images of Kapton film wetted by molten Li and Li—Sn alloy, respectively, where the Li—Sn alloy still shows a much better wettability than Li metal and can be painted onto Kapton film uniformly. The alloy coated Kapton film demonstrated excellent flexibility while maintained outstanding mechanical strength, which is useful for flexible Li metal battery applications. Similar wettability improvement also applies for Na based molten alloy, where molten Na has poor wettability on alumina substrate, while the molten Na—Sn alloy can be easily soldered onto the substrate and shows a small contact angle (FIGS. 38d and 38g). The results demonstrate the universality of this alloy based soldering technique for coating Li or Na metal onto various substrates for battery applications.

By adding alloy elements to tune the surface energy and the viscosity, a direct soldering type technique was developed to quickly coat molten Li onto different substrates. As a demonstration, the Li—Sn alloy was soldered onto the surface of garnet SSEs within 1 minutes and exhibited a conformal and tight contact, which significantly decreased the interface resistance to as low as ~7 $\Omega^{-2}$. The corresponding electrochemical study further showed the excellent stability of both the interface and the alloy electrodes during the long time and high capacity cycling. To demonstrate the universality of this alloy-based soldering technique, several other Li binary alloys were studied to show the similar wetting effect on various substrates including metals, ceramics, and polymers. Moreover, this direct soldering technique was also extended to the molten Na alloy system, where the Na—Sn alloy was successfully coated onto an alumina substrate. Therefore, we believe this direct soldering technique will inspire new strategies to develop safe Li and Na metal batteries with high energy densities.

Synthesis of garnet solid state electrolytes. Cubic garnet electrolyte of $Li_{6.75}La_{2.75}Ca_{0.25}Zr_{1.75}Nb_{0.25}O_{12}$ composition was synthesized by conventional solid state reaction. Stoichiometric amounts of $LiOH \cdot H_2O$ (Alfa Aesar, 98.0%), $La_2O_3$ (Alfa Aesar, 99.9%), $CaCO_3$ (Alfa Aesar, 99.0%), $ZrO_2$ (Inframat® Advanced Materials, 99.9%) and $Nb_2O_5$ (Alfa Aesar, 99.9%) were thoroughly ball milled in isopropanol for 24 h. 10 wt % excess $LiOH.H_2O$ was added to compensate for vitalization of lithium during the calcination and sintering processes. The well-mixed precursors were dried, pressed and calcined at 900° C. for 10 h. The as-calcined pellets were broken down and ball-milled in isopropanol for 48 h. The dried powders were pressed into 12.54 mm diameter pellets at 500 MPa. The pellets were fully covered by the mother powder and sintered at 1050° C. for 12 h. All the thermal processes were carried out in alumina crucibles. Before subsequent lithium metal assembling, the garnet electrolyte was mechanically polished on both sides to produce clean and flat surfaces.

Direct soldering of Li or Na alloys and cell preparation. All the soldering and coating experiments were conducted on a hot plate at 250° C. in an argon filled glovebox. To test the dependence of the alloy element ratio on the wettability, different weight percentage of alloy elements (Sn, Zn, Si, Al) were mixed with the molten Li, and the alloy were smeared on the substrate to show the wettability. All the binary alloys started to show an improved wettability when the weight percentage of the alloy elements is higher than 20 wt %. As the ratio of alloy element increased, the viscosity and the wettability increased accordingly. To make Li/garnet/Li cells for electrochemical measurements, the each side of the fresh-polished garnet pellets was directly placed and smeared on the molten Li—Sn alloy (30-50 wt % of Sn) for less than 1 minutes to ensure a conformal coating. The Au/garnet/Au cells were prepared by coating gold paste on both sides of garnet pellets followed by annealing at 800° C. for 30 min. For titanium foil, Kapton film, and alumina substrates, the substrates were first heated on the hot plate, then the alloys were melt and smeared on the substrates to form a uniform coating. In the control experiments, the pure molten Li or Na metal was melted and coated onto the substrates following the similar process.

Electrochemical measurement. Electrochemical tests of Li/garnet/Li symmetric cells were conducted on a BioLogic VMP3 potentiostat at room temperature. The electrochemical impedance spectra (EIS) were performed with a 20 mV AC amplitude in the frequency range of 100 mHz to 1 MHz for Li/garnet/Li cells and 100 Hz to 1 MHz for Au/garnet/Li cells, respectively. Galvanostatic stripping-plating of the Li/garnet/Li symmetric cells was recorded at room temperature with a current density of 50 μA/cm². The cells were placed in an argon filled glovebox to conduct all measurements.

Materials characterization. The morphologies and the elemental mapping of the Li alloy-garnet cross sections were conducted on a Tescan XEIA Plasma FIB/SEM at 10 kV.

X-ray diffractions (XRD) of the binary alloys were performed on a C2 Discover diffractometer (Bruker AXS, WI, USA) using a Cu Kα radiation source operated at 40 kV and 40 mA.

EXAMPLE 5

This example provides a description of metal-alloy layers of the present disclosure, non-limiting examples of which are provided in FIGS. 39 to 42. In particular, this Example provides an analysis of a representative metal interlayer by using magnesium (Mg) to analyze its transience behavior at the interface of garnet SSE and Li metal. This Example also provides experimental and computational characterization of the interface chemistry of garnet SSE, transient interlayer, and Li metal.

Figure 39:
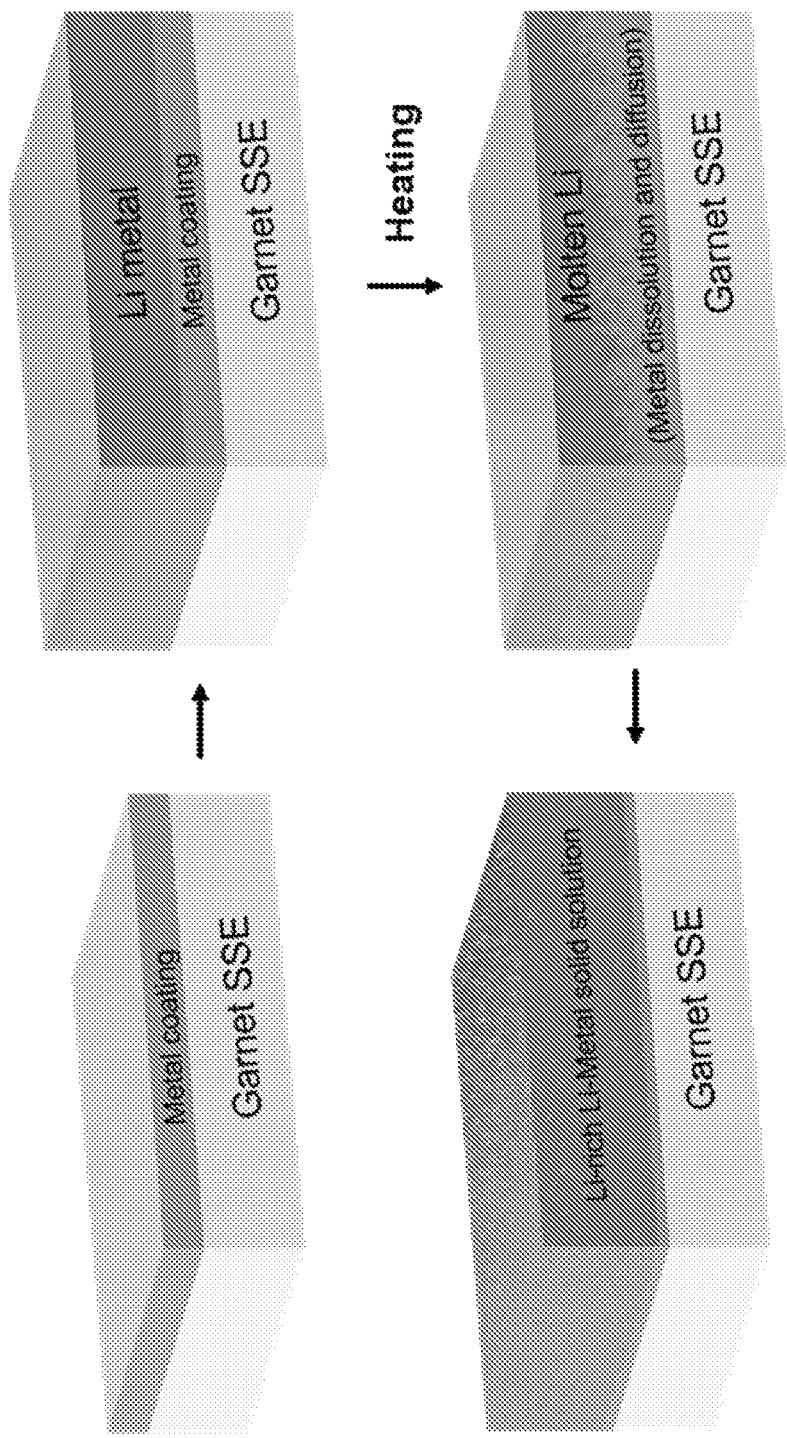
FIG. 39 shows a schematic of transient interlayer at the interface of solid-state electrolyte and molten Li metal. In heating, metal tends to dissolve and diffuse into the molten Li, forming a Li-rich Li-metal solid solution. The dissolution and diffusion of metal result in a transient interface between garnet SSE and Li.
Figure 40:
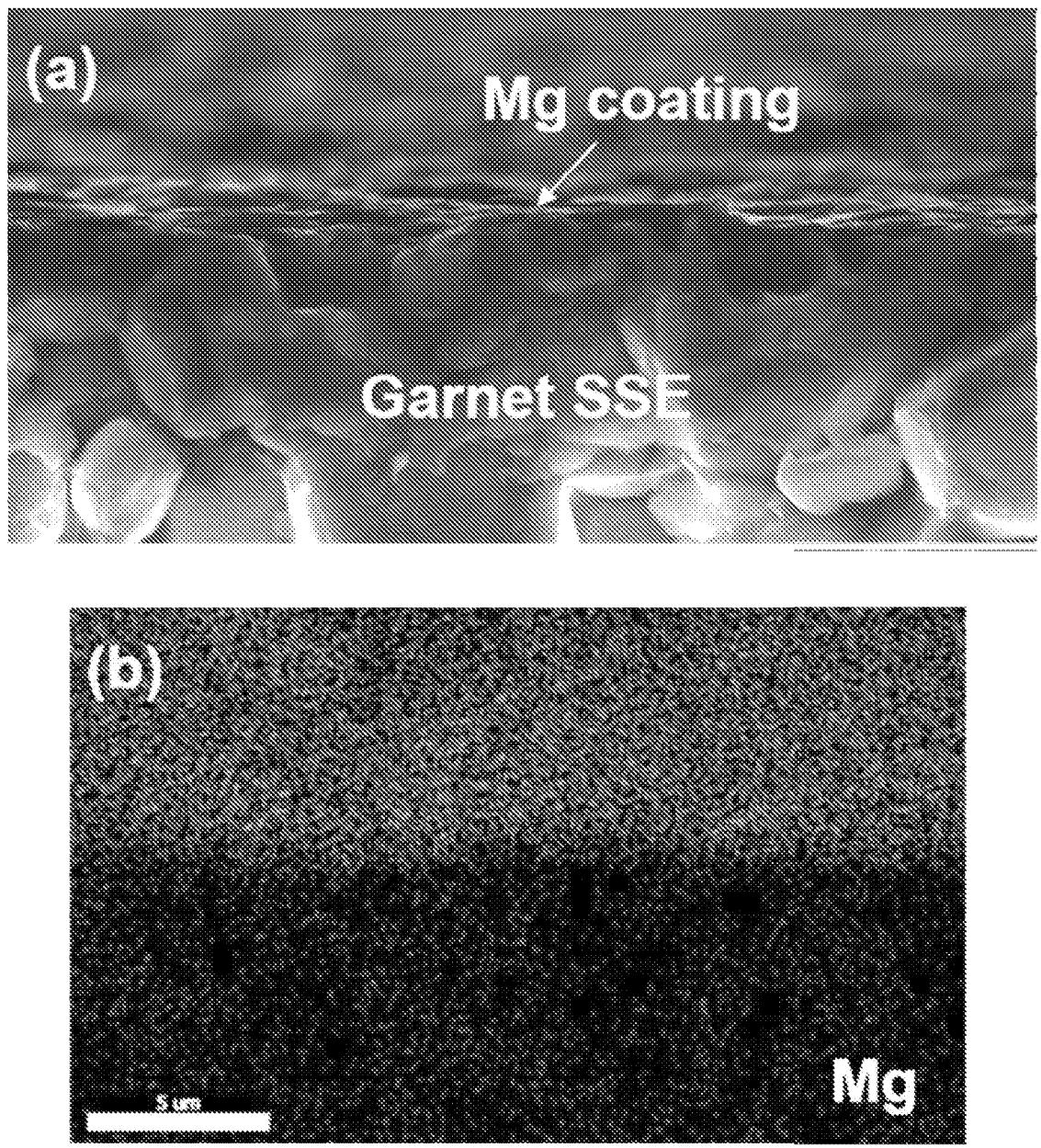
FIG. 40 Morphology of Mg coated garnet SSE and its interface with Li metal. (a) Cross-section of Mg coated garnet SSE. (b) Mg elemental mapping of garnet SSE. (c) Cross-sectional interface of Li metal and Mg coated garnet SSE. (d-e) Mg and Zr elemental mappings of the interface.
Figure 40:
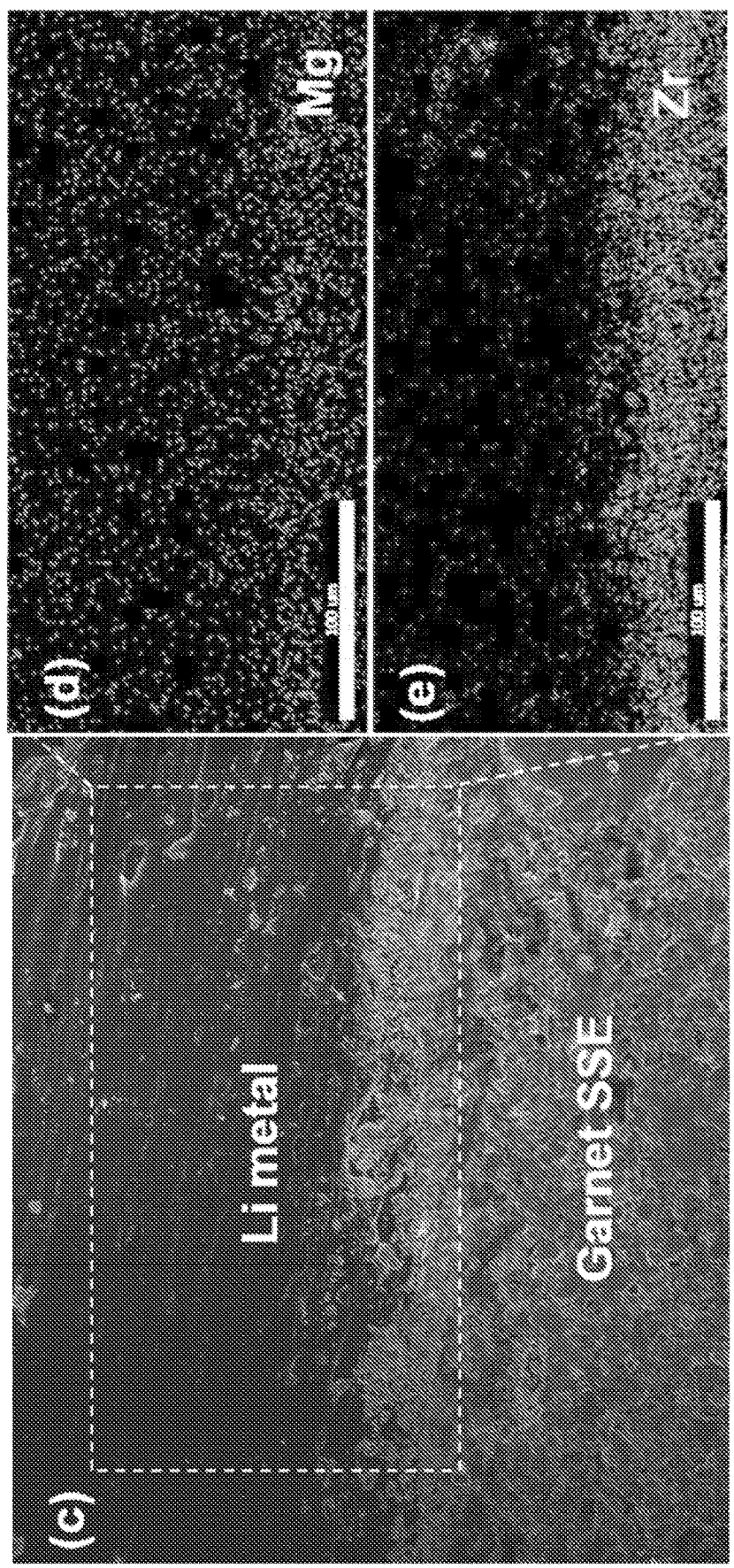
Figure 41:
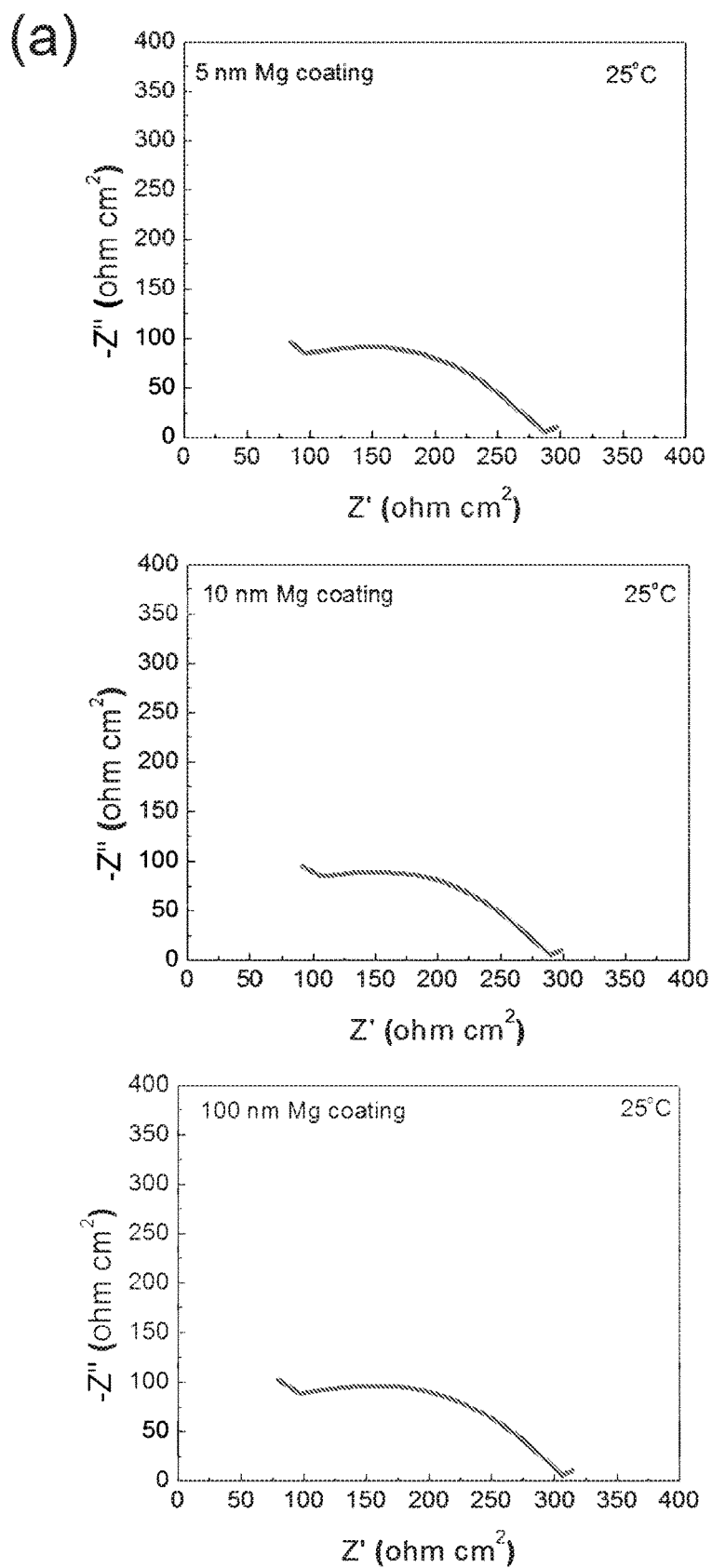
FIG. 41 Interfacial impedance characterization. (a) Electrochemical impedance spectroscopy (EIS) measurements of symmetric cells with different Mg coating thickness (5, 10, 100 nm) at the interface. (b) Schematic of transient Mg layer at the interface of garnet SSE and molten Li. (c) Li stripping/plating performance of symmetric cell with 100 nm Mg coated garnet SSE. The current density is 0.1 mA/cm$^2$.
Figure 41:
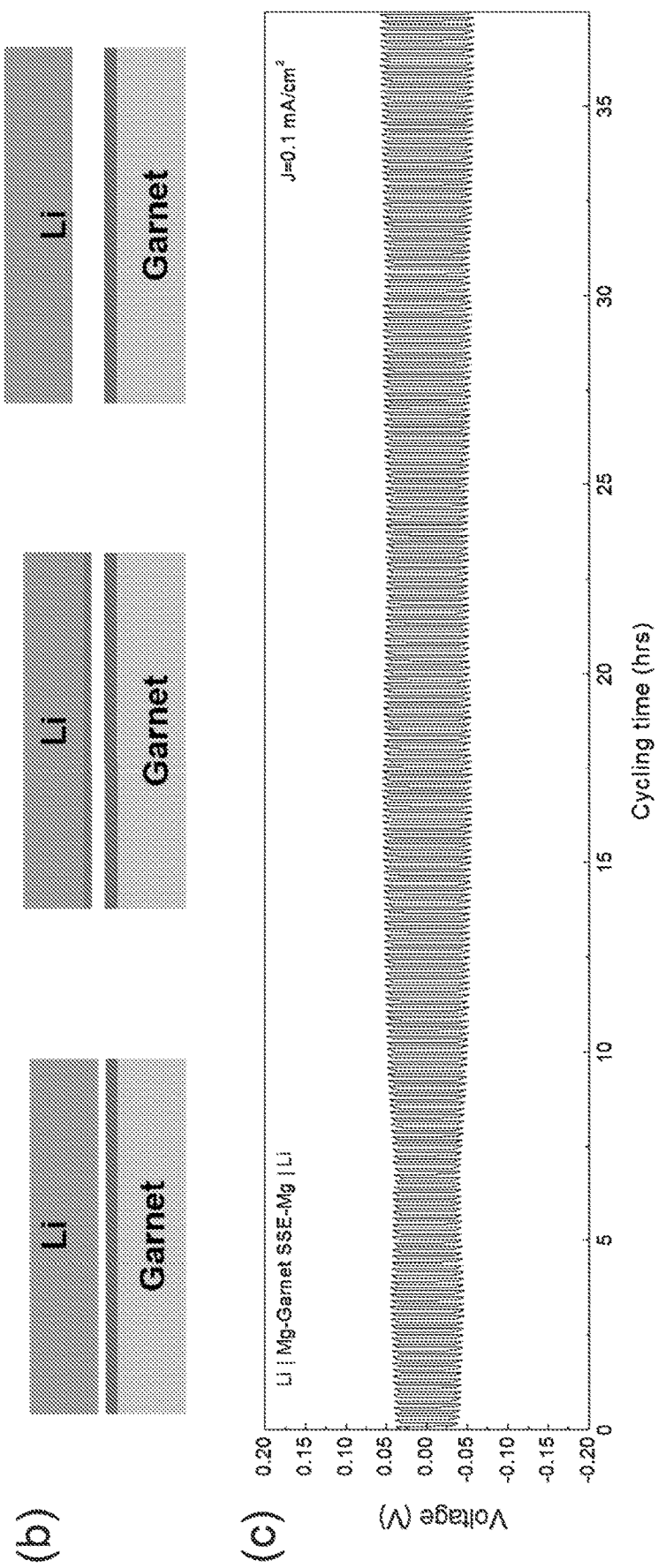

FIG. 39 shows schematically the transient behavior of Mg interlayer at the interface of garnet solid electrolyte and molten Li metal. The Mg coating tends to dissolve into the molten Li and diffuse into the bulk Li to form a Li-rich Li—Mg alloy. The MgO can work as a passivation layer to protect garnet interface, leading to a stable cycling performance and constant interfacial resistance. The results indicate that the interfacial resistance does not change with the increase of Mg coating thickness due to the transience behavior of Mg in molten Li.

The interface morphology of Li/garnet SSE was characterized by scanning electron microscope (SEM). Mg with a thickness of 100 nm was deposited on garnet SSE using vapor deposition method. Garnet SSE surface was polished by sandpaper to remove Li2CO3 layer before depositing Mg. FIG. 40a shows the cross-section of Mg deposited garnet SSE disc. Micro-sized garnet grains were sintered together, formatting a dense solid electrolyte. The elemental mapping in FIG. 40b shows the distribution of Mg on garnet SSE surface. The sputtered Mg layer can have a conformal coating along the contour of garnet grains. Because of the poor wettability and rough surface, garnet SSE has a poor contact with Li metal and a high interfacial resistance. This conformal Mg coating helped to increase the wettability of garnet SSE with molten Li, so as to increase their contact areas. FIG. 40c shows the cross-sectional SEM of Li/garnet SSE interface. Molten Li was deposited on Mg coated garnet SSE surface. The pores of garnet particles and grain boundaries on garnet SSE was filled with Li metal, resulting in an intimate contact. The Elemental mapping of Mg and Zr distribution on the cross-section of Li/garnet SSE sample are shown in FIGS. 40d and e. Mg signal was detected from the garnet SSE surface to the Li metal, which suggests the dissolution and diffusion of Mg into the Li metal. Based on the binary phase diagram, the Mg coating on garnet SSE surface can be partially dissolved and diffused into the molten Li at high temperature (200° C.). Mg can alloy with molten Li, and due to the high Li/Mg mass ratio (almost 100%), the Li-rich Li—Mg solid solution can be considered as a pure Li phase. The reaction of Mg and Li is the driving force lead to the improvement of wettability between garnet SSE and molten Li metal, and the dissolution and diffusion of Mg layer result in low resistance at the interface.

Thus, this Example reveals that MgO is thermodynamically stable against Li, and without intending to be bound by any particular theory, that the MgO layer on Mg might be a natural passivation layer to protect garnet.

The interfacial resistance was evaluated by EIS for Li|Garnet SSE|Li symmetric cells. The symmetric cells were prepared following the schematic shown in FIG. 42a. The SSE was sandwiched between two fresh Li metal foils, then covered by stainless steel plates to block Li diffusion. The cells were heated on a hot plate at 200° C. in an argon-filled glovebox to melt the Li. EIS profiles of the symmetric Li/garnet/Li cell with different Mg coating thickness are compared in FIG. 41b. The three cells showed similar values in total resistance, which depend on both the garnet's total resistance and the interface charge transfer resistance. The Li/garnet/Li cells exhibited a resistance of ~300 ohm*cm2 for the three cells with increased Mg coating. The small partial semicircle at high frequency can be assigned to the total resistance of the garnet material. The large semicircle correspond to the charge transfer resistance, which is the combination of the solid-state electrolyte resistance as well as the Li interfaces within the symmetric cells. The total garnet resistance was 150 ohm*cm2 and remained unchanged during the Li melting process. The charge transfer resistance was ~140 ohm*cm2. Note that the interfacial resistance corresponds to two symmetric interfaces. The interfacial resistance is ~70 ohm*cm2. The EIS of symmetric cells indicate that the interfacial resistance is not affected by different Mg thickness. Schematic in FIG. 41b shows transient Mg metal at the interface between garnet SSE and molten Li metal. Garnet with a 100 nm Mg coating was selected for the symmetric cell preparation and Li stripping/plating test. The symmetric cell exhibited good cycling stability at a current of 0.1 mA/cm2 (FIG. 41c). The cell showed a flat voltage of ±0.4 V for periodical cycles. Long-term cycling indicates a stable resistance. This result confirms that the transient Mg interlayer does not produce additional interfacial resistance to garnet SSE and Li system.

Figure 42:
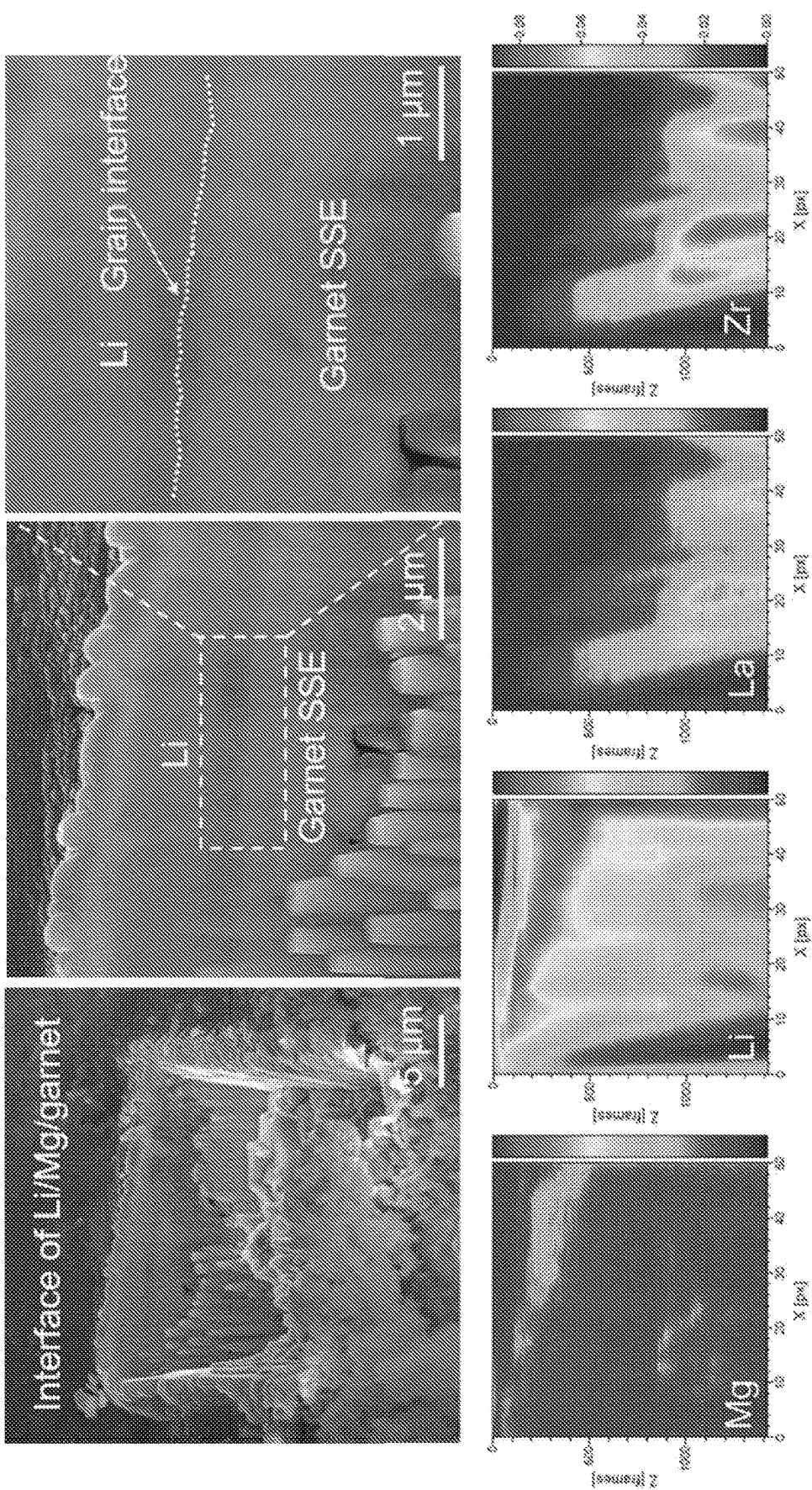
FIG. 42 TOF-SIMS analysis of the interface of Li metal and Mg coated garnet SSE. (Upper left panel) A crater sputtered by ion beam and the cross-sectional SEM of Li/Mg/garnet SSE sample. Scale bar is 5 um. (Upper middle panel) Interface of Li/Mg/garnet SSE shows intimate contact between garnet SSE and Li metal. Scale bar is 2 um. (Upper right panel) Magnified interface. Scale bar is 1 um. (Lower four panels) Elemental mapping (Mg, Li, La, Zr) of cross-sectional surface of Li/Mg/garnet SSE.

Composition with depth below the initial surface of Li metal/Mg coated garnet SSE sample (Li/Mg/garnet SSE) was characterized using Time-of-flight secondary ion mass spectrometry (TOF-SIMS). TOF-SIMIS was performed over a 25×25 μm analysis area on the sample. Ion beam carved a crater To analyze the interface composition in Li/Mg/garnet SSE sample. FIG. 42 (upper three panels) show the side surface of sputtered crater, which consists of Li metal, Mg coating, and garnet SSE consequently from top to the bottom of sample. In FIG. 42 (upper middle and upper right panels), crystal grains and boundaries were discernable in the cross-sectional SEM, corresponding to the garnet SSE. No gap was observed on garnet SSE interface, confirming the good contact between Mg coated garnet SSE and Li metal.

Surface images of Mg, Li, La, and Zr distribution in Li/Mg/garnet SSE sample are shown in FIG. 42 (lower four panels). La and Zr distribution images clearly showed the garnet SSE in the Li/Mg/garnet SSE. Mg was distributed in Li metal. Mg signal was also detected at the interface. Li distribution image has a complete overlap with Mg distribution, which indicates the Mg dissolution and diffusion into the molten Li metal. Surface images of Mg, Li, La, and Zr distribution in Mg/garnet SSE determined. Mg/garnet SSE sample was treatment at 200° C. under the same condition of Li/Mg/garnet SSE. We observe that Mg coating was mainly accumulated on garnet SSE surface. Higher concentration of Li was detected in the early stage of depth profile and was overlapped with Mg coating, which is possibly due to the lithiation of Mg during the thermal treatment and also the high energy ion beam sputtering. These surface mapping images confirm the transient behavior of Mg at the interface of garnet SSE and molten Li metal.

The TOF-SIMS depth profile of Li/Mg/garnet SSE is shown. Close to the surface, the count for Mg was high, it gradually decreased and then reached to a peak, which corresponds to the overlapped Li/Mg distribution area as indicated in Section I. The count of Mg was then decreased until a small peak occurred, which is Section II. In Section II, it recorded the depth profile from the top surface to the interface. In Section III, the count of Mg was increased and gradually decreased, which indicates the existence of Mg at the interface. This result depicts the Mg transient process that the Mg close to Li metal was dissolved and diffused into the molten Li metal, and the Mg close to garnet SSE got prelithiated from garnet in the heating and thus remained at the interface.

EXAMPLE 6

This example provides further description of metal-alloy layers of the present disclosure. A major challenge of garnet is that the contact between garnet and Li metal anodes is poor due to the rigidity of garnet, which leads to limited active sites and large interfacial resistance. This Example provides a new methodology for reducing the garnet/Li metal interfacial resistance by depositing a thin germanium (Ge, 20 nm) layer on garnet. By applying this approach, the garnet/Li metal interfacial resistance decreases from ~900 $\Omega cm^2$ to ~115 $\Omega cm^2$ due to an alloying reaction between Li metal and Ge. In agreement with experiments, first principles calculation confirms the good stability and improved wetting at the interface between lithiated Ge layer and garnet. In this way, this unique Ge modification technique enables a stable cycling performance of a full cell of lithium metal, garnet electrolyte and LiFePO$_4$ cathode at room temperature.

Figure 43:
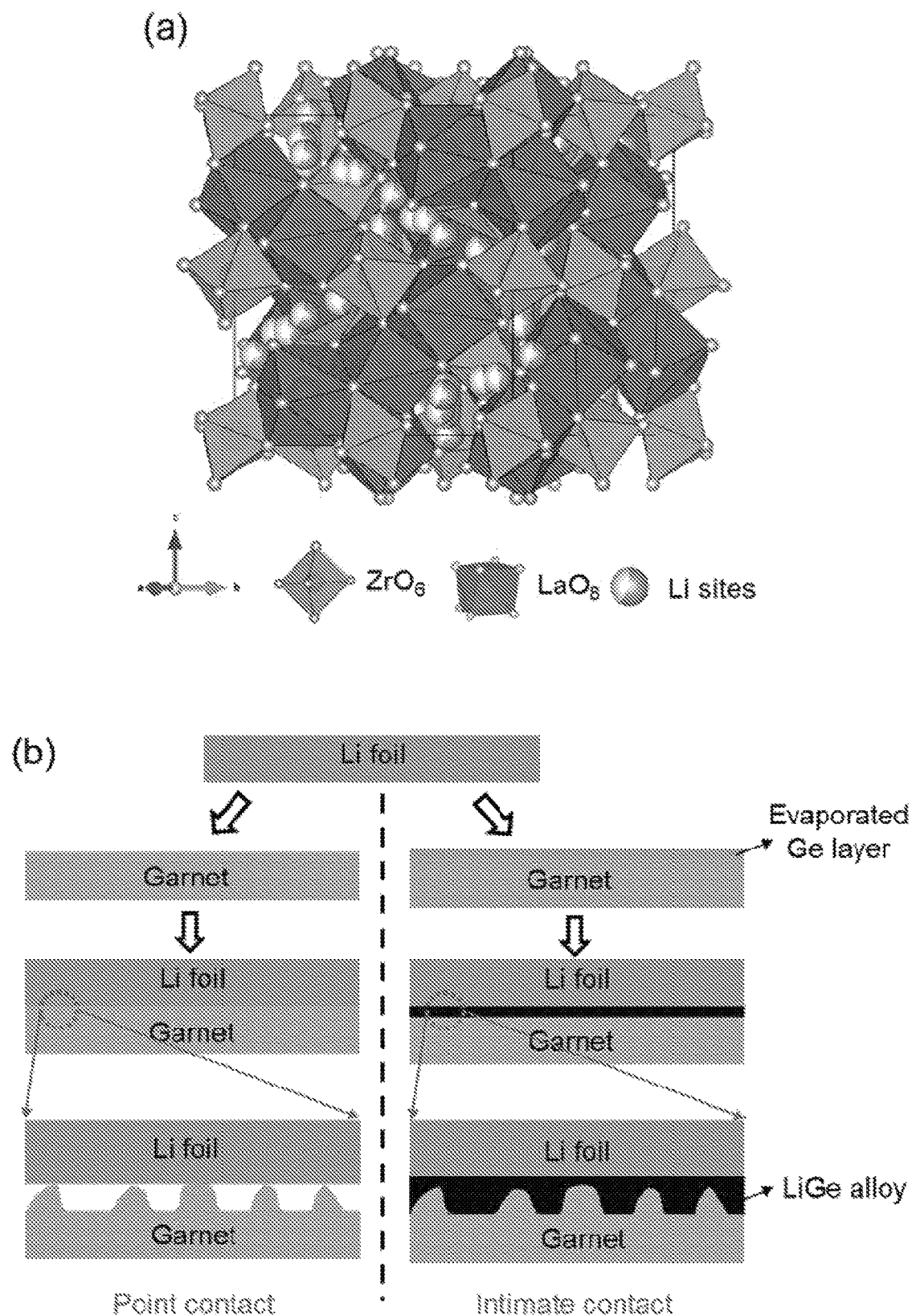
FIG. 43 shows (a) Crystal structure of garnet-structured $Li_7La_3Zr_2O_{12}$. (b) Schematic representation for improving the contact between garnet and Li metal by engineering the surface of garnet with a thin Ge layer. Ge layer, evaporated onto garnet, can alloy with Li metal, which leads to more continuous interfaces between the garnet and Li metal and result in small interfacial resistance.
Figure 44:
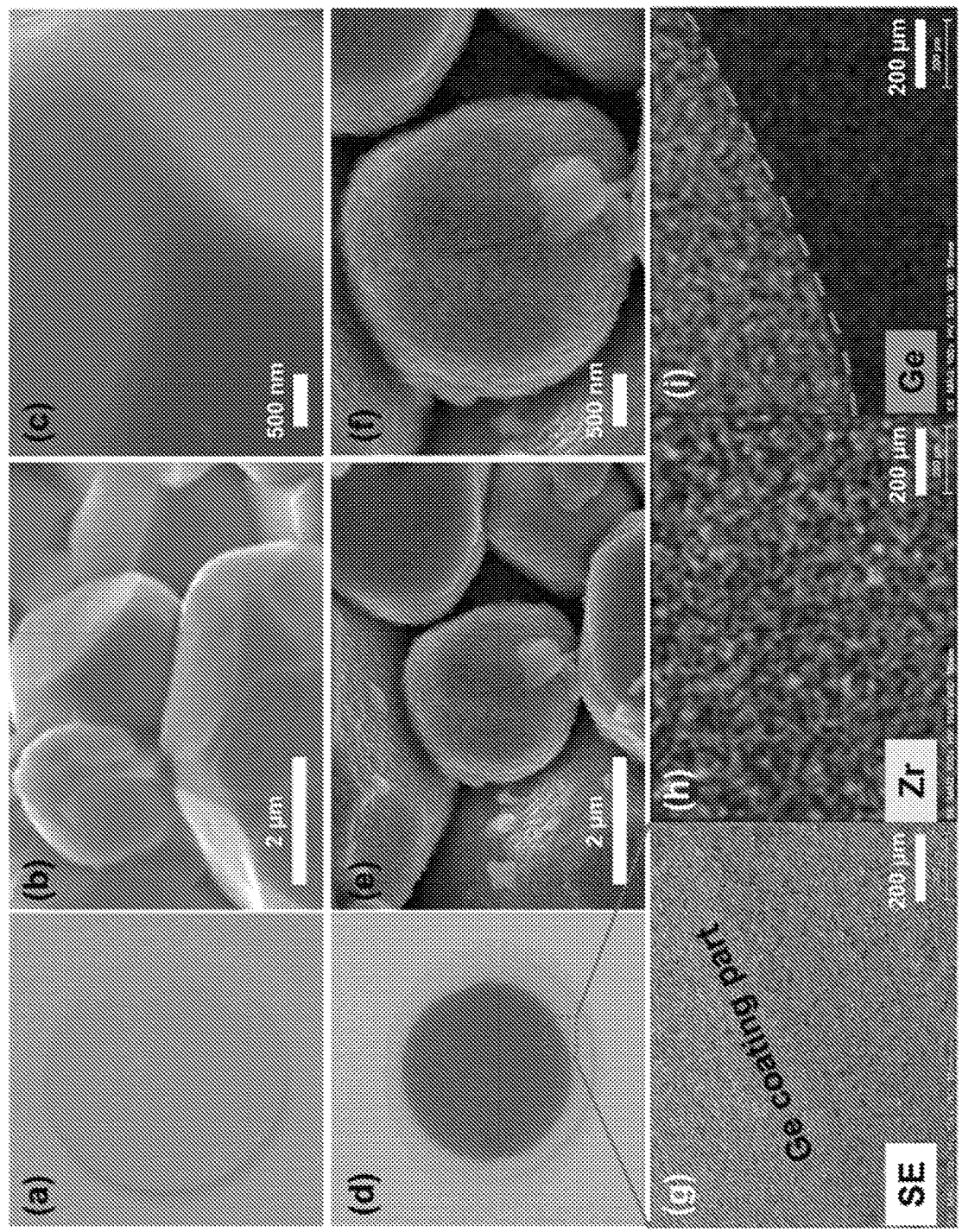
FIG. 44 shows morphology characterization of LLZO and Ge-modified LLZO. (a) A polished LLZO pellet was prepared by a conventional solid-state reaction. (b, c) SEM images of LLZO show crystallized LLZO particles with smooth surface. (d) A thin Ge layer was deposited onto the LLZO surface by evaporation. The area with Ge on the LLZO pellet is gray. (e, f) High-resolution SEM images of LLZO with Ge evaporation. Compared to pristine LLZO, the surface of Ge-modified LLZO became rough with the thin Ge layer. (g) SEM image corresponding to the area outlined by the square in d. (h, i) Corresponding Zr and Ge elemental maps show the distribution of Ge, which is marked by the dash line.
Figure 48:
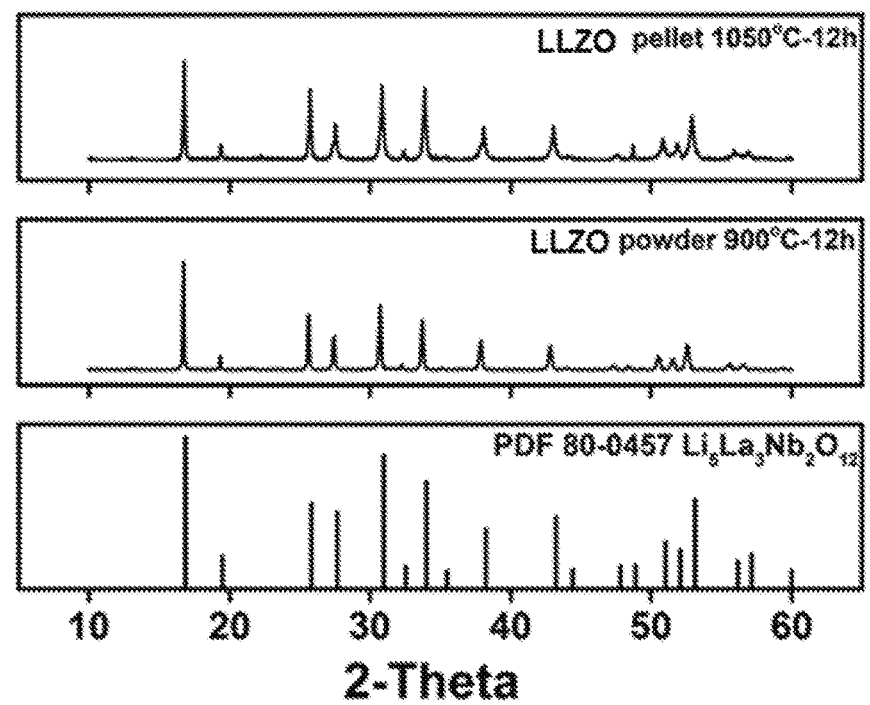
FIG. 48 shows XRD patterns of the as-prepared LLZO powder and the LLZO pellet.
Figure 49:
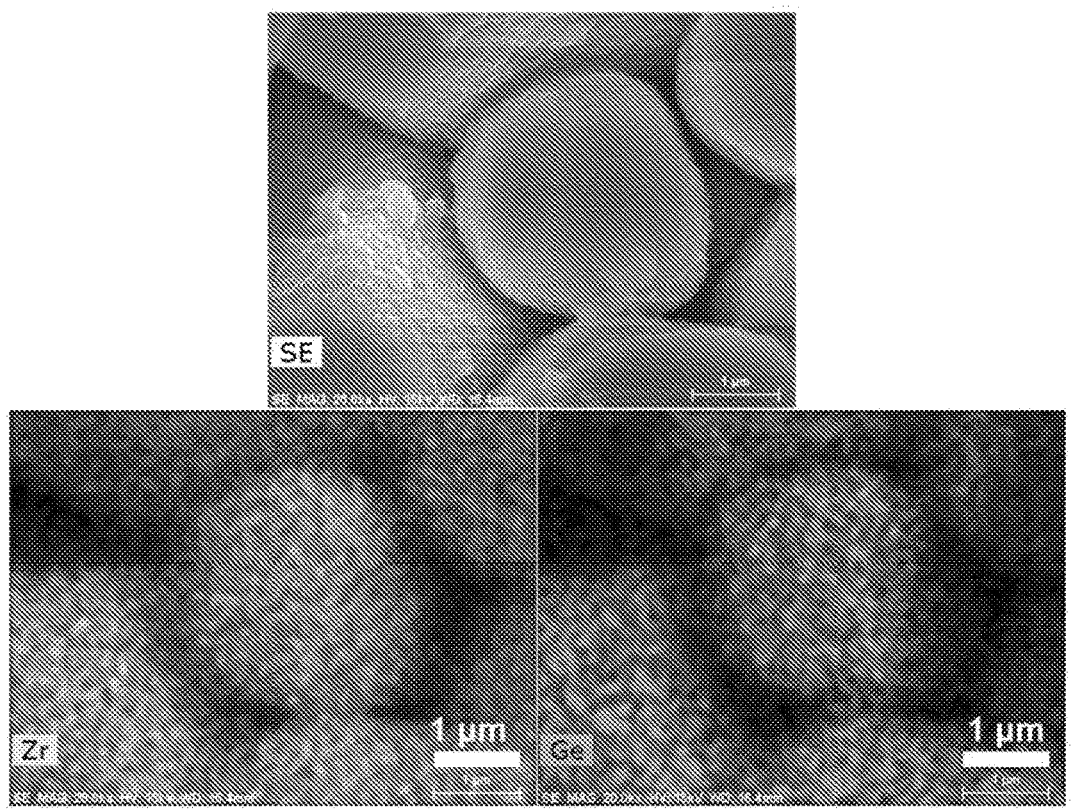
FIG. 49 shows high-resolution EDX elemental mapping images of Ge-modified LLZO. The elemental Ge and Zr overlap well, indicating the uniform distribution of Ge on LLZO.

This Example thus provides a novel approach to reduce the interfacial resistance between garnet and Li metal anode by engineering the surface of garnet with a thin germanium (Ge) layer. The purpose of this Ge layer is to improve the contact between garnet and Li metal from discrete points to continuous and conformal interfaces by alloying Li metal with Ge, as schematically illustrated in FIG. 43. The as-formed Li—Ge alloy would then be used as a Li ion conductor between Li metal and garnet. The presented approach allows us to build Li/Ge-modified garnet/Li symmetric cells with a small interfacial resistance of 115 $\Omega/cm^2$ and stable Li stripping/plating profiles. The potential for garnet modified by a thin Ge layer in full batteries is further demonstrated by pairing with a LiFePO$_4$ cathode, which delivers stable capacity retention at room temperature. To prepare garnet pellets, a conventional solid-state-reaction was employed using LiOH, La$_2$O$_3$, and ZrO$_2$ as the starting materials. CaCO$_3$ and Nb$_2$O$_5$ were also added into the starting material to synthesize garnet-structured SSE with the composition of Li$_{6.85}$La$_{2.9}$Ca$_{0.1}$Zr$_{1.75}$Nb$_{0.25}$O$_{12}$ (designated as LLZO). The synthesis details can be found in the supporting information. FIG. 44*a* exhibits a photo of a polished LLZO pellet, which consists of a large number of highly crystalline LLZO particles with smooth surface (FIGS. 44*b* and 44*c*). The diffraction peaks (FIG. 48) in the X-ray diffraction (XRD) pattern of LLZO confirm the highly crystalline structure with a pure cubic garnet phase (PDF-80-0457). After evaporating Ge (20 nm) on the LLZO pellet, the photo in FIG. 44*d* reveals a marked color change in the evaporated area from yellow to grey. The scanning electron microscopy (SEM) images of Ge-modified LLZO show that crystalline LLZO particles were coated by a thin layer of Ge (FIGS. 44*e* and 44*f*). To further prove the uniform coating, energy-dispersive X-ray spectroscopy (EDX) mapping images were first taken on the edge of Ge-modified LLZO pellet, as outlined by a square in FIG. 44*d*. FIGS. 44*g* to 44*i* are corresponding SEM and EDX mapping images, indicating that Ge was successfully coated onto the designed area by evaporation. High-resolution EDX mapping images were taken based on FIG. 44*e*, where corresponding Zr and Ge elemental maps show the homogeneous distribution of Ge on LLZO (FIG. 49).

Figure 45:
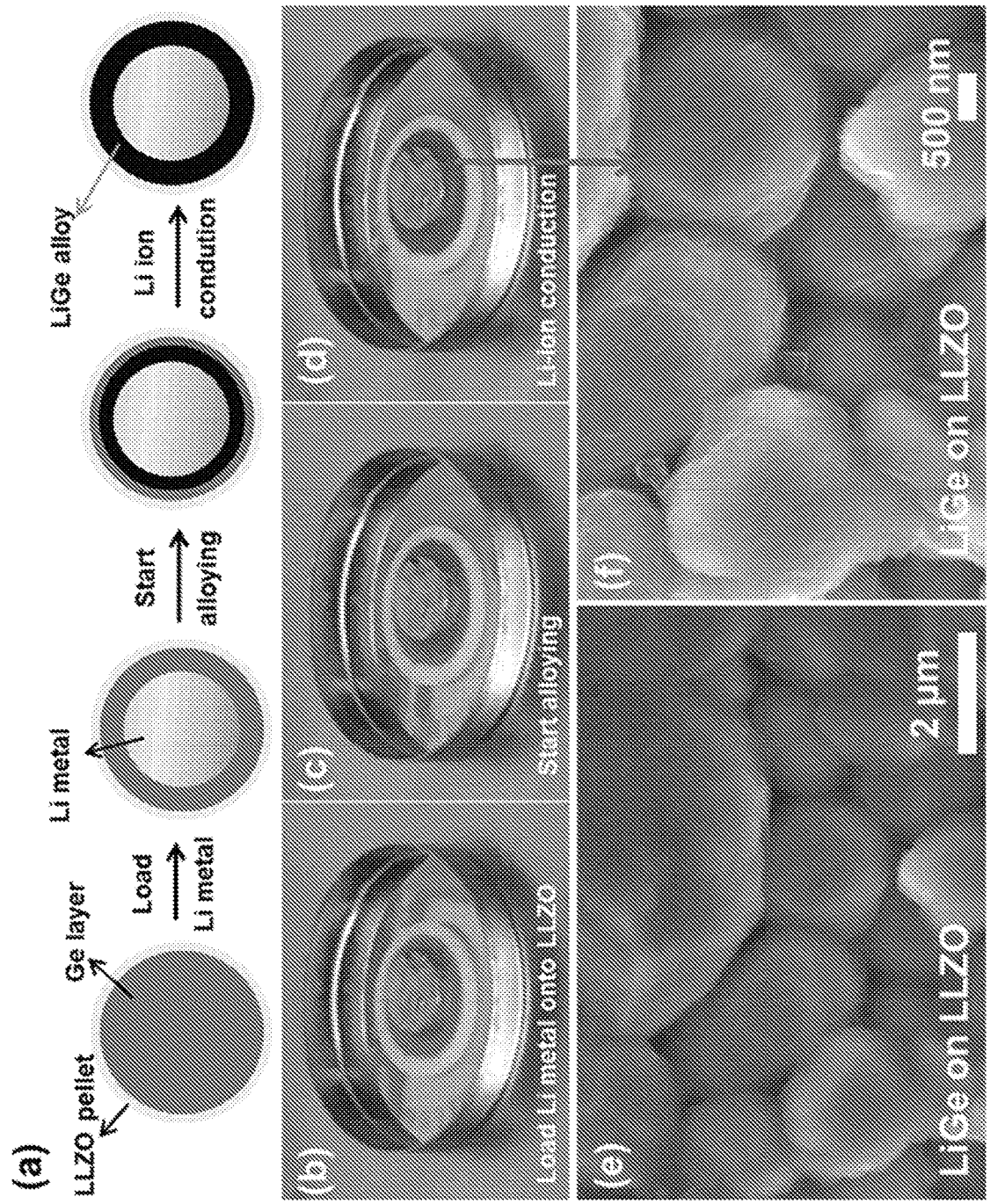
FIG. 45 shows a demonstration of the alloying and Li ion conduction process. (a) Schematic representation of the experimental design, where Li metal was loaded onto the Ge-modified LLZO pellet and reacted with Ge layer. (b-d) Photographs of the Ge-modified LLZO pellet on a coin cell case in the state of (b) loading Li metal, (c) alloying with Li metal, and (d) lithiation of the full Ge layer. (e, f) SEM images of the Ge layer on LLZO pellet after alloying with Li.

We sought to use the thin Ge layer to improve the contact between LLZO and Li metal by reacting Li metal with Ge to conduct Li through the as-formed LiGe alloy. To demonstrate the design, the alloying reaction and Li conduction on Ge layer were investigated. As schematically shown in FIG. 45*a*, a small piece of Li metal disc was attached on the center of a Ge-modified LLZO pellet and the pellet subsequently heated by a hot plate under argon in a glovebox. The reaction process was recorded by a camera. At the beginning, the color of the Ge layer was gray (FIG. 45*b*). When Li metal starts to melt, a color change indicates the occurrence of an alloying reaction between Li and Ge, and formation of LiGe alloy. As marked by the dotted line in FIG. 45*c*, a color boundary was discovered after about 30 seconds, where most of the left side of Ge layer is still gray while the right side (near Li metal) has become black. After about 2 minutes, the entire Ge layer turned black (FIG. 45*d*), suggesting the alloying reaction occurred on the whole Ge layer and ensuring uniform Li ion conduction through the surface of the LiGe alloy. FIGS. 45*e* and 45*f* show the morphology of the black surface area (LiGe alloy). Compared with the pristine Ge layer (FIGS. 44*e* and 44*f*), the LiGe alloy is more flat and forms a connected network, which can be beneficial to the garnet/Li metal interface contact.

Figure 46:
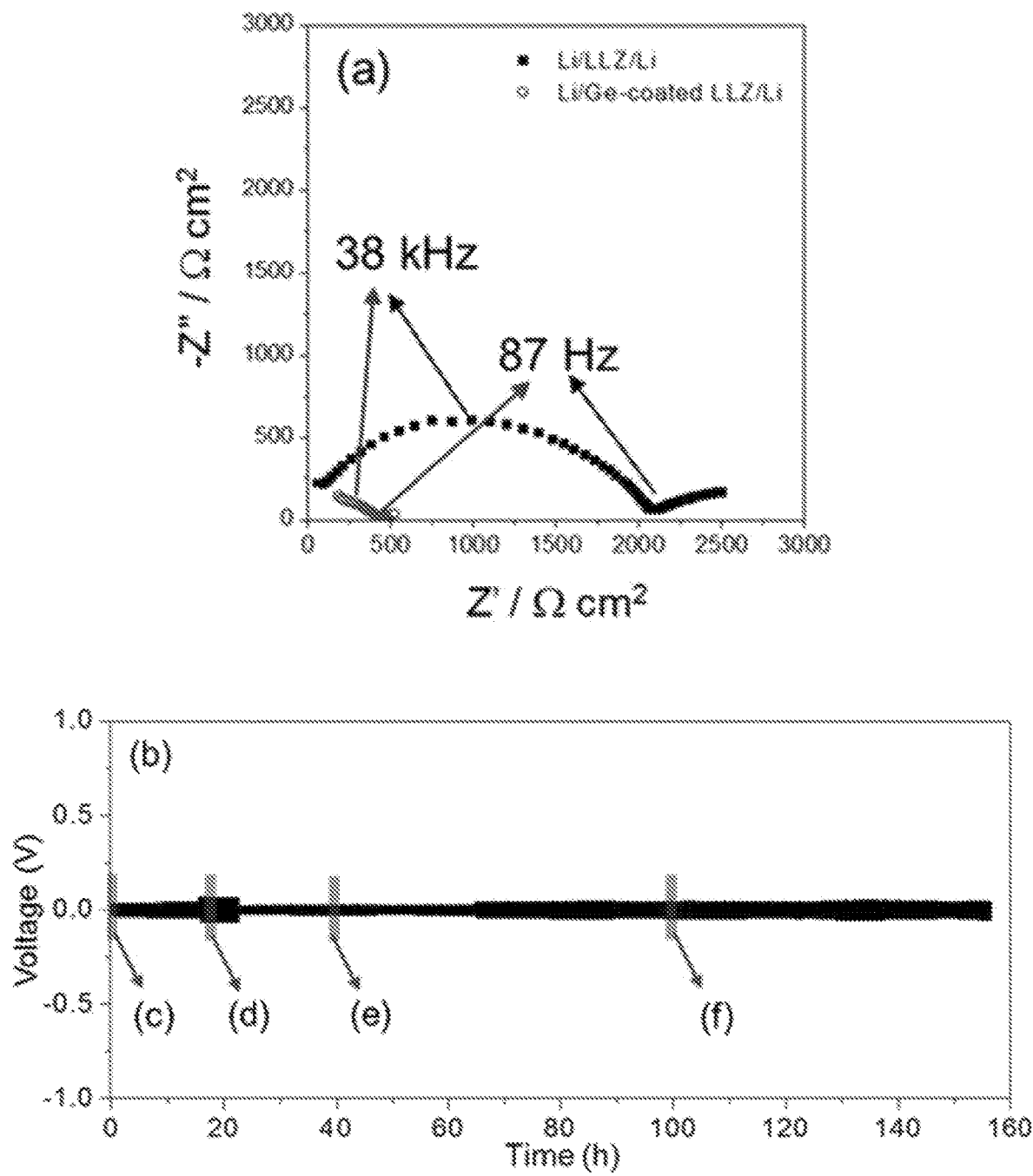
FIG. 46 shows electrochemical performance of Li metal/SSE/Li metal symmetric cells using Ge-modified garnet and bare garnet. (a) Impedance spectra of these symmetric cells tested at room temperature, where the cell using Ge-modified garnet SSE delivered a much smaller interfacial resistance. (b) Long-term cycling performance of Li metal/Ge-modified garnet/Li metal symmetric cell at various current densities. (c-f) Corresponding detailed voltage profiles at 0.05 mA/cm$^2$, 0.1 mA/cm$^2$, and then at 0.025 mA/cm$^2$, 0.05 mA/cm$^2$, respectively, as marked in b.
Figure 46:
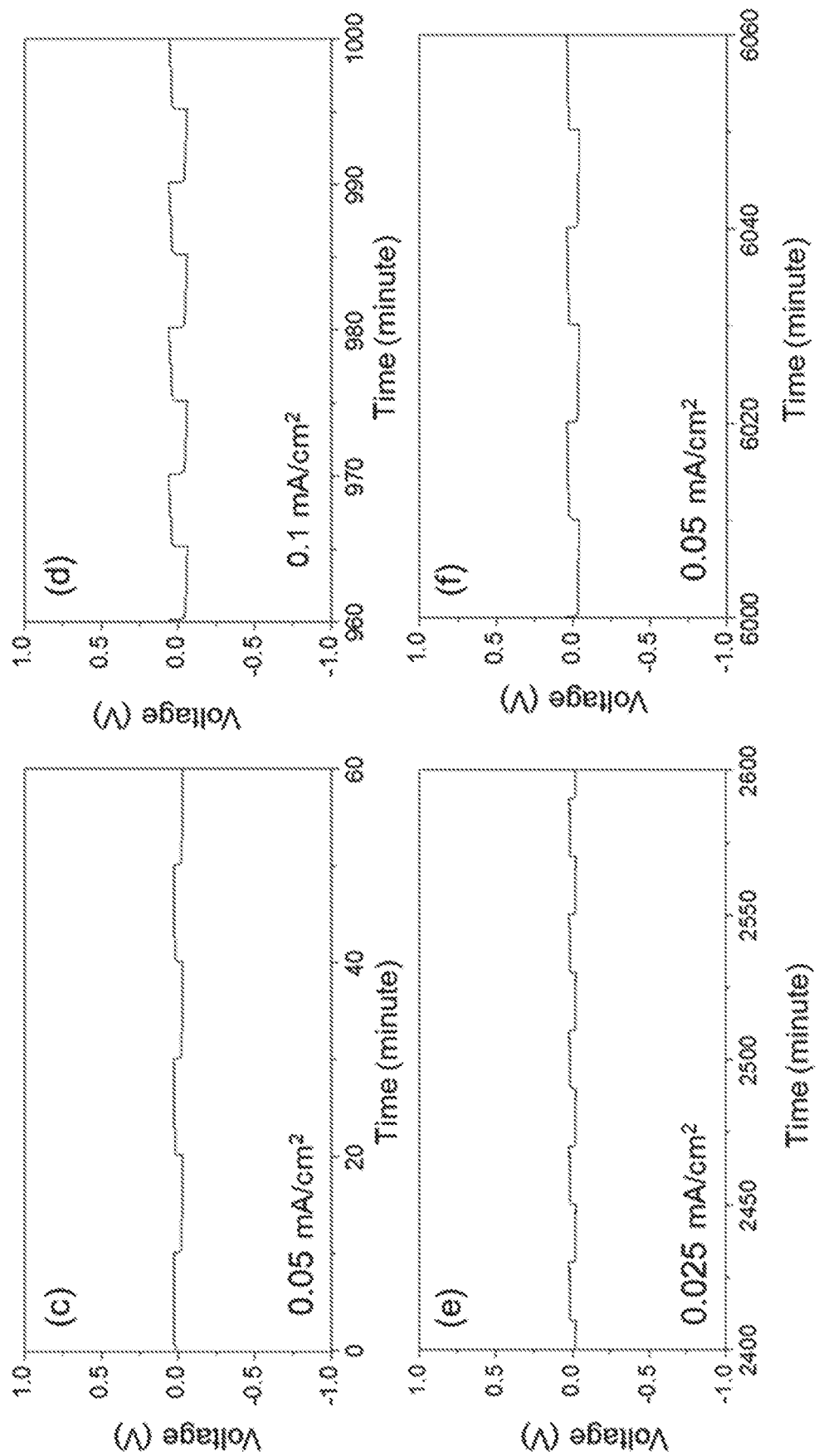
Figure 50:
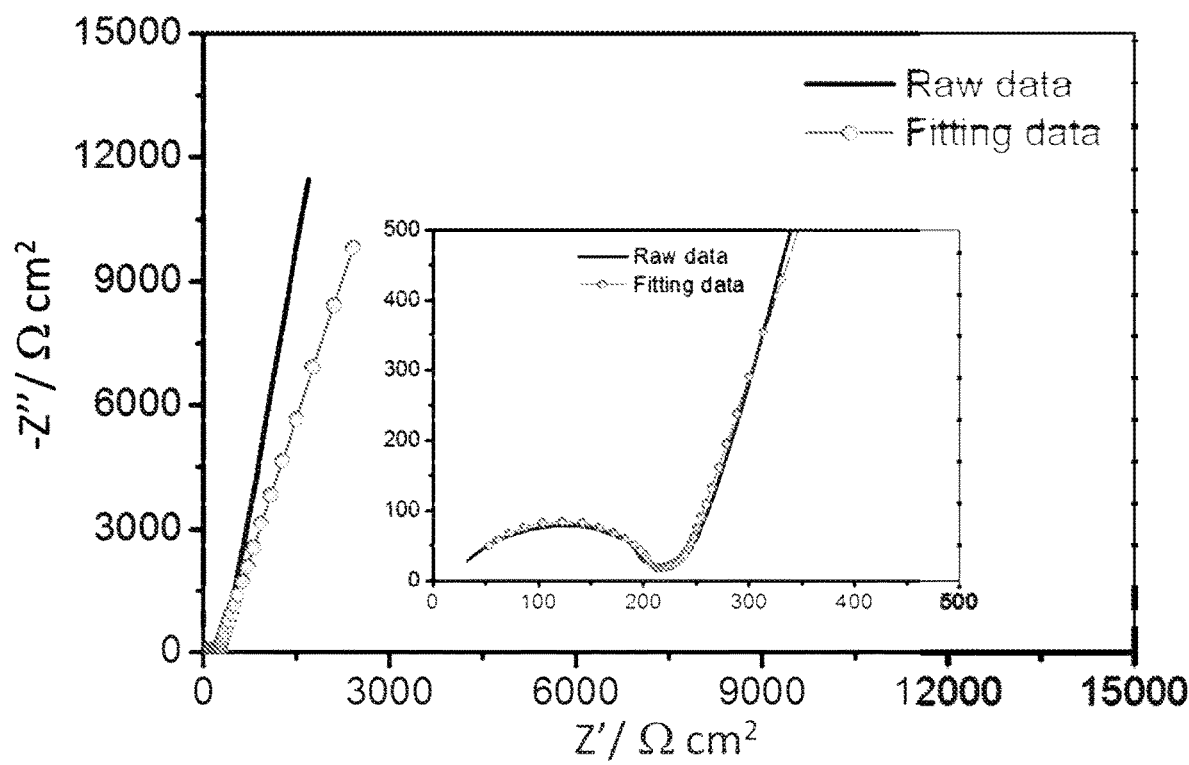
FIG. 50 shows an impedance spectrum of the Au/LLZO/Au cell at room temperature.
Figure 51:
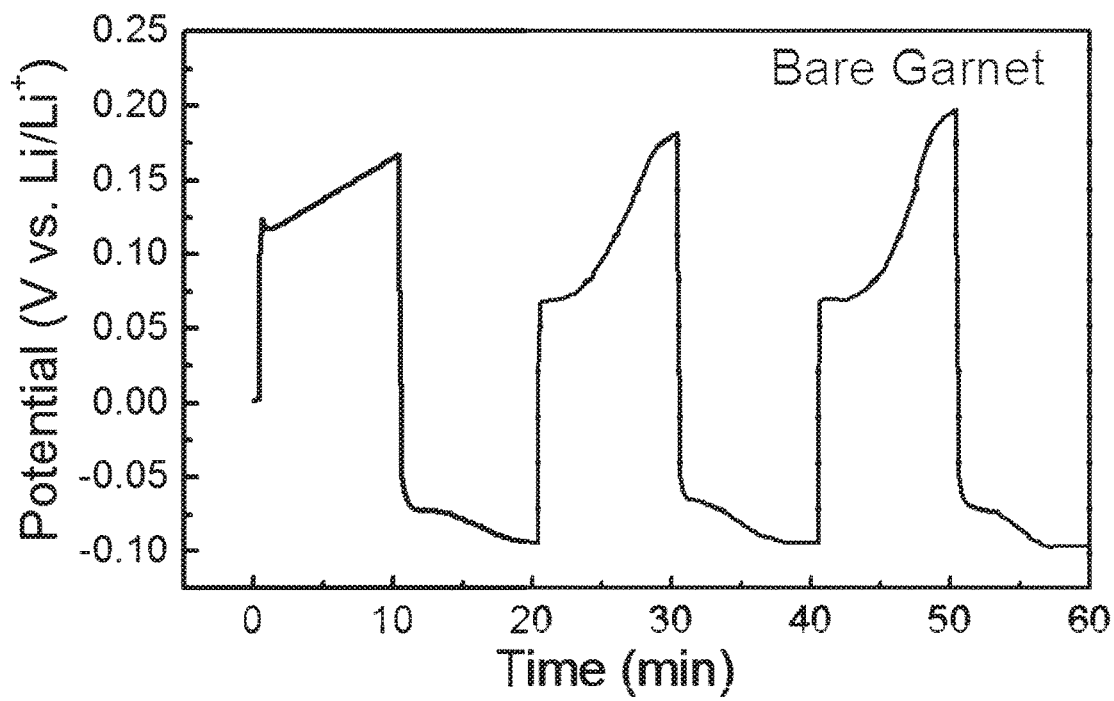
FIG. 51 shows voltage profiles of Li/bare LLZO/Li symmetric cell at 0.05 mA/cm$^2$, which suggests a large interfacial resistance between the Li metal and the bare LLZO.

The electrochemical performance of the Ge-modified garnet SSE was tested using Li metal/SSE/Li metal symmetric cells (see cell fabrication details in supporting information). In order to accelerate the reaction between Ge layer and Li metal, the symmetric cell was heated at 200° C. for 10 minutes before electrochemical measurements. In a control experiment, symmetric cells with bare garnet were also heated using the same conditions for improving the Li metal/bare garnet contact. After cooling down to room temperature, electrochemical impedance spectra (EIS) of these symmetric cells were collected (FIG. 46*a*). In Li metal/bare garnet/Li metal cell, an obvious semi-circle at high frequency was observed, which presents a large overall resistance of 2064 $\Omega cm^2$. The bulk resistance for bare garnet pellet, measured by the Au/bare garnet/Au cell, is 215 $\Omega cm^2$ (FIG. 50). Thus, the Li metal/bare garnet interfacial resistance was determined to be 925 $\Omega cm^2$. Such a large interfacial resistance is mainly attributed to the poor contact between Li metal and bare garnet pellet even after thermal treatment was adopted. In contrast, Li metal/Ge-modified garnet/Li metal cell delivered a much smaller semi-circle in its impedance spectrum, which gave an interfacial resistance of 115 $\Omega cm^2$. The drastic decrease in interfacial resistance is attributed to the greatly enhanced contact after Ge modification. The effective contact area is estimated to increase by more than 8 times. In agreement with the decreased interfacial resistance, Li metal/Ge-modified garnet/Li metal cell exhibited a long-term stable electrochemical striping/plating process (FIG. 46*b*), whereas the bare garnet counterpart encountered fluctuating voltage profiles, high voltage hysteresis and short cycle life (FIG. 51). The voltage profiles of Ge-modified garnet cell at a 0.05 mA/cm$^2$ current density (FIG. 46*c*) displayed flat voltage plateaus during both plating and striping with a small voltage hysteresis of ~25 mV. When the current density was increased to 0.1 mA/cm$^2$, the voltage profiles still show flat curves and limited voltage hysteresis (FIG. 46*d*). Moreover, stability is maintained in the Li metal/Ge-modified garnet/Li metal cell when the current density was tuned back to 0.025 and 0.05 mA/cm$^2$ over 150 hrs (FIGS. 46e and 46f). The reduced interfacial resistance and stable plating/striping behavior illustrate the capability of Ge deposition for modifying the Li metal/garnet interface.

Figure 52:
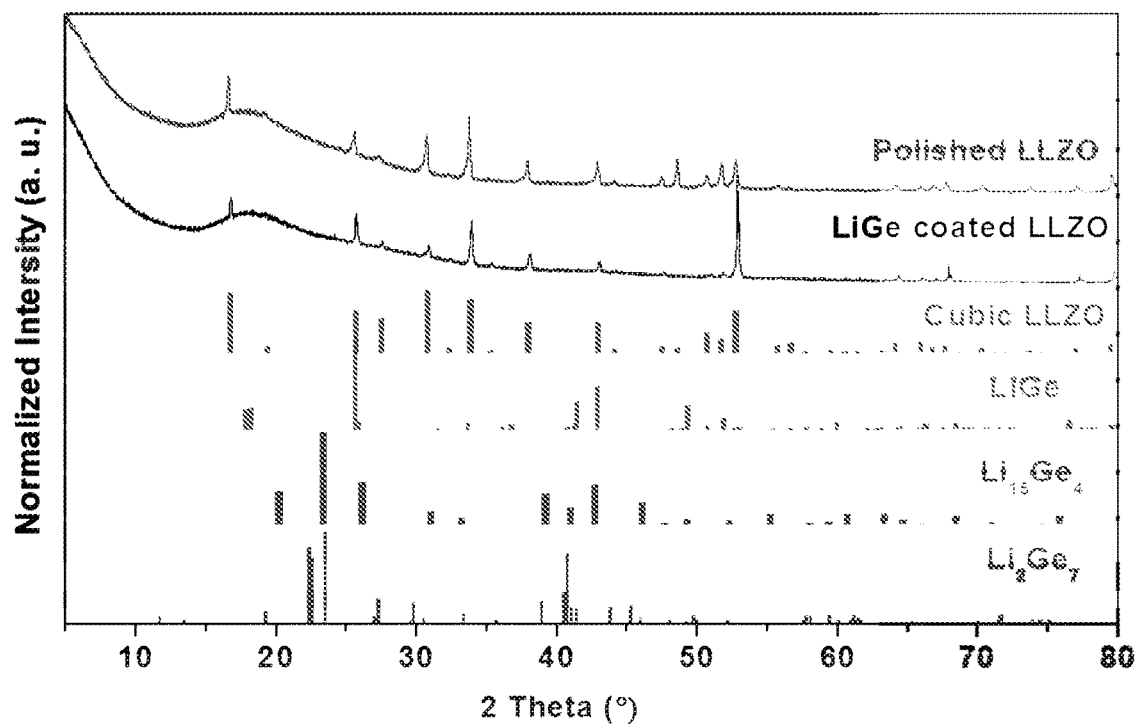
FIG. 52 shows XRD pattern comparison of polished garnet, Ge-coated garnet after lithiation, and standard cubic LLZO, LiGe, $Li_{15}Ge_4$ and $Li_2Ge_7$ alloy patterns.

To investigate the interfacial stability and wetting between Li—Ge alloy and garnet, we performed first principles calculation using known approaches. Considering the interface as a pseudo-binary of lithiated Ge and garnet, we identified the most thermodynamically favorable phase equilibria as $Zr_5Ge_3$, $La_2O_3$, $Li_2O$. The chemical reaction of Ge coated garnet ($Li_7La_3Zr_2O_{12}+Li_{15}Ge_4$) only has a calculated reaction energy of −115.7 kJ/mol (−0.05 eV per atom of LLZO). However, the most thermodynamically favorable phase equilibria are only marginally more stable than the Ge-coated garnet interface, and the potential reaction energy is very small, suggesting limited interfacial reaction. This indicates the garnet interface coated with Ge layer can be kinetically stabilized against Li with little interfacial degradation.[54,55] In addition, minor interfacial reaction can improve the wettability and physical contact of the interface, which supports the good stability and improved interfacial resistance observed in experiments. XRD pattern of Ge-coated garnet after lithiation was also collected to study the interface (FIG. 52). It mainly exhibited cubic LLZO structure and minor LiGe phase, which confirm the calculation results.

Figure 47:
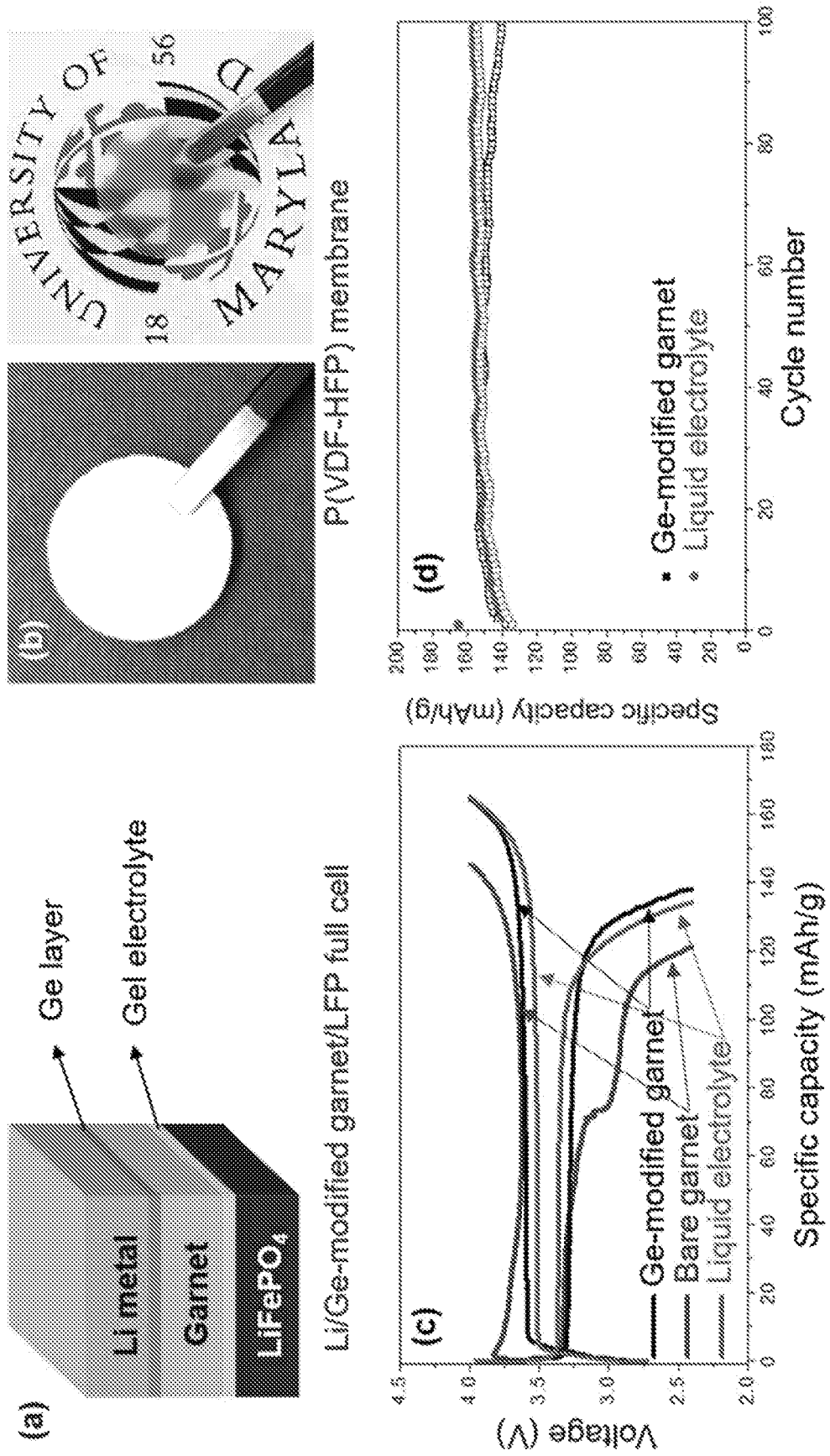
FIG. 47 shows electrochemical performance of full cells paired with LFP cathodes. (a) Schematic of the full cell structure, where a gel membrane was used between garnet and LFP cathode. (b) Photographs of the P(VDF-HFP) based gel membrane before and after being soaked in liquid electrolyte. After soaking in liquid electrolyte, the P(VDF-HFP) membrane turned transparent (from left to right). (c) First charge-discharge curve comparison of the Li/garnet/LFP cell, the Li/Ge-modified garnet/LFP cell and Li/liquid electrolyte/LFP cell tested at 1 C between voltage window of 2.4-4.0 V. (d) Cycling performance of the Li/Ge-modified garnet/LFP cell at 1 C.
Figure 53:
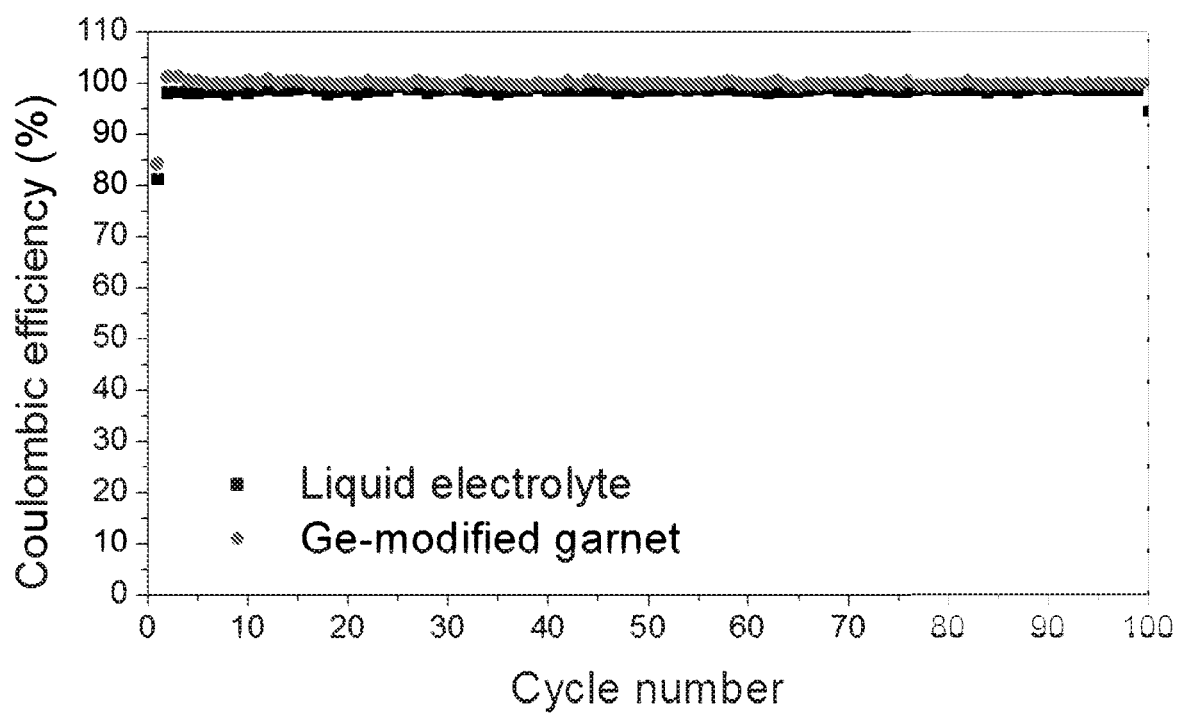
FIG. 53 shows coulombic efficiencies of Li/liquid electrolyte/LFP cell and Li/Ge-modified LLZO/LFP cell.
Figure 54:
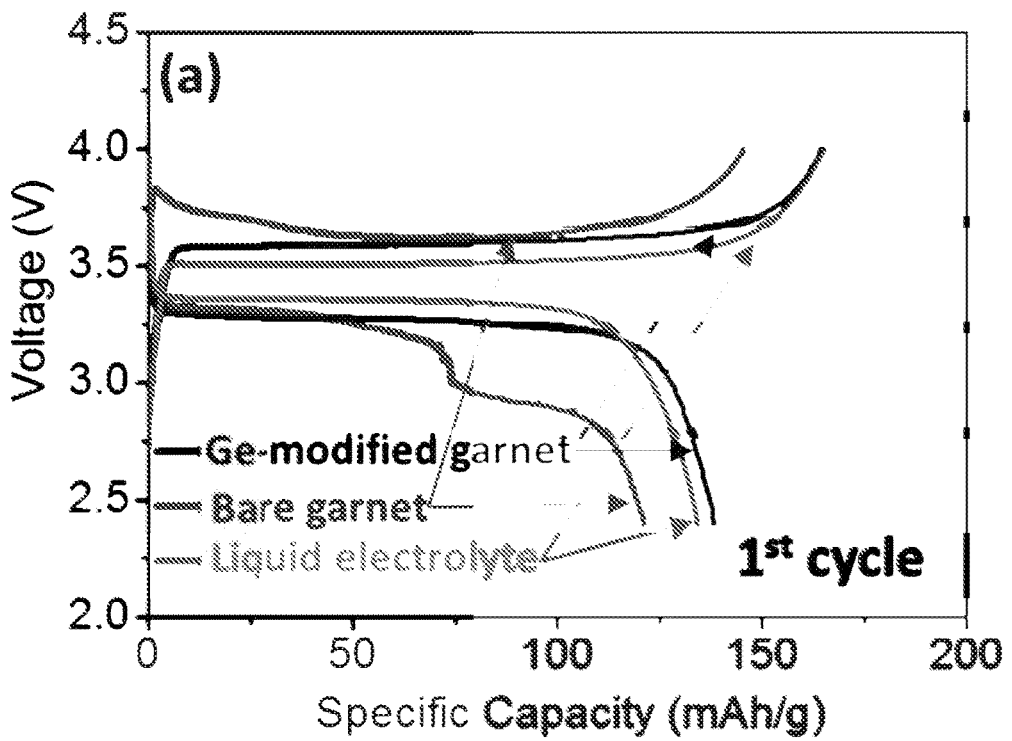
FIG. 54 shows charge/discharge curves of the Li/bare garnet/LFP cell tested at 1 C between voltage window of 2.4-4.0 V.
Figure 54:
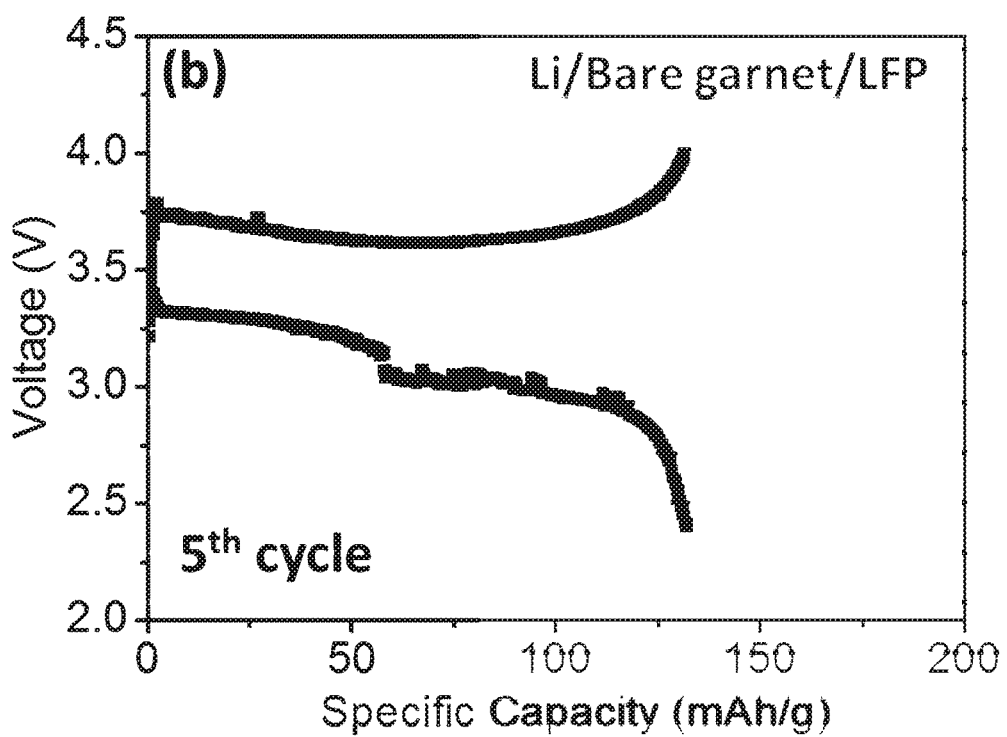
Figure 54:
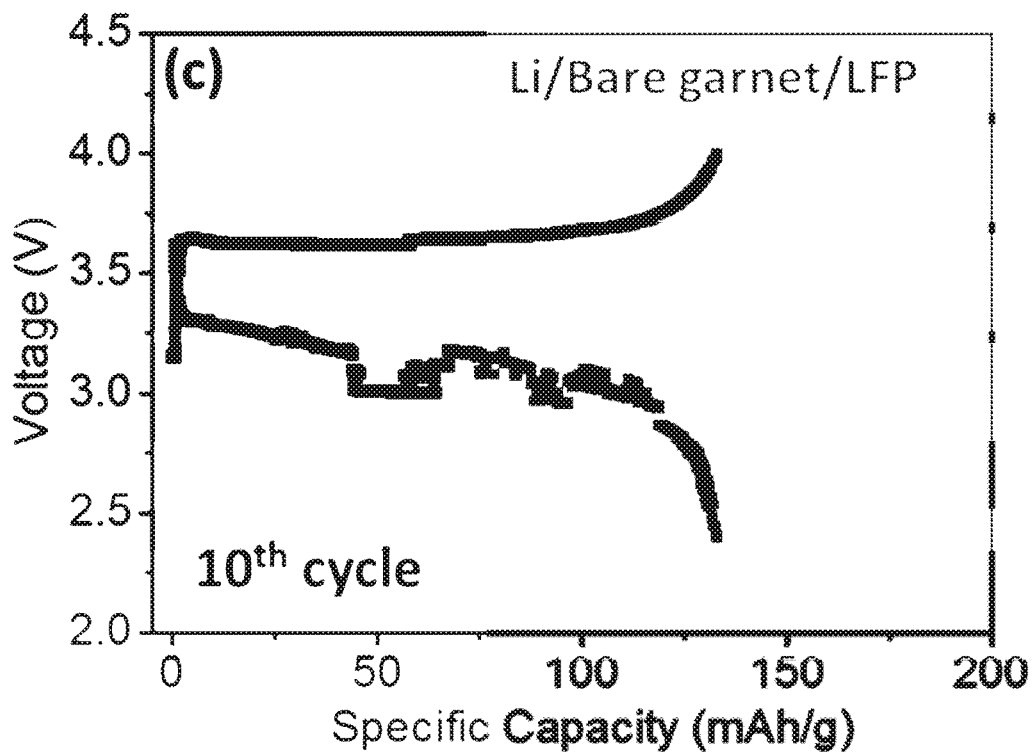
Figure 54:
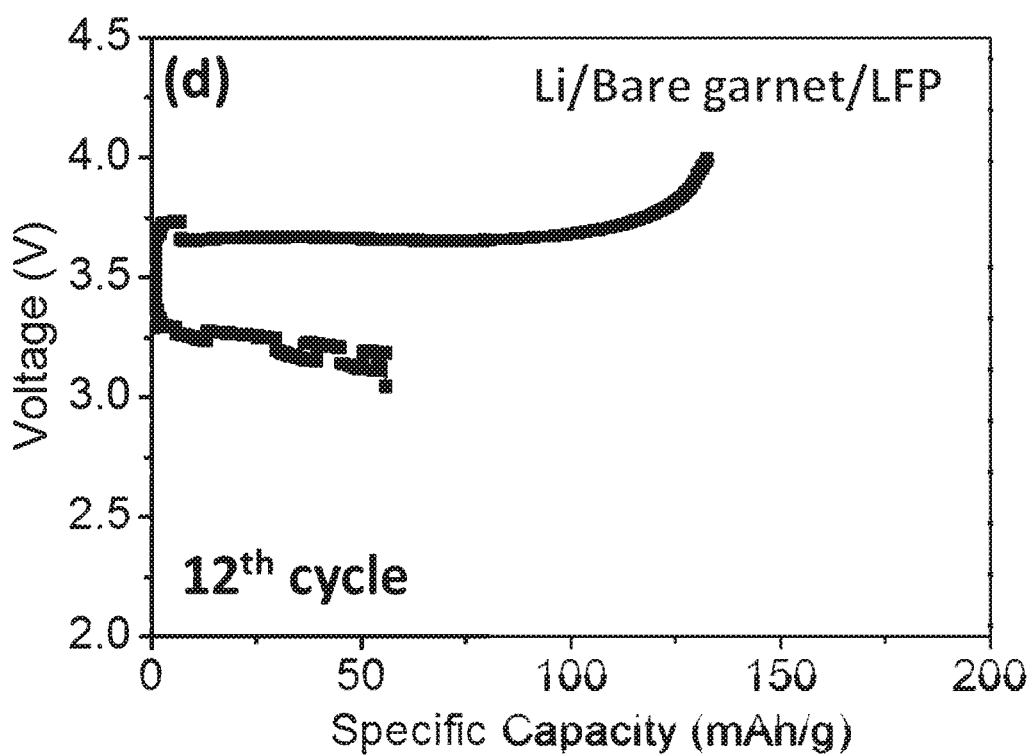

To further demonstrate the advantages of Ge-modified garnet, a proof-of-concept study was conducted on full cells paired with lithium iron phosphate ($LiFePO_4$, LFP) cathodes. As illustrated schematically in FIG. 47a, Ge-modified garnet pellets were sandwiched by Li metal anodes and LFP cathodes. To decrease the garnet/LFP cathode interfacial resistance, a Li ion conducting gel membrane was adopted using Poly(vinylidene fluoride-co-hexafluoropropylene) as matrix and 1.0 mol/L $LiPF_6$ in ethylene carbonate and diethyl carbonate (EC/DEC=1/1 v/v) as electrolyte (FIG. 47b). The P(VDF-HFP) membrane became transparent after being soaked with the liquid electrolyte, which suggests the effective adsorption of liquid electrolyte in the membrane pores.[56] The first charge discharge curve of the Li/Ge-modified garnet/LFP cell at 1 C is shown in FIG. 47c and is compared with a Li/bare garnet/LFP cell and Li/liquid electrolyte/LFP cell, where the Li/liquid electrolyte/LFP cell used a commercially available Celgard 2400 membrane as the separator and 1.0 mol/L $LiPF_6$ in EC/DEC as the electrolyte. The current rate in this article was calculated on the basis of LFP mass, where 1 C was 170 mA/g and corresponded to ~0.1 mA/cm$^2$ base on the area. Typical charge/discharge flat plateaus can be observed in Li/Ge-modified garnet/LFP cell and Li/liquid electrolyte/LFP cell. The Ge-modified garnet cell exhibits first cycle charge/discharge capacities of 164/138 mAh/g with Coulombic efficiency (CE) of 84% and a voltage hysteresis of 0.32 V. Compared with the Li/Ge-modified garnet/LFP cell, Li/liquid electrolyte/LFP cell displays a smaller voltage hysteresis (0.15 V), indicating the internal resistance in cells using solid-state electrolyte is still higher than that of liquid electrolyte. But, interestingly, the first cycle CE of Li/liquid electrolyte/LFP cell is slightly lower (81%). This phenomenon is credited to the irreversible decomposition of liquid electrolyte and formation of a solid electrolyte interphase (SEI) on the Li metal anode side, which are non-occurring with solid-state electrolyte. In sharp contrast to Ge-modified garnet cell and liquid electrolyte cell, Li/bare garnet/LFP cell cannot deliver normal charge/discharge curves due to its high Li/garnet interfacial resistance. However, the bare garnet cell can also deliver a first cycle CE of 83%, confirming the advantage of solid-state electrolyte in terms of efficiency. The cycling stability of the Li/Ge-modified garnet/LFP full cell at 1 C was demonstrated in FIG. 47d, which can deliver a capacity of 140 mAh/g up to 100 cycles with an efficiency of ~100% (FIG. 53). The stability is comparable to that of the full cell using liquid electrolyte while a slightly better efficiency is achieved, suggesting the great performance of Ge-modified garnet SSE. However, Li/bare garnet/LFP cell exhibited large overpotential, unstable discharge curves and cannot cycle after only 12 cycles (FIG. 54).

One of the key challenges of garnet-structured solid-state electrolyte is the poor contact between garnet and Li metal anode. In this Example, a thin layer of Ge was deposited onto the garnet surface to assist the contact. The effective contact area between Ge-modified garnet and Li metal anode increased more than 8 times compared to bare garnet due to the alloying reaction between Li and Ge. The Li/Ge-modified garnet delivered a small interfacial resistance of 115 Ωcm$^2$ while the Li/bare garnet presented a high interfacial resistance of 900 Ωcm$^2$. Furthermore, first principles calculation confirmed the good stability and wetting at the lithiated Ge/garnet interface, in agreement with experiments. The proof-of-concept full cell coupled with LFP cathodes demonstrated modest capacity and great cycle stability, which further confirms the utility of Ge-modified garnet.

The following materials and methods were used to obtain the results presented in this Example.

Preparation of LLZO pellet. To prepare LLZO, a conventional solid-state-reaction was employed using LiOH, $La_2O_3$, and $ZrO_2$, $CaCO_3$ and $Nb_2O_5$ as the starting materials. First, the precursor powder (10 wt. % of excess LiOH) was mixed by ball-milling and pressed into pellets before the first step annealing at 900° C. for 10 hours. The as-annealed pellet was ball-milled again for 24 hours and re-pressed into pellets for the second annealing at 1050° C. for 12 hrs.

Evaporating Ge onto LLZO pellets. Before evaporating Ge, LLZO pellets were carefully polished. Then, a thin Ge layer (20 nm) was evaporated onto the LLZO pellet by an electron beam evaporation system (DEP-03: DENTON EBEAM/THERMAL EVAPORATOR).

Structural and morphology characterizations. X-ray diffraction (XRD) patterns of LLZO powder and pellets were collected using a D8 Advanced (Bruker AXS, WI, USA). Surface morphology and microstructures were examined using a Hitachi SU-70 field emission scanning electron microscopy coupled with an energy-dispersive X-ray (EDX) spectrometer.

Symmetric cell fabrication and measurements. To measure the ionic conductivity of LLZO, Au/LLZ/Au Li-ion blocking cell was fabricated, where Au paste was coated on both sides of the polished LLZO pellets and cured at 700° C. Electrochemical Impedence Spectra (EIS) were recorded with an AC amplitude of 100 mV and a frequency range from 1 MHz to 1 Hz. To measure the Li/Ge-modified LLZO interfacial resistance and conduct stripping/plating experiments, both sides of the LLZO pellet were coated with evaporated Ge. Then, Li metal was coated onto both sides of Ge-modified LLZO pellets to fabricate a symmetric cell. In a control experiment, a Li metal/bare LLZO/Li metal symmetric cell was fabricated. The cells were cured at 200° C. for 10 minutes before conducting EIS measurements at room temperature using a Biologic multi-channel workstation. All the symmetric cells were fabricated and tested in an Ar-filled glovebox.

Full cell fabrication and measurements. To fabricate full cells, LFP cathodes were prepared by mixing 80 wt % LFP powder, 10 wt % carbon black, and 10 wt % polyvinylidene fluoride (PVDF) in N-methyl-2-pyrrolidinone. After coating the above slurries on Al foils, the electrodes were dried at 80° C. in a vacuum overnight. Three types of coin cells were assembled in an argon-filled glovebox. For Li/liquid electrolyte/LFP cell, LFP electrode was used as cathode, lithium foil as the counter electrode, a Celgard 2400 membrane as the separator and 1.0 mol/L $LiPF_6$ in a mixture of ethylene carbonate (EC) and diethyl carbonate (DEC) (v/v=1:1). For Li/bare garnet/LFP cell and Li/Ge-modified garnet/LFP cell, a P(VDF-HFP) based gel electrolyte membrane was used between garnet pellets and LFP cathodes. P(VDF-HFP) membrane was prepared based on known approaches with minor modifications. P(VDF-HFP) flake (Sigma) was dissolved into a mixture of ethyl alcohol and acetone under 60° C. The clear solution was dropped onto an aluminum foil and transferred into a constant humidity cabinet with a humidity of 60% and temperature of 25° C. The obtained white P(VDF-HFP) film was peeled off from the aluminum foil before drying under vacuum and punched into circular pieces. The gel electrolyte membrane was then made by soaking the as-punched P(VDF-HFP) membrane in the $LiPF_6$-EC-DEC liquid electrolyte overnight in the glove box. The galvanostatic charge/discharge tests were carried out using a multi-channel battery testing system (Land, China) with a cutoff voltage of 4.0-2.4 V at room temperature.

Although the present disclosure has been described with respect to one or more particular embodiments and/or examples, it will be understood that other embodiments and/or examples of the present disclosure may be made without departing from the scope of the present disclosure.

The invention claimed is:

1. A metal-alloy layer comprising:
a metal-alloy forming a layer disposed on at least a portion of a surface or all of the surfaces between a metal anode comprising lithium, sodium, magnesium, or alloy thereof and a solid-state electrolyte (SSE) material,
wherein,
the metal anode is located within pores of the SSE material;
the metal-alloy has a thickness of 1 nm to 100 nm; and
the metal-alloy comprising a first metal, $M^1$, and a second metal, $M^2$, wherein:
i) $M^1$ is lithium, sodium, or magnesium;
ii) $M^2$ is a metal selected from the group consisting of aluminum, gallium, tin, magnesium, zinc, and combinations thereof and/or a metalloid selected from the group consisting of silicon, germanium, and combinations thereof; and
iii) the mol fraction of $M^2$ in the layer is 0.1 to 0.8.

2. A solid-state, ion-conducting battery comprising:
a) a cathode having a cathode material;
b) a metal anode comprising lithium, sodium, magnesium, or an alloy thereof;
c) a solid-state electrolyte (SSE) material having a metal-alloy layer disposed on at least a portion of or a surface or all of the surfaces between the metal anode and the SSE material,
wherein
the metal anode is located within pores of the SSE material; and
d) optionally, a current collector disposed on at least a portion of the cathode material or the metal anode.

3. The solid-state, ion-conducting battery of claim 2, wherein the metal-alloy comprises lithium and the SSE material is a garnet SSE material selected from lithium garnet SSE materials, doped lithium garnet SSE materials, lithium garnet composite materials, and combinations thereof.

4. The solid-state, ion-conducting battery of claim 2, wherein the metal-alloy comprises sodium and the SSE material is selected from $\beta$-$Al_2O_3$, porous or dense $Na_4Zr_2Si_2PO_{12}$ (NASICON), cation-doped NASICON.

5. The solid-state, ion-conducting battery of claim 4, wherein the cation-doped NASICON is selected from the group consisting of $Na_4ZrAlSi_2PO_{12}$, $Na_4ZrFeSi_2PO_{12}$, $Na_3Zr_{1.94}Y_{0.06}Si_2PO_{12}$, $Na_4ZrSbSi_2PO_{12}$, and $Na_4ZrDySi_2PO_{12}$.

6. The solid-state, ion-conducting battery of claim 2, wherein the metal-alloy comprises magnesium and the SSE material is selected from $Mg_{1+x}(Al,Ti)_2(PO_4)_6$, NASICON-type magnesium-ion conducting materials.

7. The solid-state, ion-conducting battery of claim 6, wherein the NASICON-type magnesium-ion conducting material is selected from the group consisting of $Mg_{1-2x}(Zr_{1-x}M_x)_4P_6O_{24}$ and $Mg_{1-2x}(Zr_{1-x}M_x)(WO_4)_3$, where x is 0.01 to 0.5.

8. The solid-state, ion-conducting battery of claim 2, wherein the cathode is an air electrode or comprises sulfur (S), a conducting carbon material, an organic sulfide or a polysulfide, and/or a material selected from $Na_xMO_2$ materials, wherein M=Mn, Co, or a combination thereof, $NaMPO_4$ materials, wherein M=Fe or Mn, $Na_2Fe_2(SO_4)_3$ materials, $Na_3V_2(PO_4)_3$ materials.

9. The solid-state, ion-conducting battery of claim 2, wherein the metal anode is lithium and the cathode is a lithium-containing material selected from lithium nickel manganese cobalt oxides, lithium manganese oxides (LMOs), lithium iron phosphates (LFPs), and $Li_2MM_3O_8$, wherein M is selected from Fe, Co, and combinations thereof, $LiCoO_2$, $Li_2MMn_3O_8$, wherein M is selected from Fe, Co, and combinations thereof.

10. The solid-state, ion-conducting battery of claim 2, wherein the metal anode is sodium and the cathode is sulfur or a sodium-containing material selected from $NaxMO_2$ materials, wherein M=Mn Co, or a combination thereof, $NaMPO_4$ materials, wherein M=Fe or Mn, $Na_2Fe_2(SO_4)_3$ materials, $Na_3V_2(PO_4)_3$ materials.

11. The solid-state, ion-conducting battery of claim 2, wherein the metal anode is magnesium and the cathode is a magnesium-containing material selected from $MgMSiO_4$ (M=Fe, Mn, Co) materials and $MgFePO_4F$ materials.

12. The solid-state, ion-conducting battery of claim 2, wherein the metal anode and the cathode is selected from $FeS_2$ materials, $MoS_2$ materials, and $TiS_2$ materials.

13. The solid-state, ion-conducting battery of claim 2, wherein the cathode, the metal anode, the metal-alloy layer, and SSE material, and the current collector form a cell, and the solid-state, ion-conducting battery comprises a plurality of the cells, each adjacent pair of the cells is separated by a bipolar plate.

14. The solid-state, ion-conducting battery of claim 2, wherein
the metal-alloy layer has a thickness of 1 nm to 100 nm, and
the metal-alloy comprises a first metal, $M^1$, and a second metal, $M^2$, wherein:
i) $M^1$ is lithium, sodium, or magnesium;
ii) $M^2$ is a metal selected from the group consisting of aluminum, gallium, tin, magnesium, zinc, and combinations thereof and/or a metalloid selected from the group consisting of silicon, germanium, and combinations thereof; and iii) the mol fraction of $M^2$ in the layer is 0.1 to 0.8.

15. The solid-state, ion-conducting battery of claim 14, wherein the metal anode comprises lithium.

16. The solid-state, ion-conducting battery of claim 2, wherein the metal-alloy layer is formed by forming an alloying metal or metalloid on the surface of the pores followed by infiltrating the anode material into the pores by the anode material wetting the alloying metal or metalloid and facilitating the infiltration of the anode material, with anode material forming the alloy layer with the alloying metal or metalloid.

17. A device comprising one or more solid-state, ion-conducting battery of claim 2.

18. A method of making the solid-state, ion-conducting battery of claim 2, wherein the metal-alloy layer is made by a method comprising:
   a) forming a metal or metalloid layer on at least a portion of a surface of a substrate;
   b) contacting the metal or metalloid layer with molten lithium, sodium, or magnesium;
   c) wherein the metal-alloy layer is formed.

19. The method of claim 18, wherein the contacting the metal or metalloid layer with molten lithium, sodium, or magnesium metal comprises contacting the metal or metalloid layer with lithium, sodium, or magnesium metal and heating the lithium, sodium, or magnesium metal and the metal or metalloid layer at a temperature at or above the melting point of the lithium, sodium, or magnesium metal, respectively, wherein the metal-alloy layer is formed.

20. The method of claim 18, wherein the metal or metalloid is deposited by chemical vapor deposition (CVD) or atomic layer deposition (ALD), and/or plasma enhanced CVD (PECVD).

21. The method of claim 18, wherein the metal or metalloid is deposited by physical vapor deposition (PVD).

22. The method of claim 21, wherein the PVD is thermal evaporation or sputtering.

23. The method of claim 18, wherein the metal or metalloid is deposited by a solution based process.

24. A method of making the solid-state, ion-conducting battery of claim 2, wherein the metal-alloy layer is made by a method comprising:
   a) contacting the SSE material with a metal-alloy comprising a first metal comprising lithium, sodium, or magnesium metal alloyed with an alloying material that is an alloying metal and/or an alloying metalloid, the alloying metal is selected from the group consisting of aluminum, gallium, tin, magnesium, zinc, and combinations thereof and the alloying metalloid is selected from the group consisting of silicon, germanium, and combinations thereof; and
   b) heating the first metal and the alloying material at a temperature at or above the melting point of lithium, sodium, or magnesium metal, wherein the metal-alloy layer is formed.

* * * * *